United States Patent [19]

Siekierski et al.

[11] Patent Number: 4,527,798
[45] Date of Patent: Jul. 9, 1985

[54] RANDOM NUMBER GENERATING TECHNIQUES AND GAMING EQUIPMENT EMPLOYING SUCH TECHNIQUES

[75] Inventors: Walter R. Siekierski, Troy; Michael Sterling, Utica, both of Mich.

[73] Assignee: Video Turf Incorporated, New York, N.Y.

[21] Appl. No.: 237,361

[22] Filed: Feb. 23, 1981

[51] Int. Cl.³ .............................................. A63F 5/00
[52] U.S. Cl. ............................ 273/86 R; 273/138 A; 364/410; 364/717; 364/802
[58] Field of Search ............... 273/138 A, 139, 86 R, 273/86 B; 235/92 GA, 92 TA, 92 TS, 375; 364/410–412, 717, 200, 900, 419, 801, 802, 806

[56] References Cited

U.S. PATENT DOCUMENTS

| | | | |
|---|---|---|---|
| 3,709,493 | 1/1973 | Lally | 273/86 F |
| 3,770,269 | 11/1973 | Elder | 273/138 A |
| 3,790,768 | 2/1974 | Chevalier et al. | |
| 3,815,912 | 6/1974 | Wichinsky et al. | 273/86 F |
| 3,838,259 | 9/1974 | Kortenhaus | |
| 3,866,029 | 2/1975 | Chevalier | |
| 3,866,128 | 2/1975 | Fletcher et al. | |
| 3,909,002 | 9/1975 | Levy | 273/138 A |
| 4,006,904 | 2/1977 | Felshur | 273/138 A |
| 4,072,930 | 2/1978 | Lucero et al. | 364/412 |
| 4,093,223 | 6/1978 | Wilke et al. | 273/85 G |
| 4,151,404 | 4/1979 | Harrington et al. | |
| 4,202,041 | 5/1980 | Kaplow et al. | 364/900 |
| 4,283,709 | 8/1981 | Lucero et al. | 340/147 R |

Primary Examiner—Richard C. Pinkham
Assistant Examiner—Leo P. Picard
Attorney, Agent, or Firm—Lerner, David, Littenberg, Krumholz & Mentlik

[57] ABSTRACT

A random number generator and a gaming machine employing such random number generator are set forth in accordance with preferred embodiments of the present invention. The random number generator disclosed employs a white noise source to clock a counting arrangement whose maximum count exceeds the largest random number desired. A variable counter, clocked at a fixed rate, is loaded with random numbers obtained from the counting arrangement and each time the variable counter is counted down to a threshold state a new random number is read from the counting arrangement. Random numbers obtained in this manner are then checked to ascertain their propriety and those which are accepted are then subjected to pseudo-random number regenerative techniques to further randomize the same. The resulting random numbers are then employed within a digitally controlled and operated gaming machine to select winning condition, the probabilities to be displayed during periods when wagers are accepted and otherwise to vary initial conditions associated with the gaming event prior to the actual occurrence thereof. The gaming event is then visually displayed in accordance with the winning conditions selected and any successful wagers are paid.

3 Claims, 23 Drawing Figures

Microfiche Appendix Included

4 Microfiche, (276 pages)

| THE HORSES ARE ON THE TRACK | | | |
|---|---|---|---|
| POST HORSE | WIN | PLACE | SHOW |
| 1. BERNIES BABY | 3 | 2 | 1 |
| 2. SPEEDY BARB | 4 | 2 | 1 |
| 3. WALTS WISH | 5 | 2 | 1 |
| 4. FOXIE LADY | 14 | 7 | 2 |
| 5. CHASE'S CHOICE | 31 | 13 | 4 |
| 6. IVY GIRL | 76 | 33 | 7 |
| 7. LARRY'S LARK | 18 | 4 | 1 |
| 8. MSG | 4 | 2 | 1 |
|  |  |  |  |
|  |  |  |  |

/10

| LAST RACE RESULTS | | | |
|---|---|---|---|
| POST HORSE | WIN | PLACE | SHOW |
| 2 ABLE ARNIE | 5 | 2 | 1 |
| 4 JUST JOE |  | 2 | 1 |
| 1 LONG GONE |  |  | 3 |
| PLAYER RESULTS | | | TOTALS |
| PLYR QUINELLA PICKS | | WON | PAYED |
| 1 LOST LOST 1ST | | $48.00 | —*  |
| 2 NO BET WON 1ST | | — | — |
|  |  |  |  |
| *HOPPER EMPTY HAND PAY REMAINDER | | | |
| CALL ATTENDANT ON ANY HAND PAY | | | |

/12

| THE HORSES ARE ON THE TRACK | | | |
|---|---|---|---|
| POST HORSE | WIN | PLACE | SHOW |
| 1 BERNIES BABY | 3 | 2 | 1 |
| 2 SPEEDY BARB | 4 | 2 | 1 |
| 3 WALTS WISH | 5 | 2 | 1 |
| 4 FOXIE LADY | 14 | 7 | 2 |
| 5 CHASE'S CHOICE | 31 | 13 | 4 |
| 6 IVY GIRL | 76 | 33 | 7 |
| 7 LARRY'S LARK | 18 | 4 | 1 |
| 8 MSG | 4 | 2 | 1 |
|  |  |  |  |
|  |  |  |  |

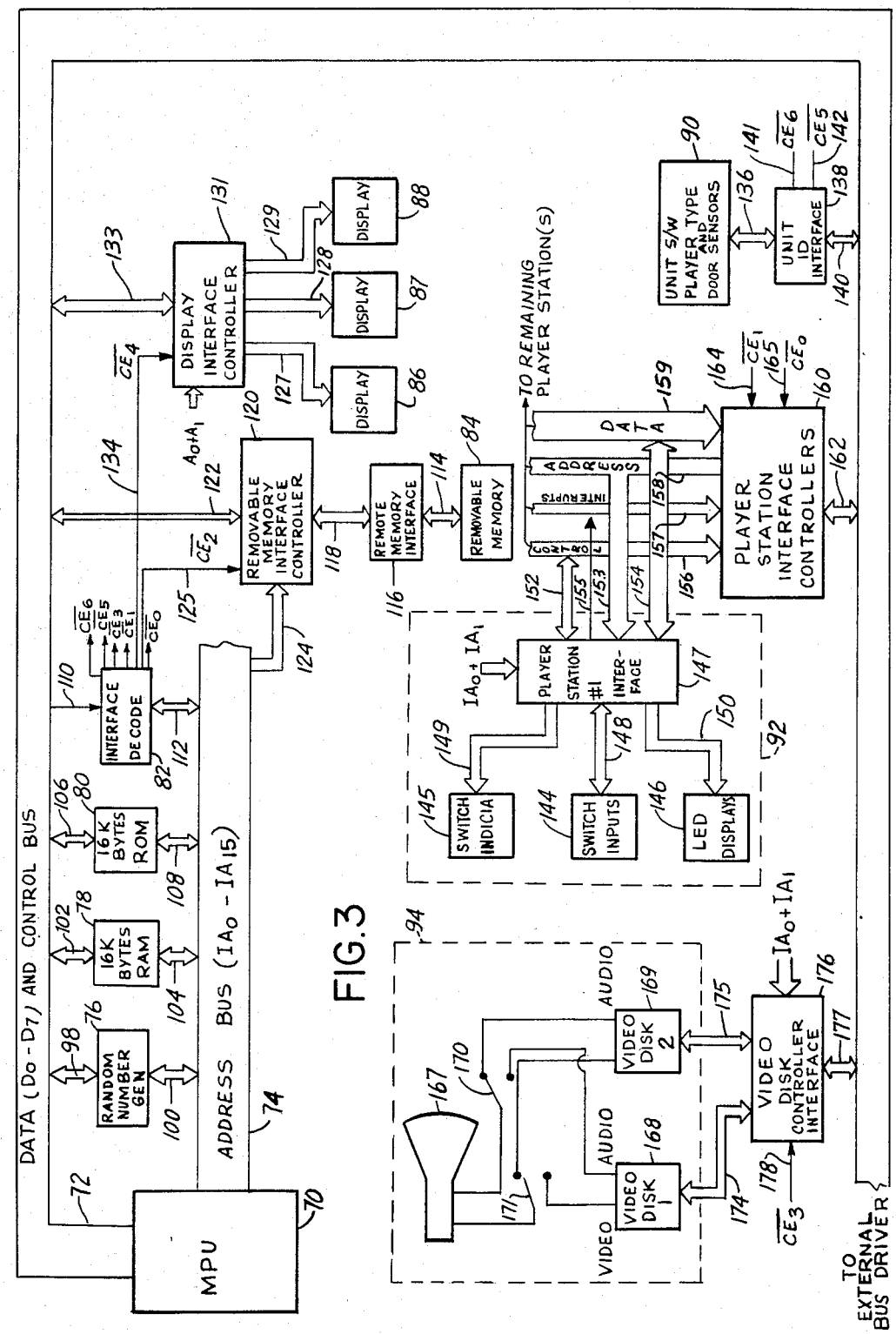

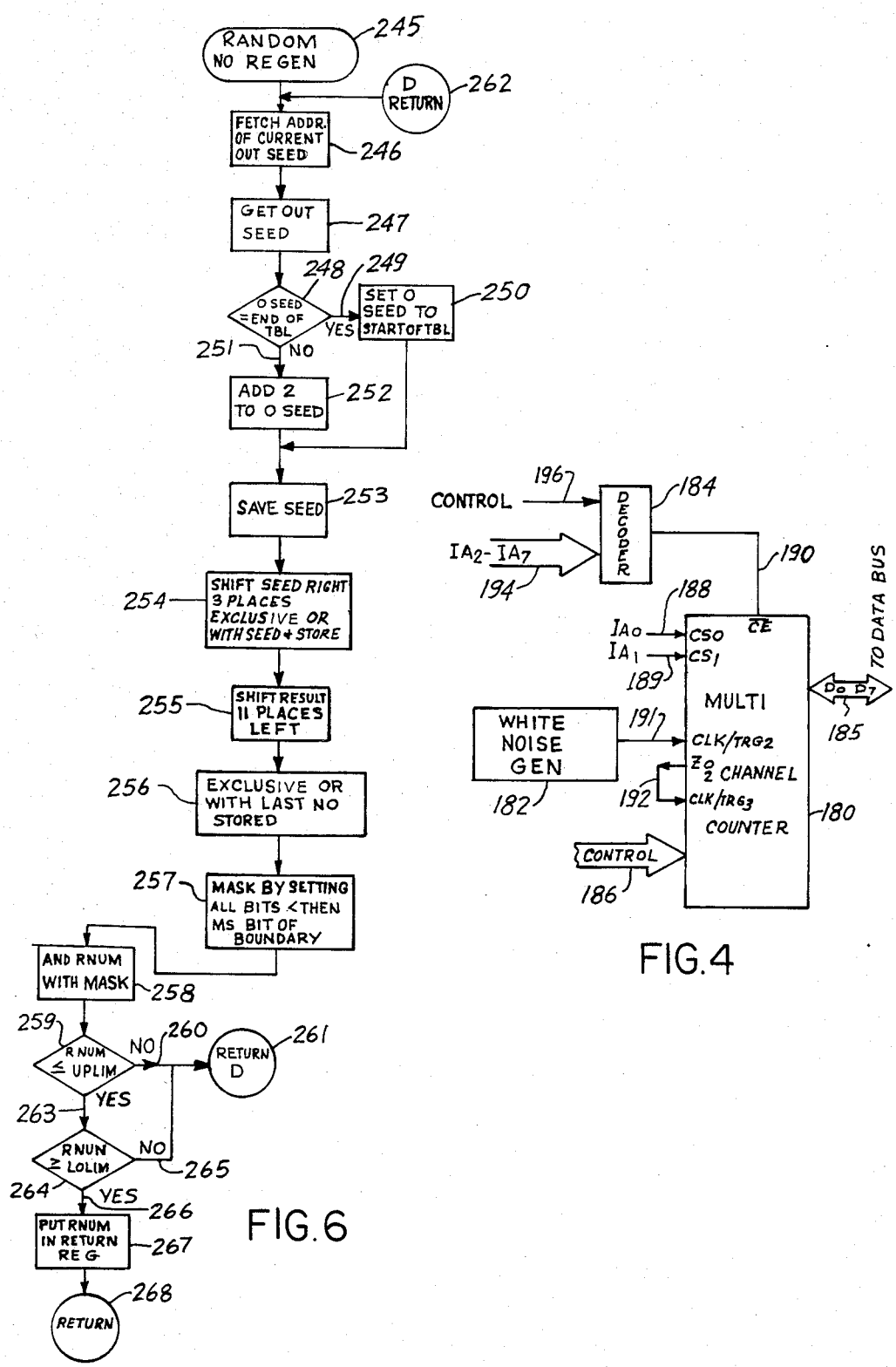

– – – –

RANDOM NUMBER GENERATING TECHNIQUES AND GAMING EQUIPMENT EMPLOYING SUCH TECHNIQUES

A microfiche appendix is included setting forth the control program for operation of this device. The appendix includes 4 sheets with 276 frames.

FIELD OF THE INVENTION

This invention relates to random number generating methods and apparatus and to gaming equipment employing such random number generating methods and apparatus. Although not limited to specific applications in gaming equipment or to specific types of gaming equipment per se, the invention shall be described in connection with apparatus employing data processing techniques for emulating horse races and accepting wagers thereon in accordance with conditions usually encountered at racetracks or the like.

BACKGROUND OF THE INVENTION

While state of the art data processing techniques readily lend themselves to the development of specialized equipments for emulating and simulating many conditions and environments, the same has not successfully been employed in the development of sophisticated gaming equipment due to the fact that such gaming equipment must be based at a threshhold level upon the random occurrence of specified fortuitous events. Thus, whenever a gaming machine is to emulate a game of chance, the outcome of each game, the probability of success or failure which is associated with wagers to be accepted, the reliability of the device when seen from the standpoint of the casino owner or the like, as well as the fairness of the equipment as viewed by the player, all must be based upon the gaming equipment's ability to reliably and repetitively select the happening of a random occurrence in a truly random fashion. When data processing equipment or the like is involved, this ability will invariably be tied to the equipment's accessability to a large number of truly random numbers.

The provision of random numbers to a computer has typically been achieved through the storage of large tables of random numbers or by the provision of a random generator employing either hardware or pseudo-random number generation techniques. However, each of these techniques exhibits substantial drawbacks when applied to the development of gaming equipment or the like and frequently allow such equipment to be beaten by the skilled mathematician or the like. Thus, for instance, the storage of large random number tables is generally undesirable as the same requires too much memory and unless extremely large tables are stored, the equipment relying upon these tables will exhibit a certain repeatability. Similarly, hardware random number generators frequently exhibit a certain bias which over a period may be observed and employed to render the gaming equipment unreliable.

Additionally, with typical forms of hardware random number generators, the spectrum of random numbers which may be generated is somewhat limited. Finally, pseudo-random number generation techniques such as are usually employed in computers and the like, require that a seed number be employed, and it is to this seed number that the various manipulations associated with a given pseudo-random number generator, such as a mid-square generator, a congruential generator, or a shift register generator are applied. However, if the seed number becomes known or is discovered and the method of pseudo-random number generation is detectable, a gaming machine based upon these techniques can be beaten.

Therefore, it is an object of this invention to provide an improved random number generator.

It is a further object of the invention to provide improved gaming equipment or the like employing such improved random number generator in determining the occurrence of fortuitous events upon which wager may be made.

It is another object of this invention to provide an improved random number generator whose operation is highly uniform so that, over an interval of time, the same will generate a sequence of random numbers that exhibit no bias.

It is a further object of this invention to provide improved gaming equipment which employs random numbers generated in a uniform manner to ascertain the occurrence of a fortuitous event, and in addition thereto, to display and operate upon the use of one of a plurality of probability tables associated with the occurrence of that event which are also selected as a function of random numbers provided.

It is another object of the present invention to provide an improved random generator which is seedless.

It is an additional object of the present invention to provide gaming apparatus relying upon the provision thereto of random numbers which closely simulate and select for a prospective user, wagering conditions which closely approximate those encountered by an actual participant of the game being emulated.

It is a further object of this invention to provide an improved random number generator having sufficient internal checks and balances to determine a failure condition and rapidly indicate the same prior to substantial reliance on any sequence of random numbers which may be provided during the occurrence of such failure condition.

It is another object of this invention to provide improved gaming apparatus which initiates an automatic shutdown condition upon a determination that the sequence of random numbers being provided thereto has become unreliable or that otherwise a failure within such system has occurred.

It is an additional object of this invention to provide an improved random number generator having a mode of generating random numbers which is sufficiently complex to inhibit tampering or the like.

It is a further object of the present invention to provide improved gaming equipment for the purpose of simulating races and accepting wages thereon, which game equipment acts in response to the provision of random numbers to select winning entries in races to be displayed and subsequently acts to display an appropriate race based on the winning entry selected.

It is an additional object of this invention to provide an improved random number generator exhibiting unpredictable start up characteristics based upon the receipt of white noise.

It is a further object of the present invention to provide improved gaming equipment which is highly sophisticated and exhibits high reliability in both modes of operation and in regard to the probability associated with various wagers displayed to a prospective user thereof.

It is an additional object of this invention to provide gaming equipment employing digital processing techniques for closely simulating the sights, sounds and other conditions which a prospective player might reasonably expect to encounter at a racetrack.

Various other objects and advantages of the present invention will become clear from the following description of several exemplary embodiments thereof, and the novel features will be particularly pointed out in connection with the appended claims.

BRIEF SUMMARY OF THE INVENTION

In accordance with preferred embodiments of the present invention, a random number generator is provided which employs a white noise source to clock a counting arrangement whose maximum count exceeds the largest random number desired; a variable counter, clocked at a fixed rate, is loaded with random numbers obtained from said counting arrangement and each time said variable counter is counted down to a threshhold state a new random number is read from said counting arrangement; random numbers obtained in this manner are then checked to ascertain their propriety and those which are accepted are then subject to pseudo-random number regenerative techniques to further randomize the same; random numbers obtained in this manner are then employed within a digitally controlled and operated gaming machine to select winning conditions, the probabilities to be displayed during periods when wagers are accepted and otherwise to vary initial conditions associated with the gaming event prior to the actual occurrence of the gaming event; the gaming event is then visually displayed in accordance with the winning conditions selected and any successful wagers are then paid.

The invention will be more clearly understood by reference to the following detailed description of an exemplary embodiment of a random number generator employed in an exemplary embodiment of a gaming machine when considered in conjunction with the accompanying drawings in which:

FIG. 1 is a pictorial view of an embodiment of a gaming device in accordance with the teachings of the present invention;

FIGS. 2A and 2B illustrate an exemplary operator controlled panel and informational displays for the embodiment of the gaming device illustrated in FIG. 1 wherein FIG. 2A shows details of various switch inputs and other indicia which may be provided in an exemplary control panel, and FIG. 2B shows details of exemplary informational displays which may be provided in the embodiment of the gaming device;

FIG. 3 is a block diagram which schematically illustrates the overall apparatus contained in the embodiment of the invention depicted in FIG. 1;

FIG. 4 is a block diagram schematically illustrating exemplary structure for an embodiment of a random number generator according to this invention suitable for incorporation into the embodiment of the gaming device illustrated in FIG. 3 in the manner generally indicated therein;

FIG. 6 is a flow chart illustrating a simplified pseudo-random number regeneration program for further randomizing the random numbers obtained from the random number generator in FIG. 4 and for conforming the resulting random numbers obtained to the boundary conditions required by the gaming device illustrated in FIG. 3;

DETAILED DESCRIPTION OF THE INVENTION

Figure 1:
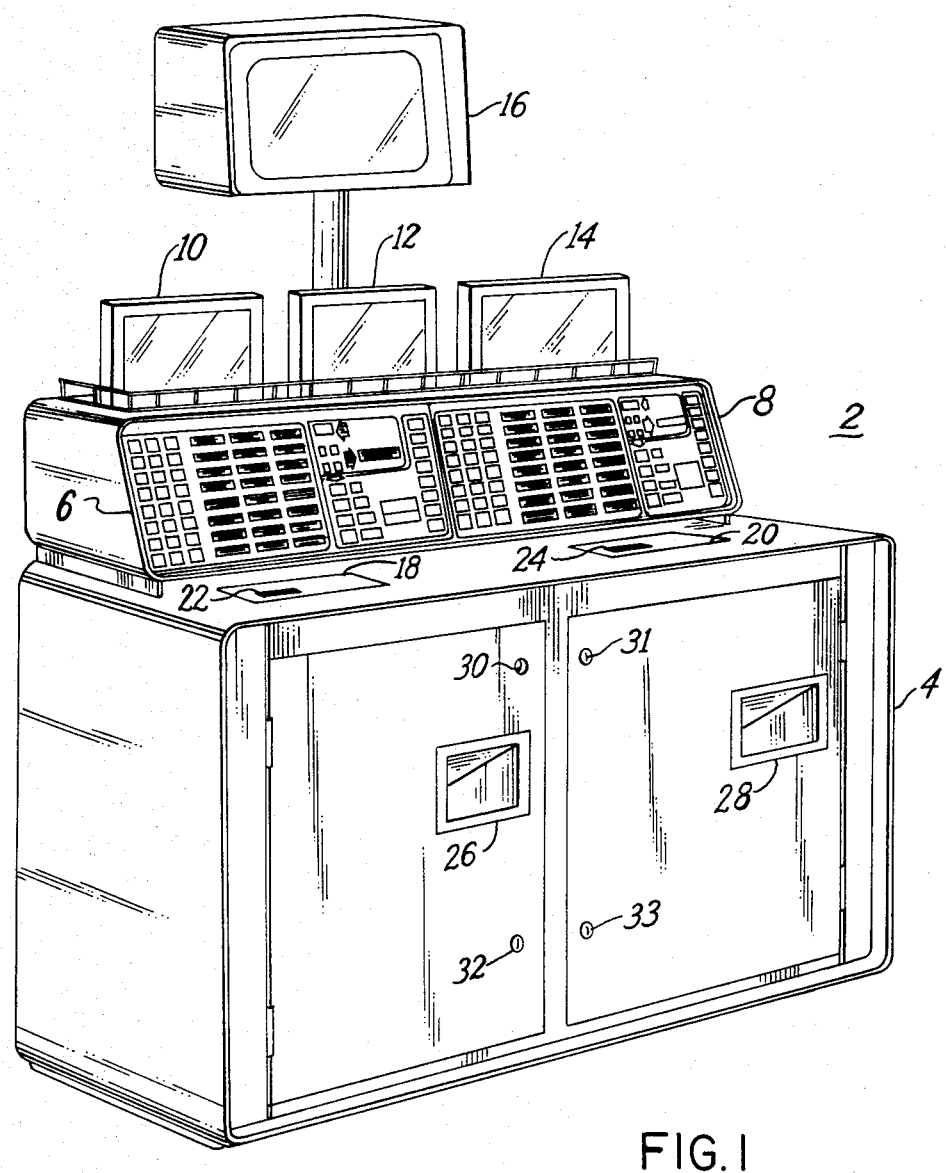

Referring now to the drawings and more particularly to FIG. 1 thereof, there is illustrated a pictorial view of an embodiment of a gaming device, in this case a horse racing machine, in accordance with the teachings of the instant invention. The embodiment of the invention shown in FIG. 1 here takes the form of a horse race machine 2 having a base 4, player control and indicia panel 6 and 8, informational displays 10, 12 and 14 and a video display 16. The embodiment of the horse race machine 2 illustrated in FIG. 1 and that generally described herein has been chosen to take the form of a two-player machine which thus provides two independent stations so that two players may be simultaneously accommodated. However, as shall be apparent to those of ordinary skill in the art, as this description proceeds, a greater or lesser number of player stations may be readily accommodated by the instant invention, and in fact, the electronic portions of the invention which are disclosed below will readily accommodate from one to eight player stations. Hence to this degree, the number of player stations which are actually provided within a given physical embodiment, is merely a choice of design.

As a two-player machine is here being illustrated, the base 4 is provided with a pair of coin acceptor panels 18 and 20, each containing coin receiving slots 22 and 24 appropriately disposed in front of each of the player control and indicia panels 6 and 8. The coin slots 22 and 24 may be configured to accept either quarter or dollar coins and the horse race machine 2 is configured to accept up to and including twenty coins per wager made on a given race. Thus, up to twenty coins may be placed within the coin slot 22 or 24 for each win bet, place bet, or show bet made while the more exotic wagers associated with Quinella or Pick-Five are of limited amounts.

Similarly, the base is provided with coin return and pay out chambers 26 and 28 associated with each player station. As shall be readily appreciated by those of ordinary skill in the art, each coin acceptor slot 18 and 20, and the coin return and pay out chambers 26 and 28 associated with each player station, is provided with a separate coin hopper and coin reservior or retaining moneys deposited in the horse race machine 2. The hopper mechanism is provided for purposes of returning coins which remain unbet upon the close of betting and/or providing pay outs in response to the placing of winning wagers. The coin reserviors provide appropriate temporary repositories for coins in amounts exceeding those desired to be retained in the coin hopper prior to their appropriate removal upon periodic maintenance of the horse race machine 2 illustrated in FIG. 1.

Additionally, the base 4 of the horse race machine 2 is provided with a separate door as indicated associated with each player station and a pair of security locks 30-33 are provided in each door to enhance the security of the device. The security locks 30-33 preferably accept only highly specialized keys to provide access to the interior of the base and the condition of these locks, as shall be seen below, is monitored to avoid tampering. The base 4 as indicated, is preferably of a secure, substantial construction so that the same does not readily admit of tampering or the like.

Furthermore, in addition to housing the various coin hopper and reservior compartments described above, certain of the electronic circuits employed within the instant invention may be disposed therein for appropriate access to servicing personnel. Thus, for instance, the video recorders, to be further described below, which provide the paddock scenes which are displayed on the video display 16 prior to the initiation of each race, as well as the horse races per se which are displayed, under program control, may be housed within the base 4, together with additional circuit components of the instant invention.

Video display 16 may take any of the conventional forms of this well-known class of device such as a CRT or the like, and since the same acts, as aforesaid, under program control in response to information produced by a video playback device, a conventional TV set may be used therefor. The video display 16 functions within the horse race machine to display paddock scenes such as horses being led to the starting gate and the like during intervals when the horse race machine 2 is activated and not otherwise engaged in displaying a race, and this typically occurs during such intervals as when the machine is merely awaiting a player's attention and when a player has deposited coins within the machine and is in the process of placing various wagers at the player control and indicia panels 6 and 8. Thereafter, as shall be seen below, further placement of bets is foreclosed and the video display 16 actually displays previously taped results of an actual horse race wherein the horse race selected, under program control, has horses which win, place and show in accordance with the selections resulting from random numbers selected under program control.

Figure 2A:
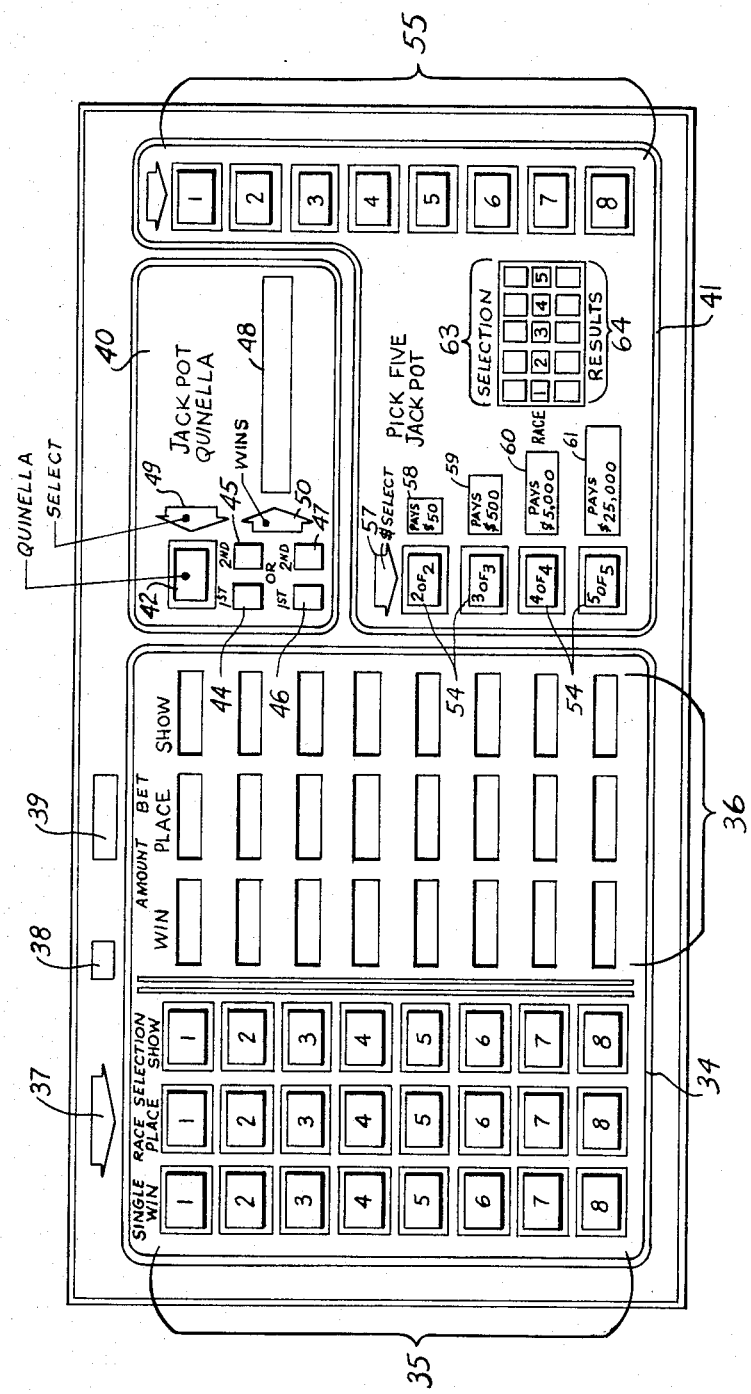

The player control and indicia panels 6 and 8 each take identically the same form wherein one of such panels 6 and 8 is provided at each player station. More particularly, as best shown in FIG. 2A, each player panel comprises a plurality of switch means wherein a player may make a win, place, and/or show selection for any of eight entries in a race as well as a plurality of indicia for indicating what bets have been made at each of these entries.

Additionally, the horse race machine 2 illustrated in FIG. 1 provides for specialized wagers herein referred to as Quinella and Pick-Five wagers and selection and display indicia therefor are also provided at the player control and indicia panels 6 and 8. The player control and indicia panels 6 and 8 are best illustrated in FIG. 2A and shall be described in detail in connection therewith.

The informational displays 10, 12 and 14 may take the conventional form of a CRT, LED, LCD or plasma displays which provide the player with typical tote board results displayed at a racetrack, with a plasma display being selected in certain embodiments of the present invention due to the similarity in appearance to tote boards which are utilized at racetracks and the like. The informational displays 10, 12 and 14 are best described in connection with FIG. 2B, however, it is here sufficient to appreciate that displays 10 and 14 are employed to set forth identical information, so that the same may be readily observed at each player station while the central informational display 12 is shared as the same is readily observable by a player at either station.

Such a configuration employing three informational displays could be employed in the embodiments of the instant invention employing up to four player stations while six informational displays would typically be utilized in the embodiments of the invention utilizing eight player stations. Each of the end informational displays 10 and 14 will, as shall be seen below, typically be employed to provide a list of the names of the eight horses running in the next race, their post positions, as well as the odds associated with their winning, placing or showing while the central informational display sets forth the results of the last race, and upon the initiation of a new gaming event the various player results associated with the current race therein.

Referring now to FIG. 2A, there is shown the details of the various switch inputs and other indicia which may be provided at a typical player control and indicia panel 6 or 8. Thus turning now to FIG. 2A, it will be seen that a player control and indicia panel may typically comprise a normal betting section 34 made up of a switch input array 35, a LED array 36 and various indicia 37-39, as well as a Quinella section 40, and a Pick Five section 41. While an exemplary player control and indicia panel is shown in FIG. 2A, it will be readily appreciated by those of ordinary skill in the art that various other configurations could be readily adopted without deviating from the concepts of the instant invention, and of course, should other gaming apparatus in accordance with the teachings of the instant invention be provided, the player control and indicia panels 6 and 8 would be reconfigured to accommodate the gaming conditions involved. Similarly, even in horse race machines the arrangement of switch inputs and indicia could be varied as a function of the designer's choice and various additional specialized wagers could be provided.

In the normal betting section 34 of the player control and indicia panels 6 and 8, the switch input array 35 may typically take the form illustrated of a three by eight array of push buttons or the like which are capable of being selectively illuminated under program control. More particularly, as illustrated in FIG. 2A, one column of push buttons is provided for win bets, one column of push buttons is provided for place bets, and one column of push buttons is provided for show bets. In addition, the switch input array 35 comprises eight rows of push buttons where each push button in a row is associated with a given one of eight entries in a typical horse race, and each push button in a row bears the number of the entry associated therewith on its face as indicated.

In typical operation of the device, a player wishing to bet the One horse to win, place and show would place up to twenty coins in the machine for each bet to be made, although up to 99 coins may be deposited at once, and thereafter depress each of the buttons in row 1 up to twenty times after depositing the appropriate number of coins for the bet then being made. Thus, a player could conceivably place twenty coins in the machine and depress the one row button in the win column twenty times to bet twenty coins on the One horse to win, thereafter deposit twenty more coins in the horse race machine and depress the row 1 button in the place column twenty times to bet the One horse to place, and again deposit another twenty coins in the machine and depress the one row button in the show column twenty times to again bet this horse to show. Further additional bets upon other numbered horses to win, place and/or show could then be made in the same manner until the player was satisfied with his win, place and show selections.

As shall be seen below, as each coin is deposited in the race horse machine, it is counted under program control and thereafter when a switch input in the switch input array 35 is depressed, the amount of money bet (one coin for each depression) together with the nature of the bet indicated by the switch input depressed is stored within a player device control block maintained under program control in memory for each player control and indicia panel therein.

The LED array 36 is arranged as indicated in FIG. 2A so as to correspond to the switch input array 35 in that a separate four digit indicia is provided for win, place and show for each of the eight entries in any given race. The LED array 36 is arranged in rows and columns so that a four digit display is provided for each indicia in the array. The indicia employed may be conventional LED devices, or alternatively, LCD, nixie tubes or other conventional forms of digit display devices may be employed. The manner in which the LED array 36 is operated under program control shall be described in greater detail below. Here it is sufficient to appreciate, however, that when a bet is made through the depression of one of the switch inputs in the switch input array 35, the amount bet is indicated in the appropriate row and column of the LED array 36 to indicate the amount of the bet made. Thus, if twenty dollars were wagered on the one horse to win, upon twenty depressions of the one switch input in column one and the entry of the appropriate information associated with the bet made in the control block, the row one, column one, LED display in the LED array 36 would be enabled to display a twenty dollar bet.

The indicia 37-39 also provided in the normal bet section 34 of the player control and indicia panels 6 and 8 are employed for various purposes to facilitate operation of the horse race machine or for the convenience of the player. Thus, the indicia 37 may be illuminated with each of the switch inputs in switch input array 35 when coins are to be deposited in the horse race machine and the illuminated indicia 37 may bear the legend "Press Bet Buttons" or the like. Similarly, the indicia 38 may conveniently take the form of an LED display providing additional information to the player, for instance, the LED display 38 may be employed to indicate to a player the number of coins deposited and not bet. The display 39 may take the form of an illuminated indicia and indicate to the player that a Start Race Button should be depressed. This information is provided to these indicia under program control as a function of the count from the hopper and information stored in the player control block.

The Quinella section 40 is a specialized wager wherein a player, may bet one dollar and win a jackpot if the two horses in the next race displayed having the highest odds finish that race in first and second place, i.e., the horse having the highest odds in that race must finish the race in first or second place, while the horse having the second highest odds in that race must also finish in first or second place, it being noted that it does not matter which horse finishes first and which horse finishes second. The Quinella wager is made by a player by the insertion of one dollar in the horse race machine and by a depression of a switch input 42 which again may take the form of a button input which may be selectively illuminated. Upon entry of the wager, the Quinella wager for that player station is inserted, under program control, in the player device control block maintained for that player station. The post positions of the horses which must finish first and second are indicated in the single digit LED indicia 44-47 wherein LED indicia 44 lists the horse for the next race having the highest odds, and LED indicia 45 lists the horse in the next race having the next highest odds in first and second place respectively, while LED indicia 46 and 47 list the reverse order thereof.

Additionally, the amount of the jackpot which can be won upon a successful Quinella bet is set forth in a seven digit LED display 48. The amount of the jackpot is independent of the Quinella bet in that the same is incremented by a fixed percent as a function of money wagered in the course of the machine's operation and the same is allowed to accumulate until some player has made a successful Quinella bet. Thereafter, the jackpot is again started at some fixed amount and allowed again to accumulate. While the percentage associated with the amount of accumulation of the jackpot for the Quinella may vary as a function of designer choice, this might typically be chosen to be approximately one percent of each bet made.

The indicia 49 and 50 are merely illuminated panels set forth to assist a player in the operation of the device. Thus, the indicia 49 may typically take the form of an illuminated panel having the word Select thereon which points to the switch input for the Quinella button 42, while the indicia 50 would similarly take the form of an illuminated panel having the word Wins or the like scribed thereon and pointing to the LED indicia 48 which displays the amount of the jackpot as aforesaid.

The Pick-Five section 41 of the player control and indicia panel is again a specialized section wherein a player is allowed to make a maximum bet, for example, two dollars, and to attempt to select either the next two winners in the next two succeeding races, the next three winners in the next three races, the next four winners of the next four races or the next five winners of the next five races. If successful, the pay out will vary as a function of the number of winners out of the number of next successive races selected, it being noted that all winners for all of the races must be correctly selected. Thus, if the player elects to choose the next two winners out of the next two races, a typical pay out for the two dollar bet might be fifty dollars as indicated, while for the proper selection of five winners out of the next five races, a typical pay out might be twenty-five thousand dollars as indicated.

To select a Pick-Five wager, switch input arrays 54 and 55 are provided in the manner indicated in FIG. 2A wherein each of the switch input arrays 54 and 55 may take the conventional form of selectively illuminated push button inputs of the type described as aforesaid. The switch inputs 54 are provided for the operator to select the nature of the Pick-Five input in the manner indicated on the face of each of the switch inputs 54. Thus, the switch input 54 annotated Two of Two will select a Pick-Five wager where the player opts to pick the next two winners of the next two races, the switch input annotated Three of Three selects a wager where the player elects to chose the next three winners of the next three races, the switch input annotated Four of Four defines a wager where the player elects to select the next four winners of the next four races and finally the switch input annotated Five of Five defines a wager where the operator elects to pick the next five winners of the next five races.

The switch inputs 55 are again button inputs capable of selectively being illuminated under program control and are annotated with the post positions of the horses racing. The switch inputs 55 are employed to select what the player views as the winning horses in the number of races selected by the Pick-Five bet and are depressed in the order which the player views as appropriate to define the winning horse in each successive race. Thus, if an operator selects a Pick-Five wager as defined by the switch input 54 annotated Two of Two and feels that the One horse will finish first in the first race and the Fifth horse will finish first in the second race, he would deposit two dollars, depress the switch input 54 annotated Two of Two, and then depress the switch inputs 55 annotated One and Five in the order recited. When a player enters a Pick-Five bet, the nature of the Pick-Five bet as well as the order of the winning horses selected at the switch inputs 55 are stored in the player device control block associated with a given player station.

The indicia 57-61 are provided for purposes of player convenience and information. Thus, the indicia 57 may take the form of a lighted panel annotated select which points as indicated to the column of switch inputs 54 defining the various Pick-Five bets selected. The remaining indicia 58-61 may also take the form of illuminated panels which are annotated in the manner indicated in FIG. 2A with the amount that the successful Pick-Five bet as associated therewith by the proximate location of the switch input therefor will pay. Thus, as indicated in FIG. 2A, a successful Two of Two Pick-Five bet will pay an exemplary amount of fifty dollars, a successful Three of Three Pick-Five bet will pay an exemplary amount of five hundred dollars, a successful Four of Four Pick-Five bet will pay an exemplary amount of five thousand dollars, while a successful Five of Five Pick-Five bet will pay an exemplary amount of twenty-five thousand dollars.

Similarly, LED displays 63 and 64 are provided for player informational purposes and again may take the form of single digit LED displays operated under program control. The LED displays 63 indicate a player's selection of winning horses in association with each of the races of the Pick-Five bet selected and the LED displays 64 lists the results in terms of the winning horse in each race run. Intermediate the LED displays 63 and 64 is a panel conveniently annotated with race numbers 1-5 in sequence in the manner illustrated in FIG. 2A. Thus, if an operator deposits two dollars and selects a Five of Five Pick Five bet, by depressing the switch input 54 annotated Five of Five and thereafter selects the One horse to win in each of the five races by depressing the switch input 55 annotated One five times in succession, each of the LED displays 63 will have a one displayed therein. Thereafter, as each of the next five races occur, the winning horse for each race will be displayed in the LED display 64.

While the arrangement set forth for the player control and indicia panels 6 and 8 as shown in detail in FIG. 2A is viewed as highly convenient and providing an excellant man-machine interface for the horse race machine embodiment of the invention being disclosed herein, it will be appreciated that various other player control and indicia panel arrangements may be provided without deviating from the concepts of the instant invention. In addition, other specialized wagering events may be substituted or added to those generally indicated in FIG. 2A.

FIG. 2B shows the details of exemplary informational displays which may be provided in the embodiment of the gaming device shown in FIG. 1. Referring now to FIG. 2B, there is shown the details of informational displays 10, 12 and 14 which may be provided in the embodiment of the gaming device illustrated in FIG. 1. More particularly, each of the informational displays 10, 12 and 14 make take the form of a plasma display, as aforesaid, such as the Self-Scan II Display currently sold by the Burroughs Corporation of Detroit, Mich. While the manner in which the informational displays 10, 12 and 14 are driven, under program control, shall be described below in connection with FIG. 7, the purpose of FIG. 2B is to acquaint a reader with the nature of the information provided to a player thereon in specific relation to the embodiment of the racehorse machine 2 illustrated in FIG. 1.

As was described above, the two outside displays 10 and 14 will display identical information which, as illustrated in FIG. 2B, indicates to a player that "The Horses Are On The Track" and thereafter sets forth the post position, names and the odds for each horse listed to win, place or show for the next race to be run. The central display lists in the upper portion thereof the "Last Race Results" and sets forth in a win, place and show order, the post positions, names and what each horse paid where applicable for win, place and show in the last race run. In addition, in the lower portion of the central display 12 is listed the player results and totals for the last race run. Thus, it will be seen that for the case of a two-player station embodiment being discussed, Player One bet and lost the Quinella in the last race, Player One lost the first portion of his Pick-Five bet, Player One won forty-eight dollars on wagers made, and the display further indicates by the asterisk that the hopper was empty and the attendant must be called to provide a manual pay out to winning player number one.

Similarly, Player Two did not bet the Quinella and won the first of his Pick-Five sequence and won no other wager. Other than for the hand pay condition indicated at informational display 12, the informational displays 10, 12 and 14 will display this type of information each time a race has been completed and prior to the accepting of additional bets. In a case where a hand pay condition is indicated as shown in FIG. 2B, further wagers will not be accepted until the attendant has been called and provided a pay out to the winning player as indicated by the attendant's opening of the base of the machine through the security locks 30 and 32 and an actuation of the hand pay switch located within the base. This hand pay switch, which has not been illustrated in FIG. 1, will generate an interrupt, as shall be seen below, which clears the hand pay condition so that the racehorse machine is in an appropriate condition to proceed to the next race.

In any event, upon completion of the previous race, the informational displays 10, 12 and 14 will be in the condition shown until coins are entered into the system. When this occurs, the message "the horses are on the track" as appearing on informational displays 10 and 14 may be replaced with the message "place your bets". Thereafter, upon placement of the first bet, a given time interval such as one minute, may be indicated at the lower portion of each of the informational displays 10 and 14 and decremented each second to indicate to a player how much time remains before the next race is initiated at which time further bets will not be accepted. Additionally, the central display may be cleared in preparation for the race results and player results associated with the race which is about to be run, or alternatively, clearing may occur at the completion of the next race.

In addition to the information already described in association with the informational displays 10 and 14, further information may be displayed at the bottom portions of these plasma panels when appropriate. Thus, when the machine has been disabled a malfunction message may be displayed, or if the machine detects an impropriety in the coins being inserted, an additional appropriate message may be set forth. When all the betting information is entered at the player control and indicia panels 6 and 8 and appropriately displayed at the informational displays 10, 12 and 14, the system will accept various wagers by a player located at either station One or station Two until the one minute betting inverval has expired. Thereafter, no further bets will be accepted and the paddock scene being set forth on the video display 16 shown in FIG. 1 will be replaced by a video display of an actual horserace, or more particularly, portions thereof wherein the horses which win, place and show in that race correspond in post position to the horses which have been selected, under program control, in a manner to be described in greater detail below to win, place and show in the race for which betting has now occurred.

Upon completion of the display of the race being played back, the informational displays are updated, winning wagers are paid and the horserace machine is conditioned to accept further coins for wagers on the next race.

THE OVERALL SYSTEM DESCRIPTION:

Referring now to FIG. 3 there is shown a block diagram which schematically illustrates the overall apparatus contained in the embodiment of the invention depicted in FIG. 1. The exemplary gaming device which, in this case, takes form of a horse race machine, schematically illustrated in FIG. 3 comprises a microprocessor unit 70, a data and control bus 72, an address bus 74, a random number generator 76, a random access memory 78, a read-only memory 80, an interface decoder 82, a removable memory 84, informational displays 86-88, a unit identifier 90, a player station 92 and a video display 94. The microprocessor unit 70 may take any of the well-known forms of this conventional class of device such as a Z80 or Z80A CPU as available from Zilog Corporation, an 8080 or 8085 series processor as available from Intel Corporation or any of the other well-known forms of conventional processors, of this generation of devices may be used as well.

For purposes of the instant disclosure, it will be assumed that a Zilog Z80A CPU is employed to implement the function of the microprocessor unit 70 and hence the microprocessor unit 70 may be viewed as including a read/write memory, a plurality of general purpose, internal registers, a stack pointer permitting implementation of multilevel interrupts, subroutine nesting and simplified data handling as well as a refresh register for automatic refreshing of external memories. The microprocessor unit 70 will thus interface to the remaining portions of the system through an 8 bit data bus, a 13 bit control bus and a 16 bit address bus. In this manner, as will readily appreciated by those of ordinary skill in the art, data is received from the system as well as being provided to the system in the form of 8 bit parallel information, while address information is provided to the system in the form of 16 bits in parallel and control information is independently processed on a per line basis. Furthermore, while not indicated in FIG. 3, it will be apparent to those of ordinary skill in the art, that actual interfacing of data, address information and control information between the microprocessor unit 70 and the remaining portions of the system will generally be implemented through appropriate driver circuitry so that appropriate data levels can be maintained. In addition, while not shown herein an appropriate clock, in this case a 2 MHz clock, is provided to the microprocessor unit 70 as well as the remaining portions of the system from a conventional clocking source. While numerous ones of such clocks are well-known to those of ordinary skill in the art, a Vectron 16 MHz clock which is subsequently divided down by four may be employed for providing clock signals to the system.

The microprocessor unit 70 is connected in the manner indicated in FIG. 3 to the data and control bus 72 and the address bus 74 so that data, control and address information may be exchanged with the remaining apparatus illustrated in FIG. 3. The data portion of the data and control bus 72 may be viewed as comprising 8 parallel conductors which are connected to the microprocessor unit 70 through appropriate level circuitry, not shown, which would be bidirectional to accommodate data bytes being communicated along this bus. Similarly, as 13 bits of control information may be provided from and supplied to the microprocessor unit 70, the portion of the data and control bus devoted to said control information may be viewed as comprising 13 parallel conductors Similarly, the microprocessor unit 70 is connected to the address bus 74 and since address information supplied to this bus by the microprocessor unit 70, is 16 bits wide, i.e. address bits $IA_0$–$IA_{15}$, the address bus 74 may be viewed as comprising 16 parallel conductors.

In regard to the address bus 74, it should be noted, as indicated in FIG. 3, that direct communication with this bus is provided only for the random number generator 76, the random access memory 78, the read-only memory 80 and the interface decoder 82 as the peripherals employed within the apparatus illustrated in FIG. 3, as shall be seen in greater detail below, are selectively enabled as a result of chip enable signals provided by the interface decoder 82 and address bits $IA_0$ and $IA_1$. Therefore, connection of each of these peripherals to the poll address bus 74 has not been illustrated in FIG. 3.

The random number generator 76 is interconnected to the data and control bus 72 through the multi conductor cable 98 and to the address bus 74 through the multi conductor cable 100. The actual structure of the random number generator 76 will be described in detail in connection with FIG. 4, while the operation thereof in combination with the microprocessor unit 70 is set forth in a detailed manner in connection with the flow charts illustrated in FIGS. 5 and 6. Here, however, it is sufficient to appreciate that the random number generator 76 illustrated in FIG. 3 takes the form of a 16 bit counter arrangement which is clocked by a white noise source so that, in effect, the random number generator illustrated by the block 76 represents the hardware portion of the random generator set forth herein and the same functions to supply 16 bit, random numbers, in two passes to the multi-conductor cable 98 and the data portion ($D_0$–$D_7$ of the Data and Control bus 72) for further processing and subsequent use by the microprocessor unit 70.

As will be seen hereinafter, random numbers are employed within the apparatus illustrated in FIG. 3 for a plurality of purposes and hence, processing of raw random numbers generated by the random number generator 76 by the microprocessor unit 70 is appropriate for the purpose of checking the propriety of the random numbers generated, further randomizing such random numbers to further enhance the security associated with the instant invention and grinding down the 16 bit random numbers generated to an appropriate number of digits for the purpose for which a given random number is employed. Thus, random numbers between 1 and 10,000 are employed within the instant invention to select the winning and placing horse in each race which is to be displayed, random numbers between 0 and 127 are employed for the purpose of selecting names for the entries in each race, random numbers between 0 and 7 are employed for the purposes of scrambling odds once a given odds or probability table is selected, and random numbers between 0 and 2 are employed for purposes of selecting the probability table to be employed. Accordingly, it will be appreciated, that random numbers initially generated by the random number generator 76 are widely employed within the instant invention for a plurality of system functions and to this end a table of random numbers which have been already generated by the random number generator 76 and processed by the microprocessor unit 70 will be maintained in memory to insure immediate availability to the system upon a demand therefor. Similarly, due to the relatively extensive processing which employs such random numbers, a table of 5 races is generally also maintained in storage so that most on the fly processing or processing associated with a racing event then in progress is avoided.

It should be recognized at the outset, however, that the random number generator 76 is a relatively important part of the system illustrated in FIG. 3 in that it is through the use of the random numbers originated thereby that the integrity of the system from the standpoint of nonpredictability is insured while, at the same time, maximum player interest is insured through a presentation to the player of widely ranging initial conditions, all of which are fortuitously selected on the basis of random numbers generated. For example, prior to accepting any wagers, the gaming apparatus illustrated in FIGS. 1 and 3 will present a prospective player with the post positions, names and odds associated with winning, placing and showing of 8 entries in a race. For purposes of name selection, a list of some 128 names for entries are maintained in memory and the 8 listed for a given race are selected as a function of random numbers generated between 0 and 127.

Similarly, three separate and distinct probability tables would typically be maintained in memory for horse races having 8 entries and the probability of each entry would be set forth in each table in ascending order. Initially, the probability table for use in a given race and hence, that from which displayed odds for winning, placing and subsequently showing would be selected on the basis of a random number generated between 0 and 2. Thereafter, the post position and hence the probabilities in that table, as originally maintained in ascending order, would be scrambled to achieve a resulting display of post positions on the basis of random numbers which are generated in a range from 0 to 7.

Finally, the winner and placing horse of the race to be displayed to a player is selected on the basis of separate random numbers in a range of from 1 to 10,000, which are generated for that purpose. Thus, random numbers are generated and employed within the instant invention for purposes of selecting the probability table from which the win, place and subsequently the show odds for each entry is selected, random numbers are employed to scramble the individual probabilities as a function of post position, random numbers are further employed to select the names of the entries assigned to each post position, and finally random numbers are employed in selecting the winning and placing entry in each race to be run. Under these circumstances, it will be appreciated that the random number generator 76 both acts to insure the integrity of the gaming system set forth by the provision of a large number of random numbers whose randomness is assured, and, in addition thereto, player interest is peaked through the use of random numbers to establish a large variety of widely ranging initial conditions.

The random access memory 78 may take any of the well-known forms of this conventional class of device and acts in the well-known manner to store information supplied thereto through the data portion of the data and control bus 72 whenever the same is enabled. The random access memory is connected to the data and control bus 72 through the multi-conductor cable 102 and to the address bus 74 through which it is addressed through the multi-conductor cable 104.

As indicated in FIG. 3, the random access memory 78 may include 16K bytes of dynamic RAM configured through the use of eight 16K by 1 RAM memory chips such as are available from Zilog or comparable standard chips of this type as also available from Mostek, Intel, Hitachi and Motorolla. As only 16K bytes of RAM are here employed, it will be appreciated that only 14 address bits from the address bus 74 will be required for addressing the same in association with a reading or writing operation and that the amount of random access memory employed can be readily expanded. If, as indicated above, light 16K by 1 RAM chips are employed, the same would typically be addressed in parallel either directly from the address bus 74 or through an appropriate decoder and each 16K by 1 chip would provide one commonly addressed bit which is applied to the data portion of the data and control bus 72. In this manner each of the 8 RAM chips would be addressed in parallel to read or accept 8 bits in parallel from the data portion of the data and control bus 72 or to supply 8 bits in parallel thereto.

The nature of the information typically stored in the random access memory 78 will best be understood in conjunction with a description of the exemplary flow charts set forth herein and the detailed, annotated program listing attached hereto as Appendix A. Here it is sufficient to appreciate that most of the tables employed in processing data herein are established in the random access memory 78 and control block information maintained for each player station, as shown in Appendix B. In addition, detailed accounting information, also shows in Appendix B, concerning money in the hopper, the value of the jackpot and the like is maintained in the random access memory 78, as well as in the removable memory 84 under such conditions that this information is established in the random access memory 78 and is continually updated prior to and as a result of each race conducted. Thereafter, the thus updated accounting information in RAM is supplied to the removable memory 84 so that this memory may be employed in fact to initialize or reinitialize the system.

Furthermore, accounting information relevant to moneys in the coin reservoirs is maintained in RAM and read into the removable memory 84 so that this memory may be employed in fact to initialize or reinitialize the system. In addition, accounting information relevant to moneys in the coin reservoirs is maintained in RAM and read into the removable memory 84 at the completion of each race.

The read-only memory 80 may again take any of the conventional forms of this well-known class of device and, as indicated in FIG. 3 may here be viewed as comprising 16K bytes of ROM. Thus, conventional ROM, PROM or EPROM may be employed for the read-only memory 80 indicated in FIG. 3 and this device functions in the conventional manner in response to an address supplied through the address bus 74 and a read signal to read 8 bits of data previously stored therein on to the data portion of the data and control bus 72.

For purposes of the instant disclosure, the read-only memory 80 may be viewed as taking the form of four. 4K by 8 PROM chips such as are commercially available from Intel Corporation under chip designation No. 2732. The read-only memory 80 is connected through the multi-conductor cable 106 to the data and control bus 72 and through the multi-conductor cable 108 to the address bus 74. As will be appreciated by those of ordinary skill in the art, data read from the read-only memory 80 as 8 bits in parallel is supplied directly to the data portion of the data and control bus 72 in response to read enable signals set forth in the control portion of this bus. Information read from the read-only memory 80 may be addressed directly from the address bus 74 or alternatively, address information from this bus may be applied to a conventional PROM configurator as also available from the Intel Corporation which not only is capable of defining the 16K byte configuration herein described, but would readily allow expansion to 64K PROM chips when the same become commercially available by a modification of the jumpers employed.

The read-only memory 80 is employed for the purposes of storing the main program and basic sub-routines employed within the instant invention, as well as various tables such as probability tables, horse name tables, tables comprising the addresses of different races stored on video disk and the like, the triplet tables listing the win, place and show horse of each race recorded, and various other information of a permanent nature appropriate for operating the instant invention under program control. Obviously, information requiring periodic updating such as accounting information and the like is not maintained in the read-only memory 80. However, if the main program routine and subroutines employed within the instant invention do not require a full 16K bytes of read-only memory, the substitution of random access memory for a portion of the chips employed in the read-only memory 80 is entirely feasible. In fact, only 4K bytes of PROM is actually required within the read-only memory 80 illustrated in FIG. 3 and hence, the remaining portions of this memory may be reconfigured as RAM should such reconfiguration be desirable.

The operating programs according to the instant invention which are stored in the read-only memory 80 will be best understood in connection with the description of the illustrative program flow charts described hereinafter and a highly detailed understanding thereof is readily available to those of ordinary skill in the art from a perusal of the detailed program listing attached hereto as Appendix A.

The interface decoder 82 may take the conventional form of decoder device which acts in a well-known manner to produce a high on one of the outputs thereof in response to various addresses supplied to the inputs thereto. Thus, a conventional Intel 3205 decoder chip may be employed for this purpose. it being noted that only 7 of the 8 available outputs therefrom are here required. The purpose of the interface decoder 82 is to decode various addresses supplied thereto from the common address bus 74, i.e. $IA_2$-$IA_7$, and in response to an enable level supplied from the control bus to define one of seven peripherals being addressed. The outputs of the interface decoder illustrated in FIG. 3 are generally indicated as $\overline{CE_0}$-$\overline{CE_6}$ wherein $\overline{CE_0}$ and $\overline{CE_1}$ represent a decode of the player station interface, chip enable signal $\overline{CE_2}$ represents a decode of the removable memory interface control, $\overline{CE_3}$ represents a decode of the video disk controller interface, $\overline{CE_4}$ represents a decode of the display interface controller, and $\overline{CE_5}$ and $\overline{CE_6}$ represent a decode of the unit identification interface. The interface decoder 82 is connected through a conductor 110 to the control portion of the data and control bus 72 and through a multi-conductor cable 112 to the common address bus and it is through the multi-conductor cable 112 that address information to be decoded is received.

The removable memory 84 is connected through a multi-conductor cable 114 to a remote memory interface 116 which, in turn, connects through a multiconductor cable 118 to a removable memory interface controller 120. The removable memory interface controller 120, in turn is connected to the data and control bus 72 through a multi-conductor cable 122, to the address bus 74 through a multi-conductor cable 124 and to the $\overline{CE_2}$ output of the interface decoder 82 through the conductor 125. The removable memory 84 and the remote memory interface 116 will be described in greater detail in connection with FIG. 8 which is a block diagram schematically illustrating exemplary structure therefor. Here it is sufficient to appreciate that the removable memory 84 is basically an alterable memory, for example an EAROM, or the like which is updated with appropriate accounting information and other system initializing data at the end of each race or upon the occurrence of a power down condition so that a permanent record of the current status of the gaming apparatus illustrated in FIG. 3 is available.

The removable memory 84 may be temporarily removed from the gaming apparatus illustrated in FIG. 3 by maintenance personnel for updating the records of a central computer or the like which functions to monitor accounting information associated with a large number of gaming machines of the type illustrated in FIG. 3. Additionally, the removable memory 84 may be used by maintenance personnel each time the gaming equipment illustrated in FIG. 3 is serviced for purposes of removal to a central site whereupon a new removable memory, properly initialized, is entered into the gaming apparatus illustrated in FIG. 3 for purposes of reinitializing the machine at a status which corresponds to its status just prior to servicing, the status which occurred as a result of the servicing or the like. Finally, the removable memory 84 is employed within the system to reinitialize the same should a power down condition occur in that any time a power down condition is detected, a standby power supply such as a battery pack or the like is enabled for a sufficient period to cause the contents of the random access memory to be stored within the removable memory 84. Subsequently, upon a restoration of power, the contents of the removable memory 84 are, under program control, read back into the random access memory 78 so that processing may continue at a point subsequent to that at which the interruption occurred. The remote memory interface 116 merely acts as shall be seen in connection with FIG. 8 to interface data and control information received through the multi-conductor 118 to the removable memory 84.

The removable memory interface controller 120 may take the conventional form of a programmable, parallel input/output interface controller which provides compatible TTL interfacing between peripheral devices and the microprocessor unit 70. Since the microprocessor unit 70 has been specified as comprising a Z80/Z80A CPU, the removable memory interface controller 120 may take the form of a Z80/Z80A PIO as avialable from the Zilog Corporation.

While the removable memory interface controller 120 is not separately described herein as the same is viewed as unnecessary, this particular interface controller is frequently used within the instant invention and its structure will become familiar to a reader in connection with the detailed description of other peripheral devices. Here it is sufficient to appreciate that the removable memory interface controller 120 is basically a two port device which acts in response to address bits $IA_0$ and $IA_1$ supplied through the multiconductor cable 124 and a chip enable signal applied through the conductor 125 to selectively gate data and control information obtained from the data and control bus 72 to the remote memory interface 116 and the removable memory 84 and to receive data and interrupt information from the removable memory 84 and the remote memory interface 116 and to convey the same to the data and control bus 72. Thus, a detailed description of the remote memory interface 116 and the removable memory 84 will be obtained in connection with the description of FIG. 8 while the structure and operation of the removable memory interface controller 120 will become apparent to the reader upon a consideration of FIG. 8 as well as interface controller structure illustrated in connection with other of the figures herein.

The informational displays 86-88 may take any of the conventional forms of this well-known class of device which are capable of functionally displaying the information described in association with FIG. 2B. Thus, a plasma display, CRT, LED or LCD display arrangement could be employed; however, as was mentioned above, a plasma display is here preferred due to the similarities in appearance which the same exhibit with respect to tote boards commonly present at racetracks and the like. In addition, the relatively thin nature of such plasma displays represent an advantage in the physical assembly of the resulting apparatus. Thus, the informational displays 86-88 may be viewed as plasma displays and it may be noted that in an actual embodiment of the invention which was built and tested, Self-Scan II displays available from the Burroughs Corporation were employed for this purpose. Each of the informational displays 86-88 are interconnected through multi-conductor cables 127-129 to a display interface controller 131. The display interface controller 131 may take precisely the same form of two port programmable interface controller described in connection with the removable memory interface controller 120 and hence, for this purpose, a conventional Z80 PIO device available from Zilog or the like may be employed.

The display interface controller 131 is connected to the data and control bus 72 through a multi-conductor cable 133 and receives therefrom data and control information as further described in connection with FIG. 7. This data and control may then be selectively gated to one or more of the informational displays 86-87. In addition, the display interface controller 131 receives a $\overline{CE}_4$ signal from the interface decoder 82 through the conductor 134 as indicated. The chip enable signal provided to the display interface controller 134 acts to selectively enable the display interface controller 131 in response to address information supplied to the address bus 74 by the microprocessor unit 70 and decoded by the interface decoder 82 so that the same is responsive to contol and data information provided on the data and control bus 72 which is directed thereto. Additionally, as also indicated by the input annotated $A_0$ and $A_1$, address information associated with bits $IA_0$ and $IA_1$ from the address bus 74 are additionally supplied to the display interface controller 131 for purposes, as shall be seen below, of output port selection and control or data selection at the display interface controller 131.

The detailed structure and modes of operation of the informational displays 86–88 and the display interface contoller 131 are more fully described in connection with FIG. 7 of the instant specification as set forth below and in this regard, it may be noted that further details of the Z80 PIO as employed for both the display interface controller 131 and the removable memory interface controller 120 as well as the remaining interface controllers employed herein may be gleaned in association with that figure. Here, it is sufficient to appreciate that display information of the type described in association with FIG. 2B is supplied to the data and control bus 72 under program control as implemented by the microprocessor unit 70. The display interface controller 131 is addressed through address information gated on to the address bus 74 by the microprocessor unit 70 and subsequently decoded by the interface decoder 82 to cause such data and control information as is on the data and control bus 72 to be received by the display interface controller 131. This information subsequently gated to the informational displays 86–88 to result in a display of desired information as described in connection with FIG. 2B.

It also should be noted that while only three informational displays 86–88 are illustrated in FIG. 3, the processing structure set forth admits of the operation of up to six informational displays wherein data supplied to the data and control bus 72 may be selectively gated as a function of the control information provided to any one or all of such displays. Furthermore, periodic refreshing of the display is accomplished in the display device per se as a normal function of the device purchased, and hence, data supplied thereto through the data and control bus 7Z is merely that necessary to update the information which is to be displayed or changed. It may also be noted that the physical characteristics of the plasma displays employed allow a physical arrangement where displays are placed back to back so that in an eight player station embodiment of the instant invention, four player stations may be physically disposed on either side of the device with six displays arranged back to back so that three informational displays are provided for player convenience on each side of the embodiment configured.

The unit identifier 90 is a peripheral within the system which serves to identify the individual system to the microprocessor unit 70 so that appropriate serial number data may be maintained with accounting information for a particular device. In addition, the nature of the device as well as the security condition thereof may also be provided for use by the microprocessor unit 70. Thus, as generally indicated in FIG. 3, the unit identifier 90 acts to provide serial number information, player type information, i.e. a quarter or dollar machine and/or the number of player stations involved, as well as information associated with various door sensors and the like which may be employed to apprise the system whether or not tampering with the physical structure thereof is in progress.

The unit identifier 90 is interconnected through a multi-conductor cable 136 to the unit identifier interface 138 which is connected to the data and control bus 72 through a multi-conductor cable 140. Additionally, as indicated in FIG. 3, the unit identifier interface 138 receives chip enable signals on conductors 141 and 142 corresponding, as indicated, to address decodes from the common address bus 74 by the interface decoder 82.

A more detailed description of the unit identifier 90 and the unit identifier interface 138 will be set forth in connection with the description of FIG. 9. Here, however, it is sufficient to appreciate that the unit identifier peripheral functions within the instant invention to provide device serial number information and player type information to the data bus upon request of the microprocessor unit 70 so that the same may be appropriately stored in the random access memory 78 and the removable memory 84 with accounting information as well as being employed for calculation purposes in determining whether coins deposited and wagered are quarter or dollar coins, and hence, resulting pay outs which may be associated therewith. Furthermore, as will be readily appreciated by those of ordinary skill in the art, any time the door is opened on the gaming equipment or tampering is initiated to a degree which will open any of a large number of microswitches disposed in appropriate relation to various panels which may be removed, this condition will be indicated by the unit identifier 90 and subsequently the security condition detected will be conveyed to the microprocessor unit 70 to cause an immediate disabling and shut down of the system under program control.

The player station indicated by the dashed block 92 comprises switch inputs 144, switch indicia 145, LED displays 146 and a player station interface 147 all as indicated in FIG. 3. Furthermore, as indicated in the figure, the dashed block 92 represents only a single player station within the system and that in other than single player station embodiments of the instant invention, additional player stations taking precisely the same form as structurally indicated within the dashed block 92 would be provided in a parallel relation. The switch inputs 144 and the switch indicia 145 illustrated in FIG. 3 physically correspond to the various switch inputs and the illumination means for such inputs as was described in connection with FIG. 2A and hence, the switch inputs 144 may be viewed as corresponding to the inputs received from the switch array 34, the switch input 42, as well as switch inputs 54 and 55 while the switch indicia 145 correspond to the means for illuminating each of these switch inputs all as generally described in association with FIG. 2A as well as the various additional indicia provided by way of annotated panels such as was also described in connection with FIG. 2A. While the various switch inputs 144, the switch indicia 145 and the LED displays 146 have been generally indicated in FIG. 3, for purposes of general description, their detailed interconnection within an individual player station will be described in detail in connection with FIGS. 13 through 17 of the instant specification.

The switch inputs 144, the switch indicia 145, and the LED displays 146 are each connected through multi-conductor cables 148-150 to the player station interface 147. In this regard, it should be noted that the multi-conductor cable 148 as indicated by the arrowheads associated therewith is a bidirectional cable allowing data flow in both directions since the switch inputs 144 as will be seen in greater detail in connection with FIG. 15 preferably takes the form of a scan NRO switch array. Thus control information from the player station interface 147 is received and information is also provided thereto in the form of data corresponding to switch closures and the like. Conversely, multi-conductor cables 149 and 150 are indicated as unidirectional in that only information corresponding to data to be displayed is received thereby from the player station interface 147.

The player station interface 147, due to the relatively large number of switch inputs, LED displays, and switch indicia controlled thereby is relatively complex and will best be understood in connection with FIGS. 13-17 as described below. Here, however, it is sufficient to appreciate that the player station interface 147 is connected through multi-conductor cables 152-154 and the single bit conductor 155 to control information, an interrupt line, address information and data supplied by the player station interface controllers 160 through the multi-conductor cables 156-159. In addition, as indicated in FIG. 3, additional player stations as configured in the manner indicated by the dashed block 92 would also be connected in a cascade manner to the player station interface controllers 160 through the multi-conductor cables 156-159.

In response to the control, address and data information supplied from the player station interface controller 160 through the multi-conductor cables 156, 158 and 159, switch indicia and LED displays, as illustrated in FIG. 2A, are selectively actuated to display desired information. In addition, the receipt of input information from the switch inputs 144 initially results in an application of an interrupt through the conductor 155 and the multi-conductor cable 157 and thereafter, when such an interrupt is serviced by the microprocessor unit 70, the data associated with the switch input interrupt which has been generated is conveyed through the multi-conductor cables 148, 154 and 159 to the player station interface controllers 160 for subsequent application to the data and control bus 72. It should be noted, however, in regard to the address information supplied from the player station interface controllers 160 through the multi-conductor cable 158 and the multi-conductor cable 153 that such address information as is here conveyed does not result from a decode of address information on the address bus 74 but as shall be seen in greater detail in connection with FIG. 12, such address information as is here developed results from a decode of information placed on the data bus through operation of the microprocessor unit 70. The player station interface 147 additionally receives, as indicated by the inputs thereto annotated $IA_0$ and $IA_1$, address bits $A_0$ and $A_1$ from the address bus 74.

Figure 11:
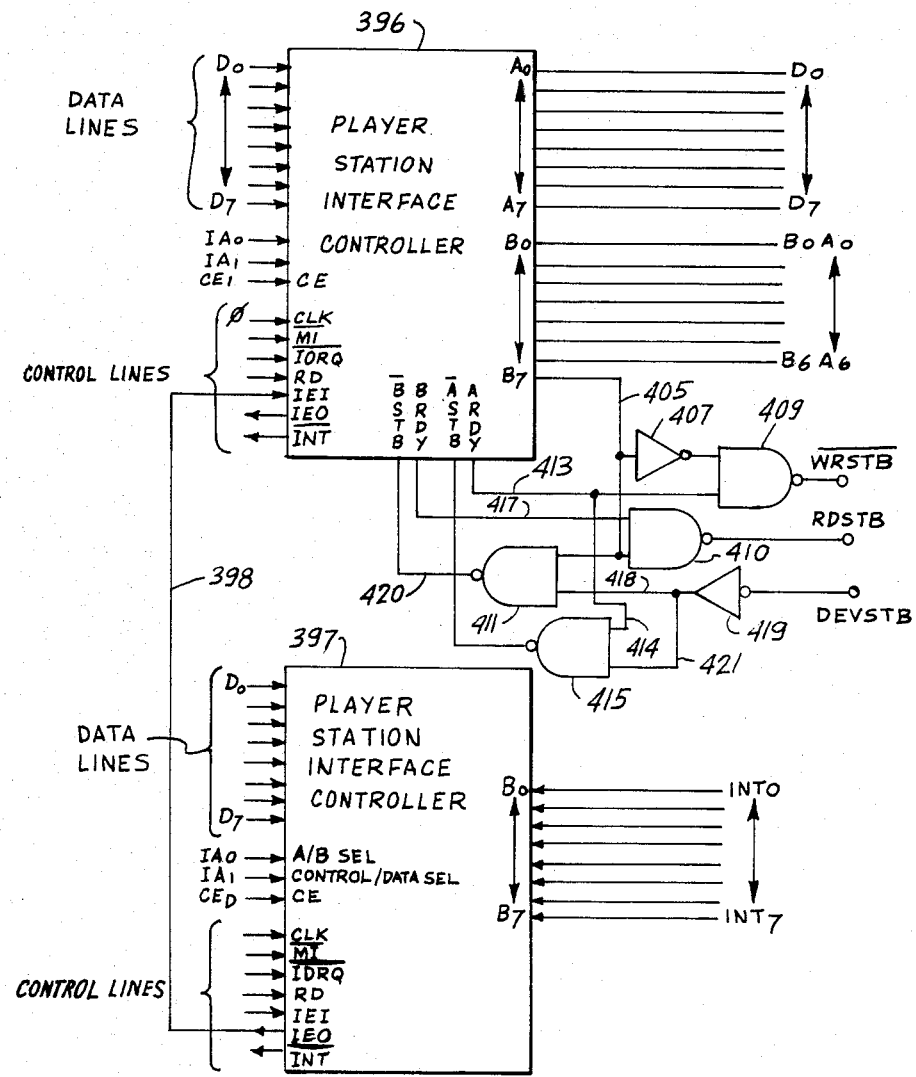
FIG. 11 is a block diagram schematically illustrating details of an exemplary player station interface controller arrangement as shown in FIG. 3.
Figure 12:
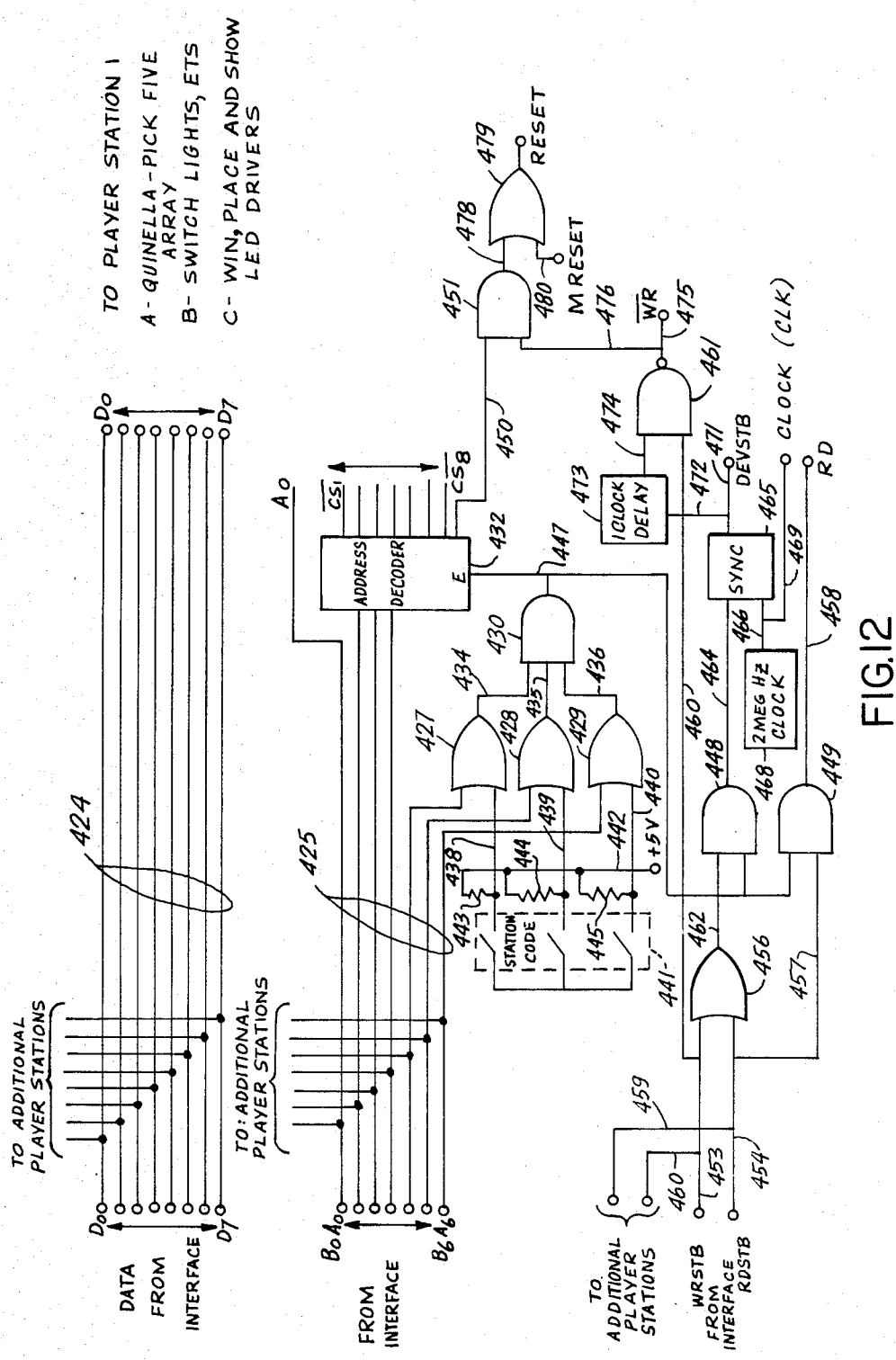
FIG. 12 is a block diagram schematically illustrating exemplary structure for a player interface such as the player station number 1 interface shown in FIG. 3.

The player station interface controllers 160 are connected to the data and control bus 72 through the multi-conductor cable 162 and additionally receive decodes of address information on the address bus 74 from the interface decoder 82 as indicated by the chip enable inputs $\overline{CE_0}$ and $\overline{CE_1}$ supplied thereto on conductors 164 and 165. The player station interface controllers 160 as shall be seen in greater detail in connection with FIGS. 11 and 12 are somewhat more complex than the remaining peripheral controllers employed within the exemplary embodiment of the instant invention being described as a great deal of information must be conveyed between each player station and the interface, and up to eight player stations may be separately controlled thereby. Thus, under these circumstances, a pair of Z80-PIO programmable interface controllers are employed for this purpose in connection with chip select and timing logic illustrated in FIG. 12. Here, however, it is sufficient to appreciate that the player station interface controllers 160 serve to receive and indicate to the microprocessor unit 70 interrupts generated through the depression of individual ones of switch inputs 144 at each player station. Upon an acknowledgement and servicing of the interrupt generated, data is provided indicative of the nature of the interrupt generated or the switch depressed through the multi-conductor cables 154, 159 and 162 and the data and control bus 72 for inspection and processing by the microprocessor unit 70 and generally for subsequent storage in the player station control blocks maintained in the random access memory 78.

Conversely, data, control and address information initially placed on the data and control bus 72 and the address bus 74 in response to functions of the microprocessor unit 70 result in the application of data, address and control information to the player station so that appropriate switch indicia 145 and LED displays 146 are caused to display desired information as was explained in connection with FIG. 2A. Thus, typically at each player station the system is initialized under program control and certain switch indicia and LED displays are illuminated to place the player and control panel illustrated in FIG. 2A in condition to attract and accept the attentions of a prospective player. When the player deposits coins at the player station, the insertion of such coins is detected by the switch inputs 144 and indicated to the microprocessor unit 70 through the action of the player station interface and the player station interface controllers 160. Appropriate LED displays are then supplied with data to display appropriate indicia indicating the amount of the coins which have been inserted and are yet unbet.

Thereafter, as each switch input is depressed by a player making selective wagers, this information is conveyed to the microprocessor unit 70 through the action of the player station interface 147 and the player station interface controllers 160. These bets too are stored in the random access memory 78 and the system appropriately responds thereto via the illumination of various LED displays 146 until such time as no further bets are accepted. Thereafter, bets associated with the actual selection and display of a horse race are initiated under program control and upon the completion of the race, the LED displays 146 are again updated where appropriate to indicate successful or unsuccessful wagers, successful wagers are paid through the selective action of the coin hopper associated with the switch inputs 144 and thereafter the system may be reinitialized for purposes of again accepting the attentions of a player.

The detailed function of the player station indicated by the dashed block 92, and the player station interface controllers 160 will be described in detail in connection with FIGS. 11-17 while its operation, under program control, will be best appreciated in connection with the flow charts illustrated in FIGS. 18-22 and the detailed program listing attached hereto as Appendix A.

The video display indicated by the dashed block 94 includes a video display 167 in the form of a conventional television set or the like, first and second video playback devices 168 and 169 and switch devices 170 and 171. The video display 167 in the form of a conventional T.V. set or the like is connected through the switch devices 170 and 172 to the first and second video playback devices 168 and 169 in such manner that the output of either the first or second video playback device 168 or 169, comprising both video and audio, may be selectively applied thereto. The first and second video playback devices 168 and 169 may take any of the conventional forms of this well-known class of device, for instance, video disk playback devices or video recorders may be employed. Alternatively, as will be readily appreciated by those of ordinary skill in the art, movie projection apparatus may be substituted for the first and second video playback devices 168 and 169 and under these circumstances, the video display 167 may take the form of a rear screen projection system or the like. Similarly, while a conventional television set has been mentioned for use as the video display 167, conventional television projection systems may be similarly employed should it be desired to provide substantial images.

While any suitable form of video reproduction system may be employed for the purposes of the first and second video playback devices 168 and 169, conventional video disk recorders are preferred for this purpose due to the high reliability and fast search speeds associated therewith and the fact that the first and second video playback devices 168 and 169 are in constant use when the instant invention is operating. Thus, for instance, in an actual embodiment of the instant invention which was built and tested, the first and second video playback devices 168 and 169 each took the form MCA Discovision video disk playback devices as available from Discovision Associates.

This form of video disk recorder is an intelligent device which is viewed as highly desirable in that the same is programmable, accepts approximately 54,000 frames per disk, exhibits independent search capabilities which are sufficiently fast so that even under worse case conditions any frame number may be located within five seconds and is capable of accepting rudimentary programs so that the same, on command, may be caused to idle in a loop wherein a predetermined number of frames are continuously played and replayed. In essence, as shall be seen in somewhat greater detail below, portions of some 56 races including a start, an interim portion and a finish of each race, have been recorded under such circumstances that each race has a different combination of horses finishing first and second. Approximately half of these races are recorded on each video disk and each video disk has, in addition thereto, the same paddock scene recorded thereon so that the same scene wherein horses are being led about the paddock and toward the starting gate may be reproduced by either of the first and second video playback devices 168 and 169.

An address for the beginning and end of each race together with a triplet indicating the winning, placing and showing horse number in that race is maintained as a table within the read-only memory 80 so that any race may be defined by its beginning frame number and its ending frame number in the form of five digit codes.

Each of the first and second video playback devices 168 and 169 will respond to play, stop, and search a frame instructions in the form supplied by the manufacturer, and is programmed so that upon appropriate command the unit will constantly idle within a given loop whose beginning and ending frame numbers are specified.

Furthermore, each video playback device is sufficiently intelligent so that upon receipt of a search command together with an appropriate five digit frame number, the playback device will automatically search for the defined frame and merely provide a ready signal back to the microprocessor unit 70 when the search has been completed. Similarly, once the appropriate starting frame has been found, each video playback device will accept a play instruction together with a frame number and autostop instruction and respond thereto to play from its present location to the frame number designated with the autostop code and then automatically stop and advise the microprocessor unit that the playback operation specified has been completed.

In the program mode, a program is loaded in each video playback device which specifies an initial frame and a search code, an ending frame and an autostop code, and in addition a zero branch is provided which takes it back to the beginning portion of the program defining the initial frame designation and the search code. Thereafter, in response to a run command issued by the microprocessor 70, the video playback device will execute the program by searching for the initial frame, playing back from the initial frame to the ending frame associated with the autostop code and thereafter repeating this sequence until a new instruction, such as a search code, is received.

Common paddock scenes are recorded on disks loaded at both the first and second video playback devices 168 and 169 so that the paddock scene may be played from one of the video playback devices while a search is being conducted at the other for the race which is to be played and conversely at the end of the race being played back from one video playback device the paddock scene may be replayed from the other video playback device while the video playback device which originally played the race is conditioned to search for either the paddock scene or the next race to be played if the same is present thereon. The switch devices 170 and 171 may comprise relay actuated switching devices which enable video and audio information to be applied to the video display 167 from either of the first and second video playback devices 168 and 169 under program control.

In operation of the video display indicated by the dashed block 94, it will be appreciated that the video display 167 is normally displaying the paddock scene being played back from one of the first and second video playback devices 168 or 169. This will continue normally prior to attention by a player, after a player deposits coins in the machine and until such time as the betting interval has expired. The video playback device which is employed in reproducing the paddock scene will not be the one whose disk contains the next race to be played. This is simply achieved since the winning and placing combinations for the next five races to be played are normally maintained in table form in memory so that selection of an appropriate video playback device for playback of the paddock scene by the mircoprocessor unit 70 is not ordinarily a problem.

However, should the playback of the paddock scene be occurring from a video playback device which has the race recorded thereon which is the next to be played, the other video playback device will be caused to search for the initial frame of the paddock scene by the forwarding of a five digit frame address and a search code thereto and upon the indication thereby that the appropriate frame has been found, a run command will be issued thereto and the switch devices 170 and 171 will be changed, under program control, to cause playback to continue from the other video playback device. Furthermore, a viewer of the video display 167 will barely notice more than a slight flicker of the image being displayed so that the flip-flopping of the video playback devices in this manner in hardly discernable.

Once reproduction from the appropriate video playback device is obtained, and during the interval when wagering is permitted, the microprocessor unit 70 will issue instructions to the video playback device which is not being employed for the paddock scene to search for the initial frame number of the race which is to be played. Upon receipt from that video disk unit that the appropriate frame has been found, no further instructions will be issued by the microprocessor unit 70 until the betting interval has been closed. Thereafter, a playback command coupled with a five digit instruction defining the last frame and an autostop code will be issued to the video playback device which has not been employed for playing back the paddock scene and the switch devices 170 and 171 will be changed in position to accommodate playback from the other video playback device. Thereafter a race will be displayed wherein the winning and placing horses of the race selected have the post positions which have been determined by the device as the winning and placing post positions for the race determined under program control. The show position is derived as a function of that recorded on the video disk for the winning and placing combination selected as only 56 races are recorded.

Upon the completion of the race played, winning wagers and the like are automatically paid under program control. A flip-flopping of the first and second video playback devices 168 and 169 would also typically occur together with a changeover of the switch devices 170 and 171 and an issuing of a run command to the appropriate video playback device so that a playback of the paddock scene at the video display 167 could again occur.

Each of the first and second video playback devices 168 and 169 is connected through multi-conductor cables 174 and 175 to the video disk controller interface 176. The video disk controller interface, in turn, is connected through the multi-conductor cable 177 to the data and control bus 72 so that data and other commands issued by the microprocessor unit 70 may be appropriately communicated thereto and decoded into control, address and data for specifying a particular frame number and function code to each of the first and second video playback devices 168 and 169. Additionally, as indicated by the conductor 178, the video disk controller interface 176 receives decoded address information in the form of a $\overline{CE_3}$ signal from the interface decoder 82 as well as address bits $A_0$ and $A_1$ from the address bus as indicated by the inputs thereto annotated $IA_0$ and $IA_1$.

The video disk controller interface 176 is described in greater detail in connection with FIG. 10, however here it is sufficient to appreciate that the video disk interface controller 176 may again be formed by a Z80-PIO programmable interface control which is employed to accept data and control information from the data and control bus 72 and translate the same into appropriate data and handshaking information for the first and second video playback devices 168 and 169. In addition the controller interface 176 receives interrupts generated by the video playback device 168 and 169 indicative that said first and second video playback devices have successfully completed a previous instruction and serves to communicate the same to the microprocessor unit 70.

While the block diagram shown in FIG. 3 has been depicted in relatively specific form, it will be appreciated by those of ordinary skill in the art that many variations in the structure described will be readily available to those of ordinary skill in the art through the exercise of ordinary skill. Furthermore, while a relatively limited number of peripherals have been described, many additions to those shown and described are available and those selected will vary as a function of the manner in which the gaming equipment illustrated is to be used, as well as the environment associated with such use.

Thus for instance, if the embodiment of the gaming equipment described herein is employed in a large casino where several of these devices are utilized, external bus drivers and receivers may be connected to the data and control bus for purposes of interfacing the same to a host computer for maintaining continuous accounting information on each of the machines. Similarly, in smaller installations, a communications feature may be connected through the data and control bus 72 for purposes of communicating information to a remotely located computer for record keeping purposes and the like. Specific details of the peripherals illustrated for the embodiment of the invention depicted in FIG. 3, as well as the details of the modes of operation implemented under program control, will be provided in the course of the discussion of the remaining figures.

THE RANDOM NUMBER GENERATOR

Referring now to FIG. 4 there is shown a block diagram schematically illustrating an exemplary structure for an embodiment of a random number generator according to the present invention and suitable for incorporation into the embodiment of the gaming device illustrated in FIG. 3. The random number generator illustrated in FIG. 4 comprises a multi-channel counter 180, a white noise generator 182 and a decoder 184. The multi-channel counter 180 may take any of the well-known forms of this conventional class of device which in effect provides structure therein having at least two, or alternatively four, 8 bit counters capable of shifting the state of the count therein by one increment each time a clock pulse is received.

Furthermore, the multi-channel counter 180 is here configured so that two of the 8 bit counters therein are serially connected to provide a 16 bit counter of which at least 14 bits are effectively used to provide the ability to establish a count up to and including 10K. In the case of an embodiment of the instant invention which was built and tested, a Z80/Z80A CTC counter timer circuit, which is a programmable four channel device, was employed for use as the multi-channel counter 180. This device is available from the Zilog Corporation and, as will be apparent to those of ordinary skill in the art, is configured to readily interface with the microprocessor unit being here employed.

While a multi-channel counter 180 has been illustrated in FIG. 4, it will be appreciated by those of ordinary skill in the art that two serial connected 8 bit counters could also be employed provided the same were configured so as to overflow to a zero or reset state each time a 10K count condition is obtained. Additionally the output thereof should be selectively readable to the data and control bus 72 upon command. As a 16 bit output is here employed, it will be appreciated by those of ordinary skill in the art that the output of the counter employed is read to the 8 bit portion of the data and control bus 72 in two 8 bit passes.

The output of the multi-channel counter 180 is connected to the data portion of the data and control bus 72 through an 8 bit cable 185 while control information is provided from the control portion of the data and control bus 72 through the multi-conductor cable 186. Additionally, addressing information for the counter channels selected is provided to the multi-channel counter 180 from the portion of the address bus carrying address bits $A_0$ and $A_1$ as indicated by the conductors 188 and 189.

A chip enable input is supplied to the multi-channel counter 180 from the output of the decoder 184 through a conductor 190 while the clock input is directly supplied to channel two of the multi-channel counter 180 from the white noise generator 182 through the conductor 191. Furthermore, as shall be apparent to those of ordinary skill in the art, the clocking input from the white noise generator 182 is also supplied to the clocking input of channel three of the multi-channel counter 180 by tying the clock input thereto to the channel two zero count or time out output $ZO_2$ as indicated by the conductor 192.

The decoder 184 may take any of the well-known forms of this conventional class of device which acts to examine the content of the input supplied thereto and to produce an enable level at the output thereof connected to conductor 190 whenever a predetermined content is present. In the case of the decoder 184, the decode which takes place is of address bits $A_2$–$A_7$ from the address bus 74 as applied thereto on the multi-conductor cable 194 in the manner indicated. Additionally, an enable level is supplied to the decoder 184 from the control bus and may be provided directly as a result of control information supplied by the microprocessor unit 70 or as a further decode of address information on the address bus. At any rate, as will be appreciated by those of ordinary skill in the art, whenever the multi-channel counter 180 is enabled by the output of the decoder 184, clock pulses supplied thereto on conductor 191 will be counted thereby and the multi-channel counter 180 may be selectively read upon the provision of an appropriate read signal on the multi-conductor cable 186 to the data portion of the data and control bus 72 through the multi-conductor cable 185.

Furthermore, since counting is here occurring in only channels two and three of the multi-channel counter 180, reading of the contents of each counter in two 8 bit passes will occur as a function of the address information supplied to the multi-channel counter 180 through the input conductors 188 and 189 since this two bit input, acts as will be readily appreciated by those of ordinary skill in the art, to define each of the four counter channels therein, i.e. counter channels 0–3.

The white noise generator 182 may take any of the forms of this well-known class of device which is capable of producing broadband white noise in a random sequence. For instance, a National Semiconductor MM5837 digital noise source may be employed which, acts to produce broadband noise signals for audio applications and the like. This particular white noise generator outputs a varying frequency in the audio spectrum which ranges from about 20 Hz to 56 KHz varying in a random manner to produce outputs of varying frequency uniformly distributed over the 20 Hz to 56 KHz range. The output of the white noise generator 182 is supplied directly through the conductor 191 to the clock input of channels two and three of the 16 bit counter established within the multi channel counter 180. The channel two and channel three 8 bit counters within the multi-channel counter 180 are connected so that clock pulses supplied thereto will normally act to downcount or decrement the counter arrangement set forth and the two counters are interconnected in such manner such that when a zero count is achieved, the counters will overflow to a 10,000 count upon the next clock pulse.

The multi-channel counter 180 is normally enabled whenever random numbers are desired by the output of the decoder 184 which may comprise an Intel 3205 decoder chip. Random numbers obtained from the multi-channel counter 180 after appropriate processing, as further described below, are normally stacked in a table having an input and output pointer so that a large number of appropriately processed random numbers are always available to the system.

In operation of the hardware portion of the random number generator illustrated in FIG. 4, it may be assumed that whenever the multi-channel counter 180 is initially enabled by the output of the decoder 184 on conductor 190, the same is reset to a maximum count or a 10K count condition by a reset pulse supplied thereto by the multi-conductor cable 186. Thereafter, it is down-counted by the randomly varying clocking pulses supplied thereto on conductor 191 by the white noise generator 182 which, in the exemplary case here being described will vary, as aforesaid, from 20 Hz to 56 KHz in a manner which is uniformly distributed over the range. As each clock pulse is supplied to the multi-channel counter 180, the same is downcounted and whenever a zero count condition results, the pair of counters being employed will overflow to a maximum or 10K count condition upon the receipt of the next clock pulse from the white noise generator 182 whereupon the sequence will again continue.

Thus, at any given time random numbers may be obtained as an output from the multi-channel counter 180 upon a reading of the state of the count therein. The count is read upon the receipt of a read signal on the multi-conductor cable 186 to the data portion of the data and control bus 72 through the multi-conductor cable 185. As the outputs of two 8 bit counters are employed for the 14 bits necessary for a 10K maximum count, the reading of the multi-channel counter 180 occurs in two 8 bit passes as defined by the address inputs applied to the multi-channel counter 180 through the conductors 188 and 189.

The manner in which random numbers are read from the multi-channel 180 and further processed is explained in detail in connection with the flow charts illustrated in FIGS. 5 and 6. However, a general understanding of the techniques employed may be gained from an appreciation that a variable counter is additionally established to control the timing as to when random numbers are read from the multi-channel counter 180 for further processing. This is done so that random numbers may be read from the multi-channel counter 180 at random times so that not only are random numbers established in the multi-channel counter 180 by the random startup of the white noise generator 182 and incremented at the random frequencies associated therewith to ensure that counting in the multi-channel counter 180 starts and continues at a random rate, but in addition thereto, random numbers are read from the multi-channel counter 180 at random intervals to further insure the randomness thereof.

More particularly, the variable counter takes the form of an 8 bit counter which is clocked every 16 milliseconds. Whenever the state of the 8 bit counter reaches zero, the random number then present in the multi-channel counter is read out and further processed. The variable counter established may take the form of a software counter established in RAM under program control or alternatively, as two counter channels remain available in the multi-channel counter 180, one of these available counter channels may be employed. At any rate, the initial cycle of this counter is loaded with a maximum 256 count and then the same is decremented once every 16 milliseconds by a clock pulse. As shall be seen in connection with FIGS. 5 and 6, every 16 milliseconds the program checks to ascertain whether the state of the variable counter has been decremented to zero and if that condition is ascertained, the state of the multi-channel counter 180 is read in two 8 bit passes and the random number then present therein is further processed.

While initially the variable counter is loaded with its maximum count and downcounted to zero to obtain the first random number, thereafter the variable counter is loaded with an 8 bit portion of the random number read from the multi-channel counter 180. Thus after the initial pass, the variable counter is downcounted from an initial position which corresponds to the portion of the random number read from the multi-channel counter 180. This means, that all future readings of random numbers from the multi-channel counter 180 will occur at random intervals defined by a portion of the random number read from the multi-channel counter 180 during the preceding interval and hence, in this manner, reading of the multi-channel counter 180 also occurs at a random rate since if true random numbers are being generated by the multi-channel counter 180, each bit therein will be equally random.

Figure 5:
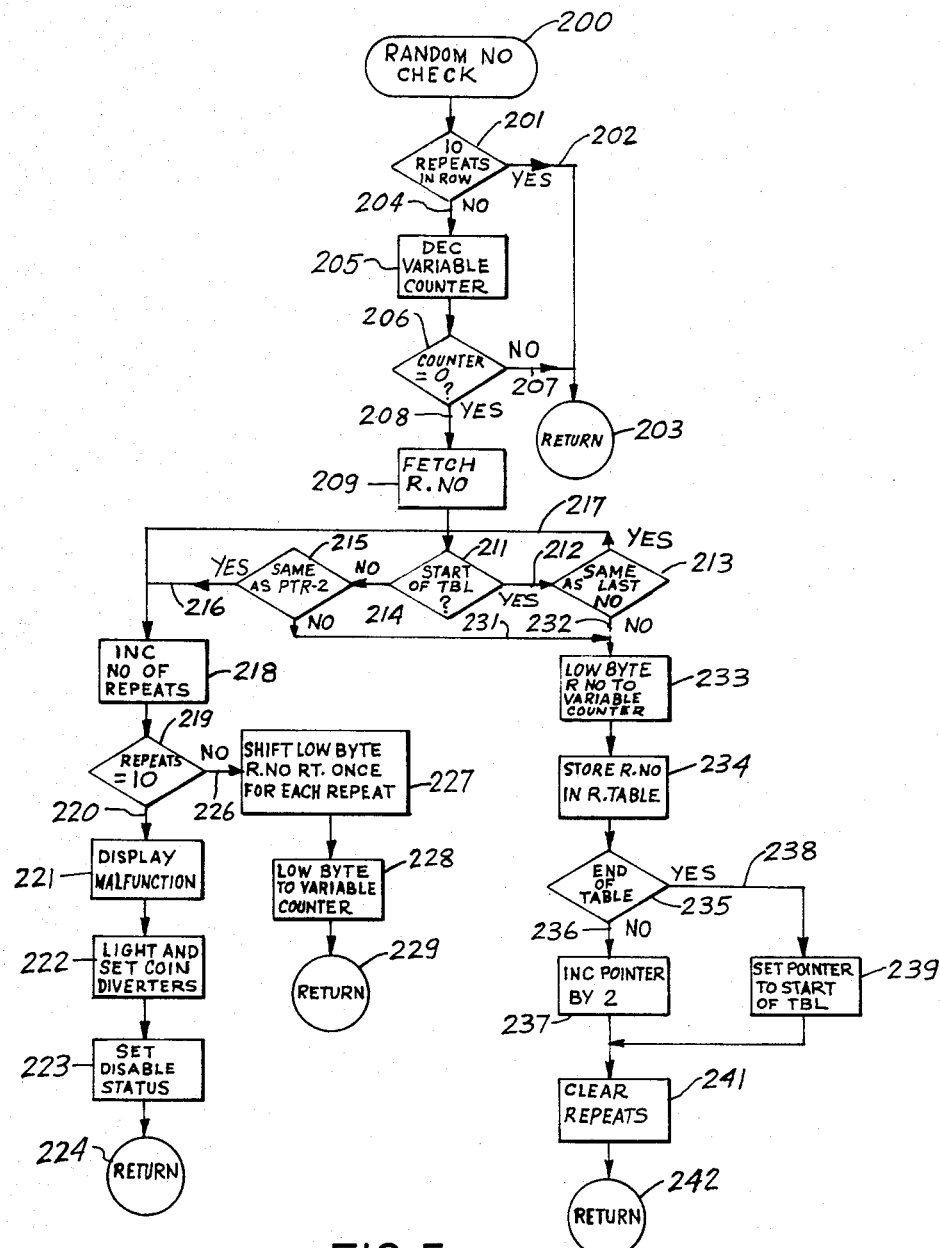
FIG. 5 is a flow chart illustrating a simplified program for checking the propriety of random numbers obtained from the random number generator shown in FIG. 4.

The manner in which random numbers read from the multi-channel counter 180 are checked is illustrated by the flow chart shown in FIG. 5 while the manner in which appropriately checked random numbers are further randomized using pseudo-random regeneration techniques is shown in connection with the flow chart depicted in FIG. 6. In essence, the random numbers generated by the multi-channel counter 180 are checked to insure the proper operation of the hardware portion of the random number generator illustrated in FIG. 4. More particularly, it will be seen that the state of the count in the multi-channel counter 180 and hence, the random number present therein at any given time is highly dependent upon the proper operation of the white noise generator 182. For instance, if the white noise generator locks on to one frequency or if the white noise source stops or otherwise if the various counters stop counting, then a predictable number will begin appearing at the output of the counters. Furthermore, if such predictable numbers should appear they may be predictable per se or by a factor of the base frequency and obviously, should this occur, a deleterious operating condition will occur since it will render the gaming event predictable so that the same can be beaten. Accordingly, the software routine illustrated in connection with the flow chart shown in FIG. 5 acts to define when the random number should be read from the multi-channel counter 180 and thereafter proceeds to check the propriety of that number to insure that a malfunction has not occurred in the hardware portion of the circuit.

Referring now to FIG. 5, there is shown a flow chart illustrating a simplified program for reading the output of the multi-channel counter 180 and for checking the propriety of random numbers obtained from the random number generator illustrated in FIG. 4. The subroutine is entered each time the 16 millisecond clock employed for the purposes of decrementing the variable counter is generated. The subroutine, as indicated in FIG. 5, is entered at the location indicated by the oval flag 200 annotated random number check. Upon entry of this routine, as indicated by the diamond 201, the program initially checks to ascertain whether or not 10 repeats of a random number have occurred. As shall be seen below, a counter is maintained for the purposes of counting the number of repeats in succession of the random number read from the multi-channel counter 180 and each time a repeat occurs the counter is incremented. Any time 10 repeats occur, a malfunction condition is determined and hence, as shall be seen below, a malfunction is displayed, the coin diverters are set so that no further coins can be entered into the system and a disable status flag is additionally set.

The number 10 associated with a determination that a malfunction condition has occurred was empirically developed as suitable for use within the instant invention. However, variations in this number are readily available to suit the choice of design. Thus, each time the clock employed to decrement the variable counter employed to read out the random number from the multi-channel counter 180 generates an interrupt, the random number check program illustrated in FIG. 5 initially checks to ascertain whether or not 10 repeats in the random number generator have previously been determined and hence, whether or not a malfunction condition is present. If 10 repeats have previously been determined as indicated by the arrow 202 annotated Yes, a return to the calling routine as indicated by the circular flag 203 occurs.

If 10 repeats have not been previously determined as indicated by the arrow 204 annotated No, it is clear that a malfunction condition has not yet been detected. Therefore, as indicated by the rectangle 205 the variable counter employed to determine when a random number is to be read from the multi-channel counter 180 is decremented. After the variable counter is decremented in the manner indicated by the rectangle 204 the state of the variable counter is checked in the manner indicated by the diamond 206 to ascertain whether or not the state of the count therein is zero. As aforesaid, a random number will be read from the multi-channel counter 180 each time the variable counter is decremented to a zero condition. Therefore, if the test associated with the diamond 206 is negative in the manner indicated by the arrow 207, a return to the calling routine occurs in the manner indicated by the circular flag 203.

If the variable counter has been decremented to zero, a random number will be read from the multi-channel counter 180 as aforesaid. Therefore, as indicated by the arrow 208 annotated Yes and the rectangle 209, the random number then present in the multi-channel counter 180 is read.

After the random number is read from the multi-channel counter 180, the program initially acts to ascertain whether this number is a repeat with respect to the last random number read from the multi-channel counter 180. As aforesaid, as each random number is read from the multi-channel counter 180 it is stored in a table which is established in software and the table is provided with both an input and output pointer so that numbers may be easily inserted into this table as the same are generated as a result of the decrementing of the variable counter to zero and independently used as a function of their requirement by the system.

To initiate this check, as indicated by the diamond 211, the program initially checks the state of the input pointer for the table to ascertain if it is at the beginning of the table. If the address of the input pointer indicates that the next entry is to occur at the start of the table, as indicated by the arrow 212 annotated Yes, the program then checks, as indicated by the diamond 213, whether the random number to be entered at the start of the table as just fetched from the multi-channel counter 180 is the same as the last entry in the table. Conversely, if the test associated with the diamond 211 is indicative that the next entry is not to be inserted at the beginning of the table, as indicated by the arrow 214 annotated No, the system next tests in the manner indicated by the diamond 215 to ascertain whether or not the random number just fetched from the multi-channel counter 180 is the same as the random number stored in the table at the location of the current input pointer minus two. In this regard, it should be noted that as each 16 bit random number read from the multi-channel counter 180 is stored as two 8 bit bytes in the table, the comparison requires a 2 byte decrementing of the pointer to appropriately locate the last random number stored.

If either the test associated with the diamonds 213 or 214 are affirmative, in the manner indicated by the arrows 216 or 217, it is apparent that a repeat has occurred in that the random number just fetched from the multi-channel counter 180 is a duplicate of the random number previously read therefrom and stored within the table. Therefore, as indicated by the rectangle 218 the repeat counter is incremented and thereafter as indicated by the diamond 219, the condition of the repeat counter is tested to ascertain whether or not the state of the count therein corresponds to 10 which is the number employed to ascertain that a malfunction has occurred. If the state of the repeat counter is 10, in the manner indicated by the arrow 220 annotated Yes, a malfunction is displayed in the manner indicated by the rectangle 221, the coin diverters are illuminated and set in the manner indicated by the rectangle 222 so that no further coins will be accepted, this condition is indicated and a disable status flag is set in the manner indicated by the rectangle 223. Thereafter a return to the calling routine occurs in the manner indicated by the circular flag 224.

If the condition of the repeat counter does not equal 10, a shutdown condition is not indicated. However, a duplicate random number will not be used in the table and it will be manipulated prior to loading into the variable counter for purposes of generating the next random number so that a condition will be avoided where multiples of the cycle time of the white noise generator 182 are obtained or other operation which may be associated with a node. Thus, while there is not yet any reason to indicate a malfunction condition, the random number obtained under these circumstances will not be loaded into the random number table which is 128 entries long and the random number will be modified prior to loading into the variable counter.

Therefore, under these circumstances, as indicated by the arrow 226 annotated No, the low byte of the random number, which is the portion thereof loaded into the variable counter, is shifted right once for each repeat indicated in the repeat counter in the manner indicated by the rectangle 227. This acts, as will be readily appreciated by those of ordinary skill in the art, to divide the random number by two for each shift which occurs and hence is calculated to interfere with any nodal or mode of multiple cycle operation of the white noise generator 182. Thereafter, as indicated by the rectangle 228, the manipulated low byte of the random number obtained is loaded into the variable counter for purposes of subsequent downcounting to zero to obtain a new random number. Thereafter, as indicated by the circular flag 229, a return to the calling routine occurs.

When the random number fetched in the step associated with the rectangle 209 does not represent a duplicate of the last number stored in the random number table, as indicated by the tests associated with the diamonds 213 and 215 and the arrows 231 and 232, the random number obtained is suitable for use in the system. Under these circumstances, as indicated by the rectangle 233 the low byte of the random number fetched is loaded into the variable counter so that same may be employed for subsequent decrementing to zero to thus obtain the next random number to be read from the multi-channel counter 180. In addition, as indicated by the rectangle 234, the random number fetched is stored in the random number table. The random number thus stored in the random number table in accordance with the step of the program indicated by the rectangle 234 will next be processed for the purposes of further randomizing the same in the manner set forth in the flow chart illustrated in FIG. 6.

Since the random number obtained from the multi-channel counter 180 has now been determined as appropriate for further processing and has been stored in the random number table in the manner indicated by the rectangle 234, the program next proceeds with the housekeeping functions appropriate for new cycles of operation. Thus, in the manner indicated by the diamond 235, the program tests to ascertain whether or not the input pointer is at the end of the 128 entry table. If the input pointer is not at the end of the table, as indicated by the arrow 236 annotated No, the input pointer for the random number table is merely incremented by two in the manner indicated by the rectangle 237 to appropriately position the same for the entry of the next two byte random number.

Conversely, if the test associated with the diamond 235 indicates that the input pointer resides at the end of the table as indicated by the arrow 238 annotated Yes, the pointer is set to the start of the table in the manner indicated by the rectangle 239 to thus locate the pointer at the beginning of the table at an appropriate location for the next entry. Thereafter, the repeat counter is cleared in the manner indicated by the rectangle 241 since the last random number entered is not a repeat and thereafter a return to the calling routine in the manner indicated by the circular flag 242 occurs.

Thus it will be seen that the random number check routine illustrated in FIG. 5 initially acts to ascertain if 10 repeats in random numbers have previously been determined and hence, if the system is shut down. If the system has not been shut down, the interrupt generated by the 16 millisecond clock is employed to decrement the variable counter and thereafter the state of the variable counter is checked to ascertain whether or not the same has been downcounted to zero. If the variable counter has not been downcounted to zero, a return to the calling routine occurs so that subsequent reentries with each 16 millisecond clock do not result in fetching a random number from the multi-channel counter 180 until such time as the variable counter has been downcounted to zero.

Once the variable counter has been downcounted to zero the random number then present in the multi-channel counter 180 is fetched and initially checked to ascertain whether or not the same is a duplicate of the last random number stored in the random number table. If it is, a counter employed for the purposes of keeping track of the number of repeats is incremented and then the state thereof is tested to determine whether or not 10 repeats in a row have been determined. If 10 repeats in a row have been determined, the system is shut down. However, if fewer than 10 repeats have been determined, the random number is not inserted into the random number table. However, the low byte thereof is manipulated to free the system of nodal or harmonic operation in the white noise generator 182. Thereafter the low byte is loaded into the variable counter for purposes of downcounting the same to obtain the next random number.

If the random number fetched is not a repeat of the last number stored, the low byte thereof is loaded into the variable counter and thereafter the random number is stored in the random number table for further processing in accordance with the flow chart illustrated in FIG. 6. Thereafter, the input pointer to the random number table is manipulated to accommodate the next random number to be entried, the repeat table is cleared and a return to the calling routine occurs. While the random check number routine illustrated in FIG. 5 has been described in somewhat simplified form to avoid excessive detail, it should be appreciated that the full details thereof may be reviewed upon an inspection of Appendix A, as attached hereto.

Referring now to FIG. 6 there is shown a flow chart illustrating a simplified pseudo-random number regeneration program for further randomizing the random numbers obtained from the random number generator in FIG. 4 and for conforming the resulting random numbers obtained to the boundary conditions required for particular purposes or operations within the gaming device illustrated in FIG. 3. The random number regeneration routine whose flow chart is illustrated in FIG. 6 is called every time the gaming device illustrated in FIG. 3 requires a random number for a particular purpose. When it is entered the next random number is called from the random number table or seed table in which these random numbers were loaded in accordance with the flow chart illustrated in FIG. 5, it is further randomized and thereafter it is configured to exhibit the appropriate number of digits for the random number which is then required.

It will be recalled that the random number table is a table having 128 entries and is equipped with both an input and output pointer. As will now be apparent from a review of the flow chart illustrated in FIG. 5, random numbers are input into the table at a rate at which they become available and are called by the subroutine whose flow chart is illustrated in FIG. 6 at the rate at which they are required. Thus, the input and output pointers in each case run asynchronously. Furthermore, it will also be recalled that the nature of the random number required by the system will vary in accordance with the function it is then performing. For instance, if the system is picking winning and placing entries, random numbers which vary from 1 to 10,000 and hence include 14 bits are required. Similarly, if the system is picking names for the entries, a random number which varies from 0 to 128 will be required while if the system is selecting an odds table, a random number which varies from zero to two will be required. Finally, when the system is scrambling the post positions from the probability tables a random number which varies from 0 to 7 will be required. Thus, the flow chart illustrated in FIG. 6 will demonstrate the manner in which the system calls a random number from the random number table when it has a requirement therefor, further randomizes it in accordance with pseudo-random number regeneration techniques and thereafter configures it to the number of digits required for the particular function for which it is to be used.

The random number regeneration routine illustrated in FIG. 6 is entered any time the system requires a random number for a particular purpose and it is entered at the location indicated by the oval flag 245. Upon entry, as indicated by the rectangle 246, the current address of the output pointer is fetched and thereafter the random number defined by the output pointer is read in the manner indicated by the rectangle 247. After this is done, the system next checks in the manner indicated by the diamond 248 as to whether or not the output pointer is pointing to the end of the random number table. If the end of the random number table has been addressed as indicated by the arrow 249 annotated Yes, the output pointer is set to the beginning of the table in the manner indicated by the rectangle 250.

However, if the output pointer is not set at the end of the random number table, in the manner indicated by the arrow 251 annotated No and the rectangle 252, the output pointer is merely incremented by two. This corresponds to the two 8 bit bytes required for each random number stored and thus positions the output pointer in an appropriate location for reading the next random number upon the next entry to the instant routine. Thereafter, the random number is saved in the manner indicated by the rectangle 253 prior to the application of pseudo-random number regeneration techniques thereto.

The first manipulation applied to the random number as indicated by the rectangle 254 is to shift or rotate the seed three places to the right and thereafter Exclusively Or the result with the original number saved in accordance with the step indicated by the rectangle 253. The result obtained in association with the Exclusive Or operation indicated by the rectangle 254 is then saved.

The result is then rotated 11 places to the left as indicated by the rectangle 255 and thereafter, as indicated by the rectangle 256, the result of the operation obtained in association with the rectangle 255 is Exclusively Orid with the random number stored in association with the rectangle 254. The random number thus obtained as a a result of the step indicated by the rectangle 256 is now sufficiently further randomized and hence, the remaining portions of this program are directed to chopping down the size of the random number to the boundary conditions required by the calling routine. Thus, as indicated by the rectangle 257, a software mask is initially created by setting all bits in the random number which are greater than the most significant bit of the boundary condition specified to zero and then as indicated by the rectangle 258 the mask is ANDED with the random number.

The cut down random number as obtained from the step of this program indicated by the rectangle 258 is then tested in the manner indicated by the diamond 259 to ascertain whether or not the resulting random number obtained is smaller than or equal to the upper limit of the boundary conditions specified. If the result is negative as indicated by the arrow 260 annotated No, a return to the beginning portion of this routine occurs in the manner indicated by the circular flags 261 and 262. If the random number thus obtained is less than or equal to the boundary conditions specified, as indicated by the arrow 263 annotated Yes, it is next tested in the manner indicated by the diamond 264 to ascertain whether or not it is equal to or greater than the lower limit of the boundary condition specified. If a native result is obtained as indicated by the arrow 265 annotated. No, a return to the beginning portions of the routine occurs, as indicated by the circular flags 261 and 262. However, if an affirmative result is obtained, as indicated by the arrow 266 annotated Yes, it is clear that the resulting random number obtained fits within the boundary conditions imposed by the calling routine.

Thus, under these conditions, as indicated by the rectangle 267, the resulting random number is placed in a return register for the calling routine and thereafter a return to the calling routine occurs in the manner indicated by the circular flag 268. It will therefore be seen that the random number regeneration routine illustrated in FIG. 6 acts to initially fetch the current address of the output pointer for the random number table read the random number defined. Thereafter the pointer is incremented to the beginning position of the next random number to be read. The random number read is then subjected to pseudo-random number regeneration techniques and thereafter the resulting random number obtained is chopped down so as to fit within the boundary conditions specified by the calling routine which may vary from a 2 bit number to a 14 bit number. The resulting random number obtained is then checked to ascertain whether it fits within the boundary conditions specified and if this result occurs, it is placed in a register for use by the calling routine.

Accordingly, it will be appreciated by those of ordinary skill in the art that the random number regenerating techniques disclosed in association with FIGS. 4–6 of the instant application employ a combination of hardware and software to initially start a counter in a random manner, increment that counter at random rates which vary in a random manner and thereafter to read the output of that counter to obtain an initial random number at intervals which also vary in random fashions. The resulting random number is then checked to insure that the same is not a repeat and has otherwise been appropriately regenerated, and placed in a table for subsequent use. When the system requires a random number, the next random number located in that table is read, further randomized using pseudo-random number regeneration techniques and then appropriately sized to the boundary conditions required by the calling routine. In this manner, a large number of reliably generated random numbers are continuously available for the gaming device illustrated in FIG. 3. Although the random number generation techniques illustrated in connection with FIGS. 4–6 have been described in connection with downcounting of counters, up-counting approaches could be used as well.

THE DISPLAY PERIPHERAL

Figure 7:
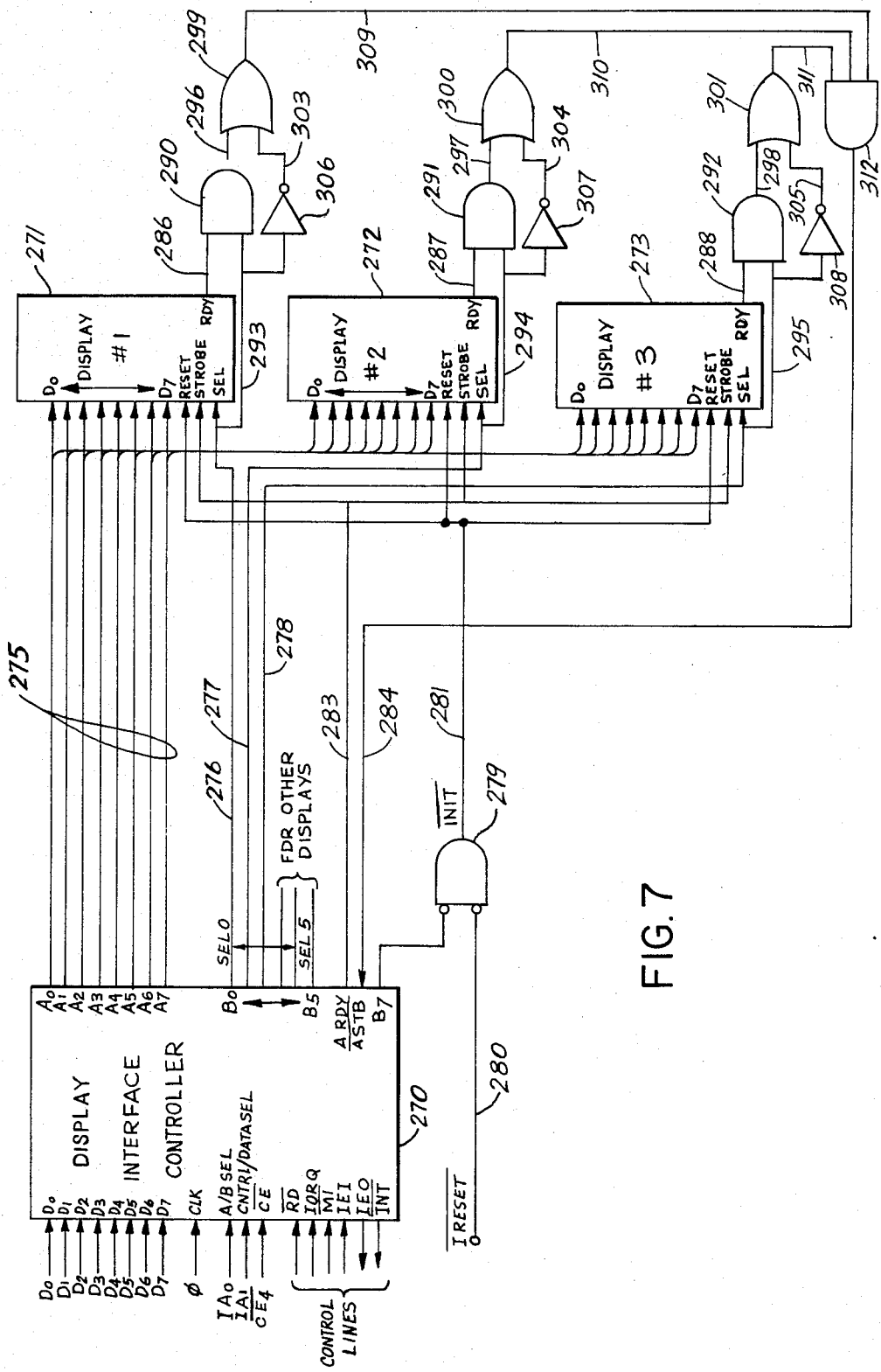
FIG. 7 is a block diagram schematically illustrating structural details of an exemplary display interface controller and display suitable for use in the block diagram illustrated in FIG. 3.

Referring now to FIG. 7 there is shown a block diagram schematically illustrating structural details of an exemplary display interface controller and display suitable for use in the block diagram of the invention depicted in FIG. 3. The display interface controller and display illustrated in FIG. 7 comprise a display interface controller 270 which corresponds to the display interface controller 131 in FIG. 3, and a plurality of displays 271–273 corresponding to the informational displays 86–88 shown in FIG. 3. The display interface controller 270 may take any of the well-known forms of this conventional class of device which act to selectively interface the displays 271–273 to the microprocessor unit 70 through the data and control bus 72 and to further convey information provided thereon to each of the displays 271–273. As a Zilog Z-80/Z-80A processor was employed in the exemplary embodiment of the invention which was built and tested, the display interface controller 270 may take the conventional form of a Z80-PIO as available from Zilog Corporation.

The display interface controller 270, illustrated in FIG. 7, is a two port device wherein the ports have been annotated as the A and B outputs in FIG. 7. The A port outputs, as will be apparent to those of ordinary skill in the art, are employed for the purposes of conveying data while the B port outputs are utilized to generate select information for each of the displays. Thus, as indicated in FIG. 7, the display interface controller is interconnected to the eight data lines within the data and control bus 72 illustrated in FIG. 3 through the inputs annotated $D_0$–$D_7$ while clock information and remaining control information is obtained and provided through the control portion of this bus through the inputs and outputs indicated in connection with the display interface controller 270. Thus the input annotated CLK receives system clock information while the inputs and outputs annotated $\overline{RD}$, $\overline{IORQ}$, $\overline{M1}$, IEI, IEO and $\overline{INT}$ represent conventional control line information employed with the Z80/Z80A processor.

Thus, the $\overline{RD}$ input defines Read Cycle Status from the microprocessor unit 70, the $\overline{IORQ}$ input defines an Input/Output Request from the microprocessor unit 70 and the $\overline{M1}$ input defines a Machine Cycle One Signal from the microprocessor. The IEI input, the IEO output and the $\overline{INT}$ output define interrupt information wherein the $\overline{INT}$ output corresponds to an Interrupt Request Output while the IEI input and the IEO output define Interrupt Enable In and Interrupt Enable Out control information. In addition, as also indicated by the input annotations to the display interface controller 270, address bits $A_0$ and $A_1$ are provided from the address bus for the purposes of controlling which of ports A and B are selected and the function which is defined as control or data select. Additionally, chip select information is supplied to the CE input of the display interface controller 270 in the form of the $\overline{CE}_4$ output decoded by the interface decoder 82 illustrated in FIG. 3.

The A port outputs $A_0$–$A_7$ are employed to convey data received from the data portion of the data and control bus 72 on the inputs to the display interface controller 270 annotated $D_0$–$D_7$ to the data inputs, annotated $D_0$–$D_7$ of each of the display devices 271–273. As was described in connection with FIG. 3, the display devices 271–273 may take the form of Burroughs Self-Scan II displays which, when provided with appropriate strobe and select information, act to appropriately process and display data in the form of 8 bit bytes supplied thereto, and in addition, to appropriately handle refresh functions and the like independently of processor action. Thus, as indicated in FIG. 7, each of the 8 data outputs associated with the A port of the display interface controller 270 are connected through the multi-conductor cable 275 to each of the D inputs of the displays 271–273 so that any data supplied at the A port of the display interface controller 270 is applied to the data inputs of each of the displays 271–273 in parallel, and hence, may be processed by each of the displays provided appropriate select and strobe information is provided thereto.

The B port of the display interface controller 270 is employed to generate select information for each of the displays 271–273 as provided thereto on the data portion of the data and control bus 72 and supplied to the display interface controller at inputs $D_0$–$D_7$. In this regard, it may be noted that the output from port $B_0$, annotated SEL 0, is supplied through conductor 276 to a select input for the display 271, output $B_1$ annotated SEL 1 is connected through conductor 277 to the select input of the display 272 and output $B_2$ annotated SEL 2 is connected through the conductor 278 to the select input of the display 273.

The B port outputs annotated $B_3$–$B_5$, annotated SEL 3–SEL 5, are, as indicated in FIG. 7, reserved for other displays as would be present in larger embodiments of the instant invention such as in the case of an eight player station embodiment where six displays rather than three would be employed as. Additionally, the $B_7$ output of the display interface controller 270 is employed as one input to an And gate 279 whose inputs are inverted. The second input to And gate 279 as present on conductor 280 connects to a Reset line within the control portion of the data and control bus. The And gate 279 whose inputs are inverted, acts in the well-known manner to provide a high at the output thereof connected to the conductor 281 whenever both of the inputs thereto are low. The conductor 281, as indicated in FIG. 7 is connected to a reset input at each of the displays 271–273 whereupon the same acts as a reset signal for purposes of initializing each of the displays.

The A RDY output from the display interface controller connected to the conductor 283 corresponds to a register A Ready output which indicates that data is loaded in the A register and is available at the outputs $A_0$–$A_7$ connected to the multi-conductor cable 275. The A Ready output of the display interface controller is connected through the conductor 283 to the strobe inputs of each of the displays 271–273. Thus, this output of the display interface controller 270 is employed as a strobe to strobe data on the $A_0$–$A_7$ outputs of the display interface controller into any of the displays 271–273 which is enabled by the select input thereto. The remaining input to the display interface controller 270 annotated A $\overline{STB}$ connected to the conductor 274 and derives, as shall be seen below, from ready outputs provided from each of the displays 271–273 which have been selected. This input to the display interface controller 270 is employed to generate a service request by the display interface controller indicating that additional data may be supplied thereto by the microprocessor unit 70 through the data portion of the data and control bus 72.

The displays 271–273 act in the well-known manner to display data supplied to the D inputs thereto, i.e. $D_0$–$D_7$, on the multi-conductor cable 275 whenever they have been selected by a select level provided to the select inputs thereto on individual ones of the conductors 276–278. The data supplied through the multi-conductor cable 275 is strobed into a respective display 271–273 whenever a strobe pulse is provided at the strobe inputs thereto connected to the conductor 283, as aforesaid.

Whenever an individual one or more or the displays 271–273 have been selected and have completed processing the data supplied thereto, a ready pulse is produced at the outputs thereof annotated RDY which are connected to the conductors 286–288. A ready level at the output of any of the displays 271–273 is indicative that that display has completed processing of the 8 bits of data provided thereto through the multi-conductor cable 275 and is ready to receive more data from the data portion of the data and control bus 72 under control of the microprocessor 70. These ready outputs, as applied to the conductors 286–288, are employed to selectively generate a strobe level at the A strobe input to the display interface controller 270, connected to the conductor 284, so that an interrupt may be generated and more data forwarded by the microprocessor unit 70 to the display interface controller 270.

However, the same 8 bits of data supplied from the multi-conductor cable 275 may be gated to more than one display. In fact, this is frequently the case since the two outside displays 10 and 14, shown in FIG. 2B, always display the same information. Therefore, the ready strobe supplied to the display interface controller 270 on the input conductor 284 must be furnished as a function of when the slowest one of the displays 271–273 which has been selected has completed processing. To achieve this result, the ready output of each of the displays 271–273 is connected to one input of an AND gate 290–292 associated with that display. A second input to these AND gate is connected through conductors 293–295 to the select input of that display. Thus, while the ready output of each of the displays 271–273 goes high when that display has been selected and has completed processing the 8 bits of data supplied thereto, the select input applied to the second input of the associated AND gate 290–292 goes high when that display is selected.

The AND gates 290–292 may take any of the well-known forms of this conventional class of device which act to produce a high at the output thereof only when both of the inputs thereto are high while producing a low at the output thereof under all other input conditions. Thus, a high level will be produced at the output of each of the AND gates 290–292 only when its associated display 271–273 has both been selected and completed processing of the 8 bits of data strobed thereinto. The outputs of the AND gates 290–292 are connected, respectively, through conductors 296–298 to one input of an associated OR gate 299–301.

The second input to each of the OR gates 299–301 is connected through conductors 303–305 and a respective inverter 306–308 to the select input for the associated display 271–273. Thus, the second input to each of the OR gates 299–301 will go high only when its associated display has not been selected, while the first input to each of the OR gates on conductors 296–298 will go high only when its associated display has been selected and has generated a ready signal to indicate that processing of the 8 bits supplied is completed. The OR gates 299–301 may take the conventional forms of exclusive OR gates which act in the well-known manner to produce a high at the outputs thereof connected to conductors 309–311 only when one of the inputs thereto go high producing a low under all other sets of input conditions. Thus, it will be appreciated that a high will appear at the output of the OR gates 299–301 only under such conditions as when the display associated therewith either has not been selected or has been selected and completed processing of the 8 bits of data supplied thereto.

The outputs of the OR gates 299–301 are connected through conductors 309–311 to the inputs of an AND gate 312. The AND gate 312 may take any of the well-known forms of this conventional class of device which acts to produce a high or ready strobe at the output thereof only when all of the inputs thereto go high. The output of the AND gate 312 is connected to the conductor 284 which supplies an A ready strobe to the display interface controller 270. Thus it will be appreciated that for the input conditions specified for AND gate 312, a ready strobe is only supplied to the display interface controller 270 when all of the displays which have been selected to receive a given 8 bits of data have completed the processing thereof.

In operation of the exemplary display interface controller and display illustrated in FIG. 7, it will be seen that data corresponding to information of the type described in conjunction with FIG. 2B will be gated on to the data portion of the data and control bus 72 from the random access memory, the read-only memory or the like under the control of the microprocessor unit and supplied to the display interface controller 70 together with control and gating information. After appropriate selection information has been supplied to each of the displays 271–273, data gated from the data and control bus 72 by an enabled display interface controller 270 will be supplied to each of the displays through the multi-conductor cable 275 and will be appropriately processed by selected displays 271–273 to cause an individual character or the like to be displayed. Upon completion of processing, each of the displays selected will generate a ready signal and upon the generation of a ready signal by the last display to complete processing, a ready strobe will be supplied on conductor 284 to the display interface controller 270.

Thereafter, an interrupt will be supplied to the control portion of the data and control bus requesting a new 8 bit byte of data or the like. Upon servicing of this request and a determination that the interrupt has been generated by the display interface controller 270, a further 8 bit byte of data will be supplied to the common data bus for servicing by appropriate ones of the selected displays 271–273. Thus in this manner, information of the type illustrated in FIG. 2B is displayed under program control to fully apprise a player of the information set forth therein.

REMOTE INTERFACE AND REMOVABLE MEMORY

Figure 8:
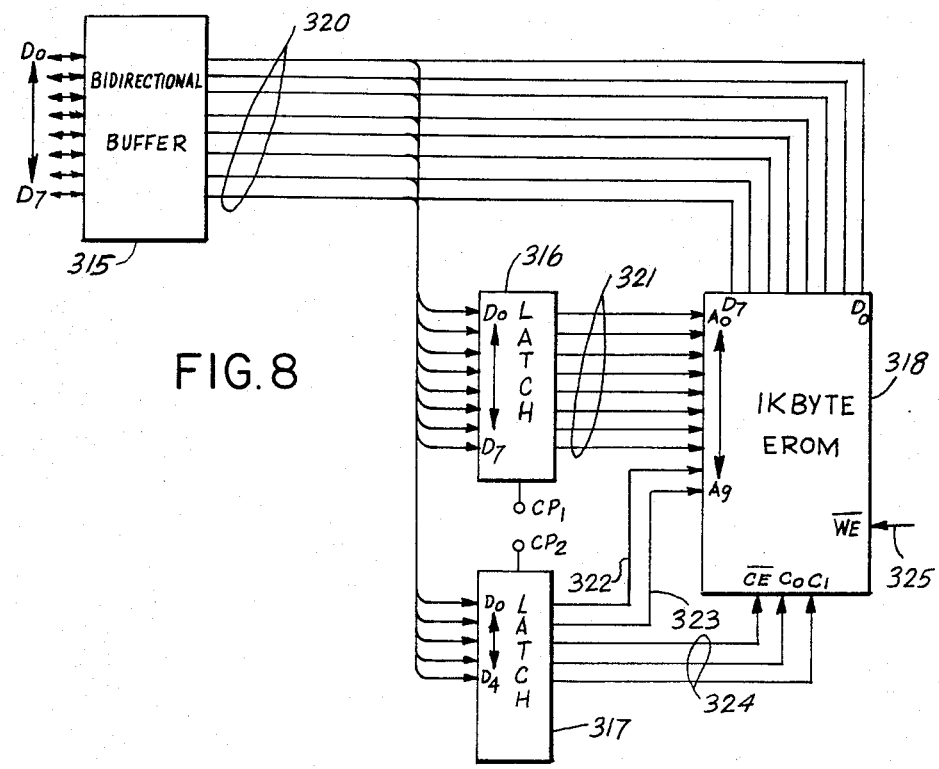
FIG. 8 is a block diagram schematically showing an exemplary removable memory and remote interface therefor suitable for use as the removable memory and interface therefor illustrated in FIG. 3.

Referring now to FIG. 8 there is shown a block diagram schematically illustrating an exemplary removable memory and remote interface therefor suitable for use as the removable memory and interface illustrated in FIG. 3. The remote interface and removable memory illustrated in FIG. 8 comprises a bidirectional buffer 315, first and second latch means 316 and 317 and a recording device 318 which may take the form of an electrically alterable read-only memory (EROM). The bidirectional buffer 315 may take any of the well-known forms of this conventional class of device which acts in the case of FIG. 8 to receive or transmit data to or from an interface while raising the data transmitted to appropriate logic levels and hence accommodate attenuation losses due to line length and the like. Thus for instance, an 8304 transmit/receive buffer as available from Intel Corporation may be employed for this purpose.

The bidirectional buffer 315 as well as the first and second latches 316 and 317 may be viewed as forming the remote memory interface 116 illustrated in FIG. 3 and hence the inputs/outputs to the bidirectional buffer annotated $D_0$–$D_7$ will connect to the data inputs of the removable memory interface controller 120 illustrated in FIG. 3. However, as this removable memory interface controller 120 may take the form of an Z80-PIO programmable interface controller which in essence fully corresponds to the display interface controller 270 described in detail in connection with FIG. 7 in a relatively simple and straightforward manner, no detailed description thereof is here set forth to avoid repetitive description. Thus, it is sufficient for the purposes of the instant disclosure to appreciate that the inputs/outputs to the bidirectional buffer 315 annotated $D_0$–$D_7$ are connected to the A port of an appropriate interface such as a Z80-PIO and through that interface to the data portion of the data and control bus 72 which the B port is again employed for control purpose. In this regard, it should be additionally noted that the A port of a Z80-PIO are bidirectional.

The remaining inputs/outputs of the bidirectional buffer 315 are connected as indicated to the multi-conductor cable 320 so that data present on the data portion of the data and control bus 72 which is conveyed to the bidirectional buffer 315 at the inputs associated with the terminals annotated $D_0$–$D_7$ may be conveyed therethrough to the multi-conductor cable 320 and conversely, information supplied to the multi-conductor cable, in this case by the recording device 318, may be passed through the bidirectional buffer 315 to the outputs associated with the terminals annotated $D_0$–$D_7$ and subsequently gated on to the data portion of the data and control bus 72. The multi-conductor cable 320 includes one conductor for each of the 8 data bits in a byte being conveyed and is connected, in parallel, to the eight inputs of the first latch 316 annotated $D_0$–$D_7$, the first five inputs of the second latch means 317 annotated $D_0$–$D_4$ and to the eight input/outputs of the recording device annotated $D_0$–$D_7$.

The first and second latch means 316 and 317 may take the conventional form of standard 8 bit latches which act in the usual manner to latch up data supplied to the D inputs thereto whenever a clock pulse is supplied to the clock inputs thereto annotated $CP_1$ and $CP_2$. While not illustrated in FIG. 8, the clock inputs to the first and second latch means 316 and 317, supplied to the terminals annotated $CP_1$ and $CP_2$, are developed as a function of control information placed on the control and data bus by the microprocessor unit 70. Thus, as will be readily appreciated by those of ordinary skill in the art, any time 8 bits of data are gated from the data portion of the data and control bus 72 and supplied by the bidirectional buffer 315 to the multi-conductor cable 320, all eight of such bits will be applied to the data inputs of the first bidirectional buffer 316 while the low order five bits of such information will be similarly applied in parallel to the five data inputs which are here utilized in the second latch means 317. Therefore, whenever a clock pulse is supplied during the presence of such data, the one of the first and second latch means 316 and 317 which is enabled thereby will latch up the eight or five bits of data supplied thereto and retain such data at the outputs thereof until new data is latched thereinto.

The eight outputs of the first latch means 316 are connected through the multi-conductor cable 321 to the A or address inputs of the recording device 318 annotated $A_0$-$A_7$ while the first two outputs of the second latch means 317 on conductors 322 and 323 are connected to the address inputs on the recording device 318 annotated $A_8$ and $A_9$. The remaining three outputs of the second latch means 317 are connected through the multi-conductor cable 324 to the control enable inputs of the recording device annotated $\overline{CE}$, $C_0$ and $C_1$. Accordingly, as will now be readily appreciated by those of ordinary skill in the art, any time it is desired to write information into the recording device 318, the first 8 bits of address information for the recording device 318 are gated on to the data portion of the data and control bus 72, through the bidirectional buffer 315 and latched into the first latch means 316. Thereafter, the next two bits of address information together with three bits of control information will be gated on to the data portion of the data and control bus 72, through the bidirectional buffer 315 and latched into the second latch means 317.

In this manner, 10 bits of address information are supplied through the multi-conductor cable 321 and the conductors 322 and 323 to the ten address inputs $A_0$-$A_9$ of the recording device while three control bits are supplied through the multi-conductor cable 324 to the three control inputs of the recording device 318 so that a unique location within the 1K byte memory thereof is addressed. Thereafter, information to be written may be gated on to the data portion of the data and control bus for subsequent application through the bidirectional buffer 315 and the multi-conductor cable 320 to data inputs $D_0$-$D_7$ of the recording device. Conversely, this same addressing technique would be employed to read a unique location within the recording device 318. Under these circumstances, read control inputs would be supplied to the recording device so that an eight bit location would be read from the recording device and supplied as 8 bits in parallel to the multi-conductor cable 320 and supplied through the bidirectional buffer 315 to the data portion of the data and control bus 72.

The recording device 318 may take any of the well-known forms of this conventional class of device. Thus for instance, an electrically alterable read-only memory or alternatively, a tape drive or the like may be employed. The function of the recording device 318 is to receive accounting information and the like from the system at the conclusion of each race event run therein so that data may be readily removed by maintenance personnel for purposes of maintaining external records on the system at all times. Furthermore, the data stored in the recording device 318 is employed through a bootstrap operation or the like to initialize the system with the appropriate amount in the jackpot, the hopper and records concerning security information such as when the door to the hopper has been opened or any time the machine is powered down and subsequently reenergized. In this manner, regardless of periodic shutdowns of the machine, a continuity in the accounting records associated therewith is maintained through use of the recording device 318. In this regard it should be noted that the gaming device illustrated in FIG. 3 is preferably provided with a battery standby power pack so that any time power failure or the like occurs, sufficient power is available so that an interrupt is generated and all accounting information requisite for reinitializing the machine at its present status regardless of what its present status may be, is read into the recording device and available for reinitialization of the device when power is again restored.

Thus, if a horse race is in progress, the recording device 318 will receive all player control block information as shown in Appendix B, the status of the Quinella jackpot, entry table, and all probability table, name information and the like which was established for the race about to be run. This means, that when a power up operation occurs, the gaming device illustrated in FIG. 3 will be reinitialized so as to continue at a subsequent location to that at which the power failure or the like occurred even though such information would otherwise be lost due to the loss of power in the random access memories.

In the case of the recording device 318 illustrated in FIG. 8, a 1K byte electrically alterable read-only memory as illustrated in FIG. 8 was discussed. However, as will be readily appreciated by those of ordinary skill in the art, even though a 1K byte memory is depicted, sufficient addressing information is available so that an additional 1K of memory may be included therewith should such additional memory be desirable to accommodate further information to be saved. The electrically alterable read-only memory illustrated for the recording device 318 in FIG. 8 may take the conventional form of a pair of ER 3400 EROMS, as conventionally available from the General Instrument Company which are interconnected so that they are commonly enabled and selected by the control information provided on the multi-conductor cables 324 as well as being commonly addressed by the 10 bits of address information on the multi-conductor cable 321 and the conductors 322 and 323.

In addition, as will be apparent to those of ordinary skill in the art, each memory chip would be connected to a different four of the data conductors present in the multi-conductor cable 320 so that each 1K byte chip, would receive or output four commonly addressed bits of a commonly stored byte to the bidirectional buffer 315 or receive such information therefrom.

As illustrated in FIG. 8, the recording device 318 receives 10 bits of address information from the first and second latch means 316 and 317 through the multi-conductor cable 321 and the conductors 322 and 323 so that an 8 bit byte location therein may be addressed for purposes of reading or writing. The control information on the multi-conductor cable 324 which is connected, as illustrated in FIG. 8 to the terminals annotated $\overline{C}_E$, $C_0$ and $C_1$ are for the purposes of enabling the chip and defining the mode of operation thereof. More particularly, the input to the terminal $\overline{C_E}$ is an enable level which will cause the recording device 318 to sense the control lines and change modes only when pulsed. In the read mode data is read during each CE pulse while writing or erasing of a byte therein continues for as long as the device is in the write or erase mode.

The input terminals annotated $C_0$ and $C_1$ define various modes of operation which may be enabled under program control for the electrically alterable read-only memory here being considered. Thus, a 01 combination at input terminals $C_0$ and $C_1$ will define a block erase mode wherein an erase operation is performed on all words, a 11 combination will define a word erase mode wherein stored data is erased at an addressed location, a 00 will define a read mode wherein address data will be read from a defined word location and a 10 input combination at terminal $C_0$ and $C_1$ will define a write mode wherein input data is written at an addressed location. For a write operation to occur, a logical zero must be present at the input to the recording device annotated $\overline{WE}$ as connected to the conductor 325 while for a read operation to occur a logical One must be applied to this write enable input. Additionally, as will be readily appreciated by those of ordinary skill in the art, a write operation requires a 1.5 millisecond write pulse, an erase operation requires a 10 millisecond erase pulse and a successful write operation requires the availability of minus 3 volts for the chip.

The recording device 318 is structurally configured in the system so as to be plug removable and available to maintenance personnel upon opening one of the doors enclosing the coin hoppers. Furthermore, the system is electrically configured so that the same will not operate without the recording device 318 in place and as will be readily apparent to those of ordinary skill in the art, specialized coding may be employed to initialize the bootstraping sequence so that only a specially encoded recording device 318 may be employed to initialize each gaming device. The gaming device will have written thereinto all accounting information associated with the system at the end of each race so that in use maintenance personnel will service the gaming device by removing the recording device, all money from the reservoir and leave a predetermined amount in the coin hopper for future operations.

Thereafter, a new recording device 318 will be placed in the machine which has been specially initialized for that gaming machine while the removed recording device 318 is taken back to a central location with the removed funds where the accounting and use history of the gaming device are maintained. Additionally in the security mode, new recording devices will be initialized under program control. As up-to-date accounting information, as well as a history of each time the door has been opened subsequent to the previous servicing is recorded on the recording device 318, it will be appreciated that highly accurate accounting records for the gaming device may be automatically maintained through the use of the removable memory illustrated in FIG. 8.

In operation, it will be appreciated that all accounting information associated with each player station and the machine as a whole, as may be seen upon an inspection of the accounting table in Appendix B, is stored in the removable memory 318 at the end of each race. This is done by updating the contents of the recording device 318 with the contents of the random access memory 78 at the end of each race through a write operation wherein appropriate address information for the locations within the recording device 318 are initially addressed by the application of two 8 bit bytes on the data portion of bus 72. This information is subsequently applied through the bidirectional buffer 315 to the multi-conductor 320. The first 8 bits are latched into the first latch means 316 where they serve in the role of address bits $A_0$–$A_7$ on the multi-conductor cable 321. The second byte of data placed on the data bus and gated through the bidirectional buffer 315 will be applied through the multi-conductor cable 320 to the second latch means 317 and the low four order bits will be latched therein.

The $D_0$ and $D_1$ bits will serve as address bits $A_8$ and $A_9$ while the higher order three bits are employed through the multi-conductor cable 324 to provide the control inputs to the removable memory 318. Thereafter, 8 bits to be written into the addressed location are again gated on to the data bus and through the bidirectional buffer 315 for application to data terminals $D_0$–$D_7$ of the recording device 318. After this byte of data has been written into the recording device 318, each successive byte of data which must be applied to the recording device 318 to update the memory thereof is written in a like manner.

Conversely, when the system is initially turned on, the initializing portion of the main program routine will initially act to address in sequence each memory location within the recording device 318 by applying two bytes of data to the data bus. This information is again latched up by the first and second latch means 316 and 317. Thereafter, the address location is read from the recording device through terminals $D_0$–$D_7$ which now serve as output terminals and are applied through the multi-conductor cable 320 and the bidirectional buffer 315 to the data portion of the data and control bus 72. In this manner, data within the recording device is employed to initialize the system via the bootstrap operation described. While the nature of the data stored within the recording device 318 has been only briefly mentioned herein, a full appreciation of all data stored therein will be readily available to those of ordinary skill in the art through an inspection of the detailed program for this system attached hereto as Appendix A.

A variation in the information stored within the removable memory illustrated in FIG. 8 and more particularly the recording device 318 takes place in the event that a power failure occurs during a race. Since it is imperative that all current information pertinent to the race in progress and the player station bets be saved, an alternative is provided to the systematic accounting information which is provided at the end of each race should an unexpected power interruption occur. More particularly, although not depicted herein, a conventional battery standby arrangement and power line monitoring sensor is provided in conjunction with certain embodiments of the present invention so that when a power failure occurs, an interrupt is generated. This interrupt is employed to apply standby battery power to the system and to initiate a routine where current information pertinent to the race in progress and player station bets are saved in addition to normal accounting information so that when power is restored, the outcome of the race already defined can be set forth and the integrity of the player's wagers maintained by the system. Thus, upon loss of AC power, the system automatically goes on battery backup maintaining power to the processing unit and the removable memory systems.

The power system also supplies a power fail signal to the processor which acts to generate an interrupt indicating the condition detected. Upon receiving a power fail interrupt, the microprocessor unit 70 acts to write the current state of the machine or status into the removable memory as well as the player station control blocks for each player station which contain all bets made, Pick Five selections, results, winnings, hand pays and coin returns for each such station.

In addition, the odds for the winning horses of the race in progress, along with the horse name information, are also saved. Thus, all accounting data for each player station is retained under these conditions. After all pertinent information has been stored in the removable memory, the processor shuts off the battery standby supply and removes power from the removable memory and itself to optimize the useful life of the battery standby pack.

When power is reapplied or for that matter when the system is otherwise initialized, the video disk players are started, the clock routine is initialized and the random number generator function is started. All data stored in the removable memory system is read back and restored in the processor's memory, i.e. RAM, and if the machine's status indicates that there was no play in progress, the processor will merely initialize all player stations with last known Quinella jackpots, last known Pick Five selections and results and cleared out win, place and show bets. However, if the machine status indicates that a play was in progress, at any point from bets just being made through to pay out on a completed race, additional restoration procedures will be implemented. Thus, under these conditions, bet information will be restored to each player station together with Pick Five selections and the results to date. Quinella status will also be restored to each player station and the results of the last race, winning horse and appropriate odds will be set forth on the informational displays. The system will then calculate winnings for each player and display the player results on the informational display, unbet coins will be restored and, under these conditions, a hand pay message will be set.

Once the attendant has been called by a player for the hand pay condition set, he will hand pay the difference between the amount won and the amount paid for each player station as displayed on the Burroughs display as well as the amount of coins indicated as inserted but not bet. Thereafter, the attendant will clear the hand pay condition and the machine will update all accounting information in RAM and write the updated accounting information into the removable memory. The machine will then complete the initialization routine, discussed below, by selecting the next five races, odds and names for the next race and then proceed with any Pick Five bets maintaining play of the machine as in the normal powered up state.

Accordingly, it will be appreciated by those of ordinary skill in the art that the removable memory illustrated in FIG. 8 allows highly accurate accounting and other historical information to be maintained on the gaming equipment described so that the integrity of the system may constantly be monitored and accurate records kept on all moneys input and output to and from the device. While the removable memory described in association with FIG. 8 has been illustrated as taking the form of an electrically alterable read-only memory, it will be appreciated by those of ordinary skill in the art that the same function may be provided through the use of a recording device in the form of a diskette, cassette or other forms of magnetic media employed for the purpose of bootstraping and reading data.

UNIT IDENTIFICATION

Figure 9:
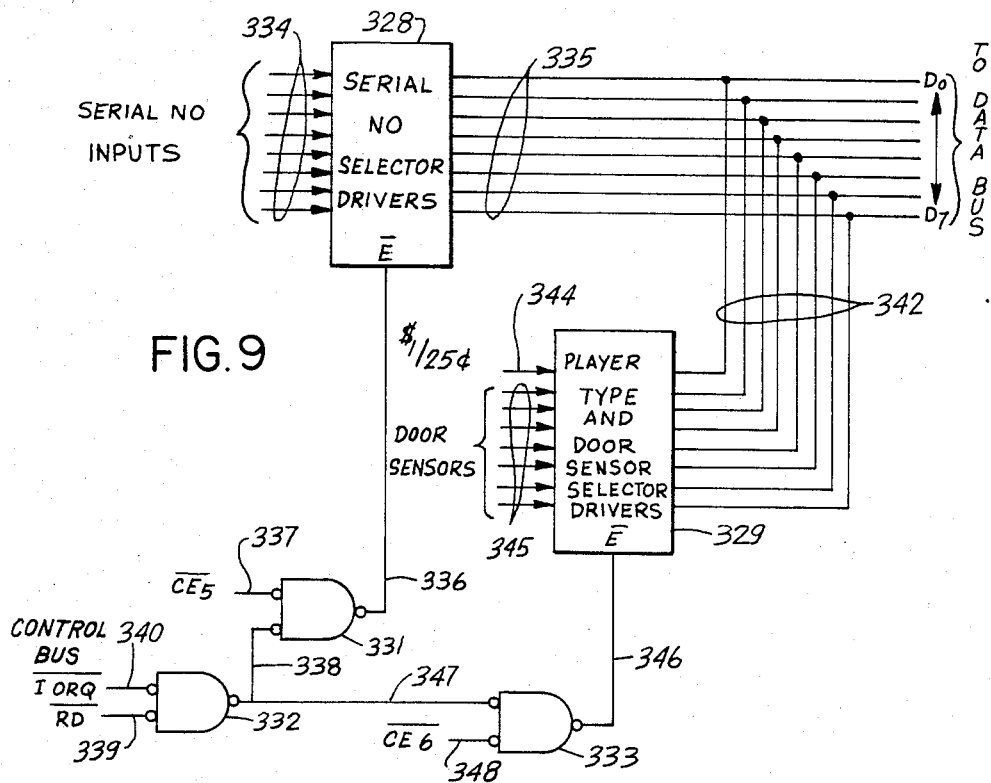
FIG. 9 is a block diagram schematically showing exemplary structure for the unit identification block and interface therefor illustrated in FIG. 3.

Referring now to FIG. 9 there is shown a block diagram schematically illustrating exemplary structure for the unit identification block and interface therefor illustrated in FIG. 3. The unit identification block and interface therefor shown in FIG. 9 essentially comprises first and second selectively enabled drivers 328 and 329 and a plurality of NAND gates 331–333. The first selectively enabled driver 328 may take any of the well known forms of gating devices which act in the conventional manner, when enabled, to apply eight inputs which have been supplied thereto to the outputs thereof after suitable amplification to desired logic levels. Alternatively, conventional driver chips for this purpose such as an MM 74 C244 as available from National Semiconductor may be utilized. The eight inputs to the first selectively enabled driver 328 as supplied on the multi-conductor cable 334 as indicated, are directly tied to an identification terminal in the machine, not shown, wherein the lines are physically cut and selectively tied high or low to indicate the serial number of the particular gaming device.

Additionally, certain of the digits within the serial number may be utilized to indicate the number of stations associated with the gaming device whose serial number is supplied to the first selectively enabled driver 328. The outputs of the first selectively enabled driver 328 are applied through the multi-conductor cable 335 directly to the data portion of the data and control bus 72 as indicated. Thus, whenever the first selectively enabled driver 328 is enabled, an 8 bit byte defining the serial number and size of the machine in which this interface is installed is gated on to the data portion of the data and control bus 72.

The enable input $\overline{E}$ to the first selectively enabled driver 328 is connected through the conductor 336 to the output of NAND gate 331 whose inputs are inverted. The NAND gate 331 may take any of the conventional forms of this well-known type of device which acts in the conventional manner to produce a low at the output thereof connected to the conductor 336 only when both of the inputs thereto are low, providing a high at the output thereof under all other input conditions to thus disable the first selectively enabled driver 328. A first input to the NAND gate 331 is connected through the conductor 337 to the $\overline{CE_5}$ decode from the interface decoder 82 as illustrated in FIG. 3. The second input to the NAND gate 331 is applied through the conductor 338 to the output of the NAND gate 332.

The NAND gate 332 may take the same form as the NAND gate 331 and hence acts to provide a low at the output thereof only when both of the inputs thereto are low. A first input to the NAND gate 332 is supplied on conductor 339 while a second input thereto is supplied on the conductor 340. Both inputs to NAND gate 332 are obtained from the control portion of the data and control bus 72 wherein the $\overline{IORQ}$ input, as aforesaid, takes the form of an input/output request while the $\overline{RD}$ input takes the form, as aforesaid, of a request from the microprocessor indicating that the CPU desires to read data from this IO device. Thus, under these input conditions, a low will be presented on conductor 336 to cause serial number input information to be gated through the portion of the interface illustrated by the first selectively enabled driver 328 on to the data portion of the data and contol bus 72 to identify the machine to the system.

The second selectively enabled driver 329 may take precisely the same form as the first selectively enabled driver 328 and the outputs thereof, connected to the multiconductor cable 342 are commonly applied to the data portion of the data and control bus 72 in the manner indicated in FIG. 9. Thus, whenever the first selectively enabled driver 328 is enabled by a low on the conductor 336, serial number information is gated on to the data portion of the data and control bus 72 while whenever the second selectively enabled driver 329 is selectively enabled, its information is applied to the data portion of the data and control bus 72 due to the common connection of the outputs of the first and second selectively enabled drivers 328 and 329.

The inputs to the second selectively enabled driver 329 further define the type of machine involved and additionally connect to a plurality of sensors for maintaining the security of the system. Thus, the input to the second selectively enabled driver 329 on conductor 344 is connected to a hardwired location in the machine which indicates whether the instant device is a dollar or quarter machine. Preferably, the location of this hardwired input, while not shown, is associated with the coin changers so that changing of the type of machine involved may be readily facilitated together with the information provided to the microprocessor 70. It may be noted that all calculations performed herein are accomplished on the basis of a quarter machine and thereafter, if it is determined that a dollar machine is involved, appropriate multiplication of the result involved occurs.

The remaining inputs to the second selectively enabled driver 329 are associated with various door sensors and microswitches disposed about the machine to indicate whether or not a door has been opened or tampering is occurring. Thus, while the actual source of the inputs supplied on the multi-conductor cable 345 are not illustrated, it will be appreciated by those of ordinary skill in the art that the same could involve microswitches or the like appropriately disposed under various panels and arranged to selectively open or close upon removing of that panel or the opening of a door. Accordingly, whenever the second selectively enabled driver 329 is enabled, further player type information in the form of whether the machine is a dollar or a quarter coin machine, as well as door sensor information, is supplied therethrough and applied to the data portion of the data and control bus 72 through the multi-conductor cable 342. While only seven door sensors have been indicated in FIG. 9 it will be appreciated by those of ordinary skill in the art that additional sensors may be applied through the use of multiplexers or the like.

The enable input $\overline{E}$ to the second selectively enabled driver 329 is supplied thereto through the conductor 346. The conductor 346 as illustrated in FIG. 9 is connected to the output of NAND gate 333. The NAND gate 333 may take the same conventional form of NAND gate whose inputs are inverted as was described in association with NAND gate 331 and hence acts to produce a low or enable level on conductor 346 when both of the inputs thereto are low. The first input to the NAND gate 333 is applied thereto from the output of NAND gate 332 and hence a low is provided to this gate when the microprocessor is requesting data from this input/output device. The second input to the NAND gate 333 is obtained on conductor 348 as a result of the $\overline{CE}_6$ decode which results from a decoding of the address bus from the interface decoder 82 illustrated in FIG. 3. Accordingly, under these input conditions, the second selectively enabled driver 329 will be enabled to gate information on to the data portion of the data and control bus 72 defining the coin type associated with the instant horse race machine as well as the condition of the various door sensors therein.

VIDEO DISK CONTROLLER

Figure 10:
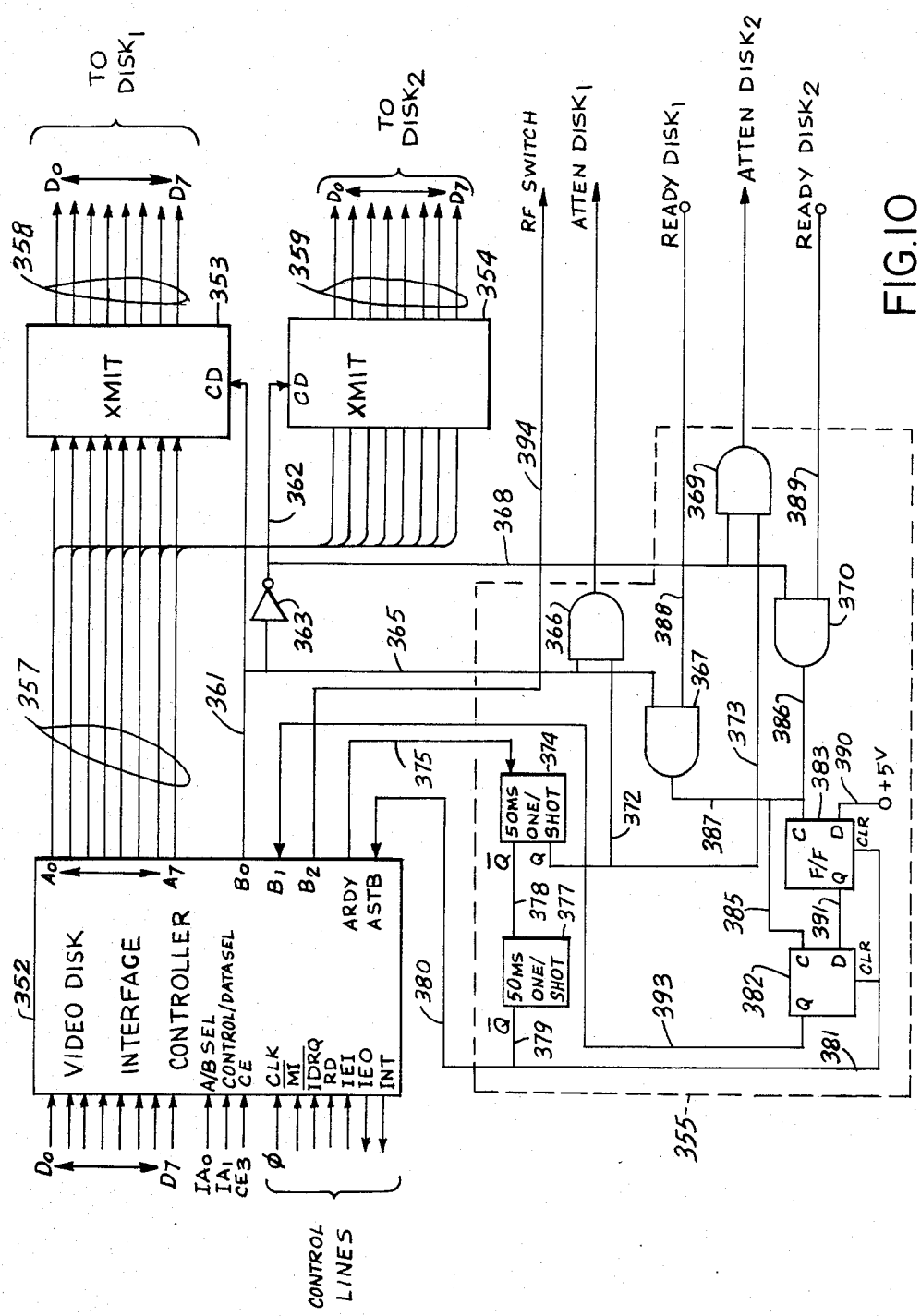
FIG. 10 is a block diagram schematically showing exemplary structure for the video disk controller interface shown in FIG. 3.

Referring now to FIG. 10 there is shown a block diagram schematically illustrating exemplary structure for the video disk controller interface shown in FIG. 3. As the video disk playback devices described in connection with FIG. 3 are intelligent devices which merely require data defining a predetermined command such as a search command, a play and autostop command or the like, as well as a five digit frame address defining the location associated with the command, it will be appreciated by those of ordinary skill in the art that the video disk controller interface illustrated in FIG. 10 need merely direct such data to the appropriate disk player together with appropriate handshaking information in the form of a signal input strobe and be in a condition to receive a ready strobe in return therefrom.

The video disk controller interface illustrated in FIG. 10 comprises an interface controller 352, first and second buffers 353 and 354 and various handshaking logic indicated by the dashed block 355. The video disk interface controller 352 may take precisely the same form of controller described in association with the display interface controller illustrated in FIG. 7 and hence, may conveniently take the form of a Z80-PIO programmable interface controller of the type described therein. Thus, the interface controller 352 is again a two port device wherein the A port is employed for forwarding data to the disk player units representing operational commands to be performed therein and the B port, here employed in the bit mode, is relied upon to supply or receive control information. Therefore, as indicated at the right side of the interface controller 352, inputs corresponding to the 8 bits of information present on the data portion of the data and control bus 72 are supplied thereto at the inputs annotated $D_0$–$D_7$ while the same control information previously described in connection with FIG. 7 is also received or applied to the control lines indicated.

In addition, as also generally described in connection with FIG. 7, chip control information is supplied to the interface controller 352 at the inputs annotated $IA_0$, $IA_1$ and $CE_3$. The $IA_0$ and $IA_1$ inputs control the operation of the interface controller 352 from the standpoint, as was described in connection with FIG. 7, as to whether the A or B ports are selected as output ports and the mode established is control or data select. Similarly, the chip enable information applied to the terminal annotated $\overline{CE}$ is here obtained from the $\overline{CE}_3$ decode from the interface decoder 82 illustrated in FIG. 3.

The A port outputs of the interface controller 352 are connected through the multi-conductor cable 357 in parallel to both the first and second buffers 353 and 354. Thus, anytime the interface controller 352 is enabled and the A outputs are selected, data on the data portion of the data and control bus 72 representing either command information or a 5 bit frame command is supplied through the multiconductor cable 357 in parallel to the first and second buffers 353 and 354. The first and second buffers 353 and 354 may take any of the well-known forms of this conventional class of device which, when selectively enabled, act to raise input information supplied thereto to appropriate logic levels and further supply such information to a receiving device. Thus, the first and second buffers 353 and 354 may again conveniently take the form of 8304 transmission and receive buffers, as available from the National Semiconductor, which are here selectively wired to perform only the transmit function.

The data outputs of the first buffer 353, as present on the multi-conductor cable 358 are supplied, as indicated in FIG. 10 as 8 bits in parallel to the first video disk unit 168 shown in FIG. 3 while the outputs of the second buffer 354 are applied through the multiconductor cable 359 as 8 bits in parallel to the input of the second video disk unit 169 as illustrated in FIG. 3.

The first and second buffers 353 and 354 are selectively enabled by a high level provided at the input thereto annotated CD. The CD input to the first buffer 353 is connected through the conductor 361 directly to the B0 output of the interface controller 352 while the CD input to the second buffer 354 is connected through the conductor 362 and an inverter 363 to the B0 output of the interface controller 352. Thus, whenever a high is present at the B0 output of the interface controller 352 the first buffer 353 is enabled to apply 8 bits of information from the $A_0$–$A_7$ outputs of the interface controller 352 through the multi-conductor cable 357 to the first video disk player on the multiconductor cable 358 while when the B0 output of the interface controller 352 is low, the second buffer 354 is enabled so that the same 8 bits of information as present at the $A_0$–$A_7$ outputs of the interface controller 352 are applied through the multiconductor tables 357 and 359 to the inputs of the second video disk controller 169 as illustrated in FIG. 3.

The B0 output of the interface controller 352 is directly connected through the conductor 365 to first inputs of AND gates 366 and 367 within the handshaking logic indicated by the dashed block 355 while the inverted condition of the B0 output of the interface controller 352 is supplied through conductor 368 to first inputs of AND gates 369 and 370 within the handshaking logic indicated by the dashed block 355. AND gates 366 and 367 are associated with disk one in the same manner as the buffer 353 while AND gates 369 and 370 are associated with the second video disk in the same manner as the buffer 354.

The second input to the AND gate 366 as well as the AND gate 369 is connected through conductors 372 and 373 to the output of a one-shot flip-flop 374 within the handshaking logic indicated by the dashed block 355. The one-shot 374 may take any of the conventional forms of this well-known class of device which acts, upon the receipt of an input, to shift from a first to a second state for the duty cycle thereof, which as indicated in FIG. 10 is 50 milliseconds, and upon the expiration of the duty cycle to return to its initial state. Thus, whenever an input is supplied to the one-shot 374, the Q output thereof connected to conductors 372 and 373 will go high for 50 milliseconds and thereafter will return to its original state wherein a low is present at the Q output thereof. Thus, whenever the one-shot 374 is toggled, AND gates 366 and 369 will be enabled to produce a high at the outputs thereof, annotated attention disk 1 and attention disk 2 provided a high is applied to the other input thereof.

The AND gate 366 will be enabled to produce a high at the output thereof annotated attention disk 1 whenever a high is present at the B0 output of the interface controller 352 and the one-shot 374 is toggled, and conversely AND gate 369 will be enabled to produce a high at the output thereof annotated attention disk 2 whenever a low resides at the B0 output of the interface controller 352 and the one-shot 374 is toggled. The outputs of the AND gates 366 and 369 serve essentially as device strobes for the video disk 1 and video disk 2 players, respectively, and it will be seen that the device strobe occurs whenever the first or second buffer 353 and 354 associated with the appropriate one of the disk players is also enabled.

The input to the one-shot 374 is provided through conductor 375 from the output of the interface controller 352 annotated ARDY. This output appears, as will be recalled from previous discussions of the Z80-PIO controller whenever 8 bits of data have been loaded at the A outputs thereof annotated $A_0$–$A_7$. Thus, the input to the one-shot 374 will go high whenever 8 bits of data are ready for application to either of the first or second buffers 353 and 354. Thus, whenever 8 bits of data are ready at the $A_0$–$A_7$ outputs of the interface controller 352 and an appropriate one of the first and second buffers 353 and 354 are enabled by the condition of the B0 output of the interface controller 352, a high will also appear on the conductor 375 to toggle the one-shot 374 and hence enable an appropriate one of the AND gates 366 and 369 so that a device strobe is provided to the appropriate one of the disk 1 and disk 2 video playback devices.

The output of the one-shot 374 annotated $\overline{Q}$ is connected to the input of the one-shot 377 through the conductor 378. The one-shot 377 may take precisely the same form as the one-shot 374 and it too exhibits a duty cycle of 50 milliseconds. Thus, since its input is connected to the complimentary output of the flip-flop 374, 50 milliseconds after the flip-flop 374 is toggled, a high will be produced on the conductor 378 to toggle the one-shot 377. The $\overline{Q}$ output of the one-shot 377 is connected through conductors 379 and 380 to the device strobe input to the interface controller 352. This means, that 50 milliseconds after an A ready output is produced by the interface controller 352 on conductor 375, a device strobe will be received thereby at the input thereto connected to conductor 380 and this device strobe will persist for 50 milliseconds. Thus, when an A ready output is produced by the interface controller 352 on the conductor 375, an appropriate strobe for the video disk device selected will be produced at the outputs of one of the AND gates 366 or 369 and persist for 50 milliseconds.

Thereafter, the one-shot 377 will be toggled to apply a device strobe to the input to the interface controller 352 connected to conductor 380 and disk device strobe too will persist for 50 milliseconds. It should also be noted that the output of the one-shot 377 is also applied through conductor 381 to the clear inputs of a pair of D type flip-flops 382 and 383 also located within the handshaking logic indicated by the dashed block 355. The D type flip-flops 382 and 383 may take any of the well-known forms of this conventional class of device which act in the presence of a clock input to set to the state of the input present at the D input thereof. The clock inputs of each of the D type flip-flops 382 and 383 are connected through conductors 385–387 to the outputs of the AND gates 367 and 370. Thus, when the output of either AND gate 367 or 370 goes high, both the D type flip-flops 382 and 383 will be clocked.

The AND gates 367 and 370 may take any of the well-known forms of this conventional class of device which act to produce a high at the output thereof only when both of the inputs thereto go high. A first input to each of the AND gates 367 and 370 is connected to the selection information provided by the interface controller 352 at output $B_0$ thereof so that whenever disk 1 is selected by a high at the output of $B_0$, the AND gate 367 will be enabled due to the application of this high on conductor 365 while when the disk 2 playback device is selected, the AND gate 370 will be selected due to the low level of the $B_0$ output of the interface controller 352 which is inverted by the inverter 363 and applied as an enabling input to the AND gate 370 through the conductor 368. A second input to each of the AND gates 367 and 370 is applied through conductors 388 and 389 from terminals annotated Ready Disk 1 and Ready Disk 2 in FIG. 10.

As will be readily appreciated by those of ordinary skill in the art, each of the video disk playback units will produce a high or ready level on its appropriate output whenever 8 bits of data has been supplied thereto and the same have been appropriately processed by the disk playback device. Thus for instance, if a search frame 10 signal is sent to the disk 1 unit, a high level will be presented on conductor 388 when the disk 1 unit has completed the search for frame 10. Accordingly, it will be appreciated that the AND gates 367 and 370 will produce a high at the outputs thereof connected to the clock inputs of the D type flip-flops 382 and 383 whenever its respective playback unit has been selected and the unit has completed the processing of the instruction previously forwarded thereto from the data outputs of the associated one of the first and second buffers 353 and 354.

The D input to the D type flip-flop 383 is connected through conductor 390 to a source of positive potential, i.e. +5 volts, while the D input to the D type flip-flop 382 is connected through a conductor 391 to the Q output of the D type flip-flop 383. This means that when the first clock signal is produced by either of the AND gates 367 or 370 clocking both of the D type flip-flops 382 and 383, the D type flip-flop 383 will be set to place a high on the Q output thereof connected to conductor 391. Then when the second clock is generated by either of the AND gates 367 or 370 the Q output of the D type flip-flop 383 will cause D type flip-flop 382 to be set placing a high at the Q output thereof. The Q output of the D type flip-flop 382 is connected through conductor 393 to the $B_1$ input of the interface controller 382. This input is employed for purposes of generating a device ready input which is forwarded to the microprocessor unit 70 through the control lines to indicate that the previous instruction forwarded to the appropriately addressed disk unit has been processed and hence, that disk unit is awaiting the receipt of further instructions.

The remaining output of the interface controller 352, annotated $B_2$ is connected to a conductor 394. This conductor is connected to an output annotated RF switch. The RF switch represents a relay actuated double pole switch corresponding to the switch means 170 and 171 in FIG. 3. Hence, this output of the interface controller 352 is employed to switch the video and audio outputs of each of the video disk playback units 168 and 169 to the T.V. display 167. Thus, this extends the control of the microprocessor unit 70 not only to the video disk playback units per se, but to control of the outputs thereof to the T.V. display 167.

Accordingly, it will be appreciated by those of ordinary skill in the art that data corresponding to command information and including appropriate frame designation information may be switched from the data portion of the data and control bus to respective ones of the video disk playback units which are addressed. Furthermore, the use of the selection information which is output from the interface controller 352 to select the appropriate one of the first and second buffers 353 and 354 for applying information from the data bus to the playback unit is also employed to generate a device strobe therefor at the terminals annotated attention disk 1 and attention disk 2, to generate the ready strobe at the interface controller 352 for the purposes of allowing that device to accept more data and thereafter for gating in the ready strobe from the playback unit indicative that the playback unit has completed the last instruction which has been forwarded thereto. Additionally, the terminal annotated RF switch controls which output of the video playback devices is being applied to the T.V. set, is now being appreciated that playback will typically be occurring from one video disk playback unit while the microprocessor is causing the other unit to search for a desired frame which may be the start of a race to be selectively played back upon the close of betting.

PLAYER STATION INTERFACE CONTROLLERS AND EXEMPLARY PLAYER STATION STRUCTURE

The player station interface controllers and appropriate player station structure therefor are illustrated and described in connection with FIGS. 11–17 below. For purposes of describing the circuitry involved in a simplified manner, the same has been presented below, where possible, in the manner to correspond to the organization shown in FIG. 3. However, since the circuitry and number of indicia associated with each of eight entries and the win, place and show status thereof is somewhat extensive and must be coupled with a specialized display associated with Quinella and Pick-Five bets, it has been necessary to subdivide the presentation of the structure associated with an exemplary player station to the various circuit sections associated with win, place, show and Quinella.

Figure 13:
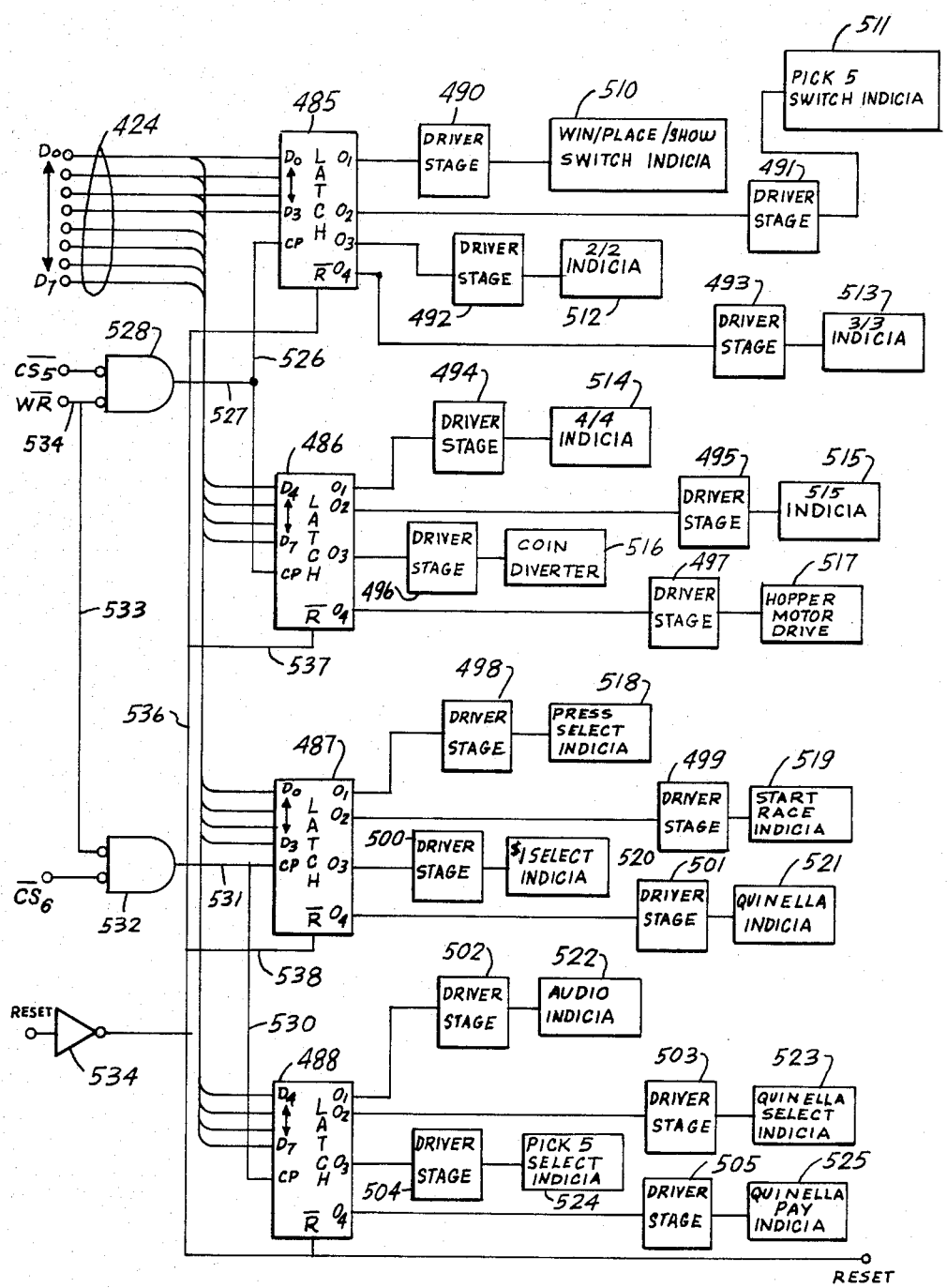
FIG. 13 is a block diagram schematically showing exemplary structure for the switch indicia illustrated in FIG. 3.
Figure 14:
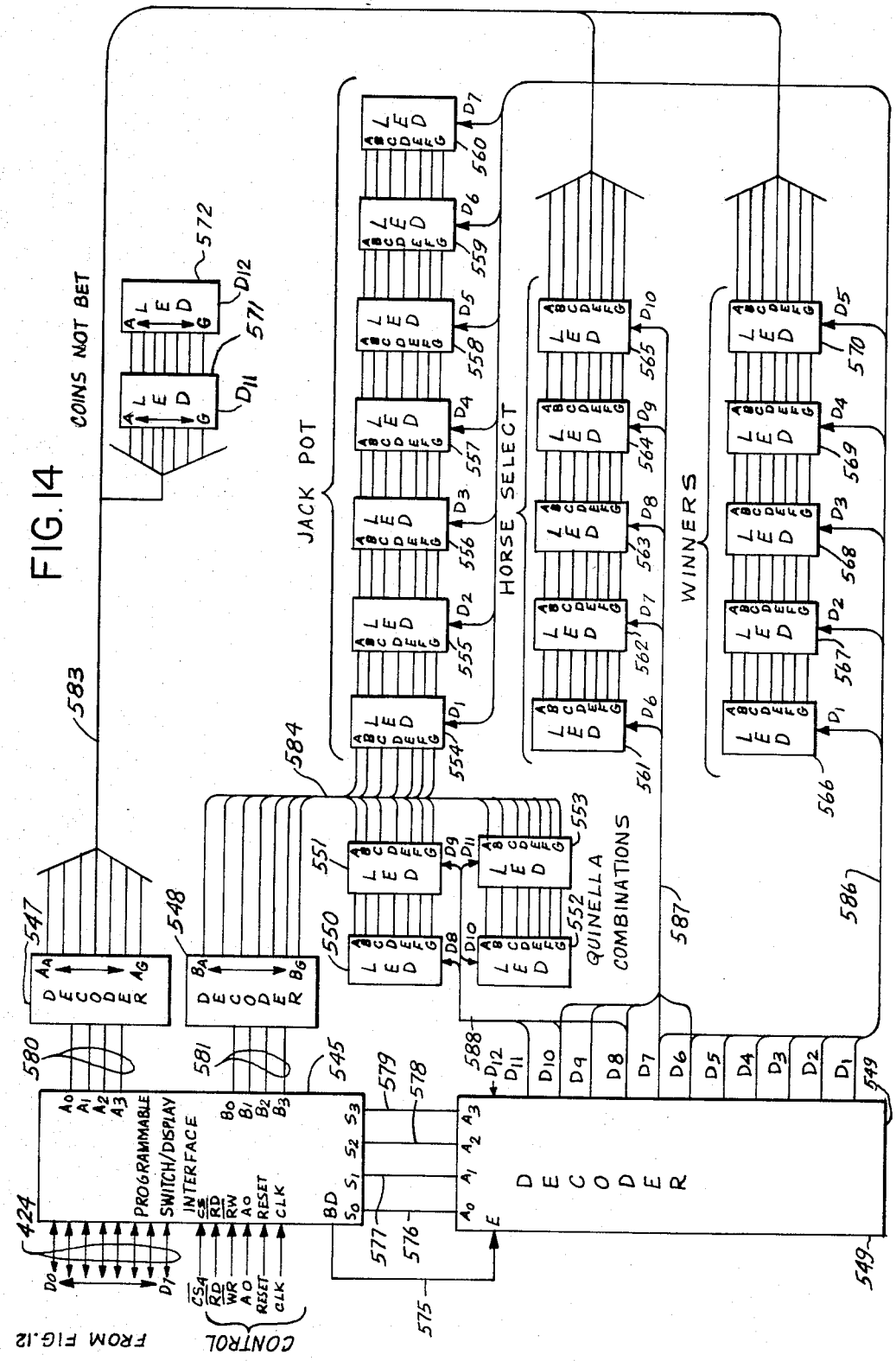
FIG. 14 is a block diagram schematically showing exemplary Quinella-Pick-Five portions of the LED displays illustrated in FIG. 3.
Figure 15:
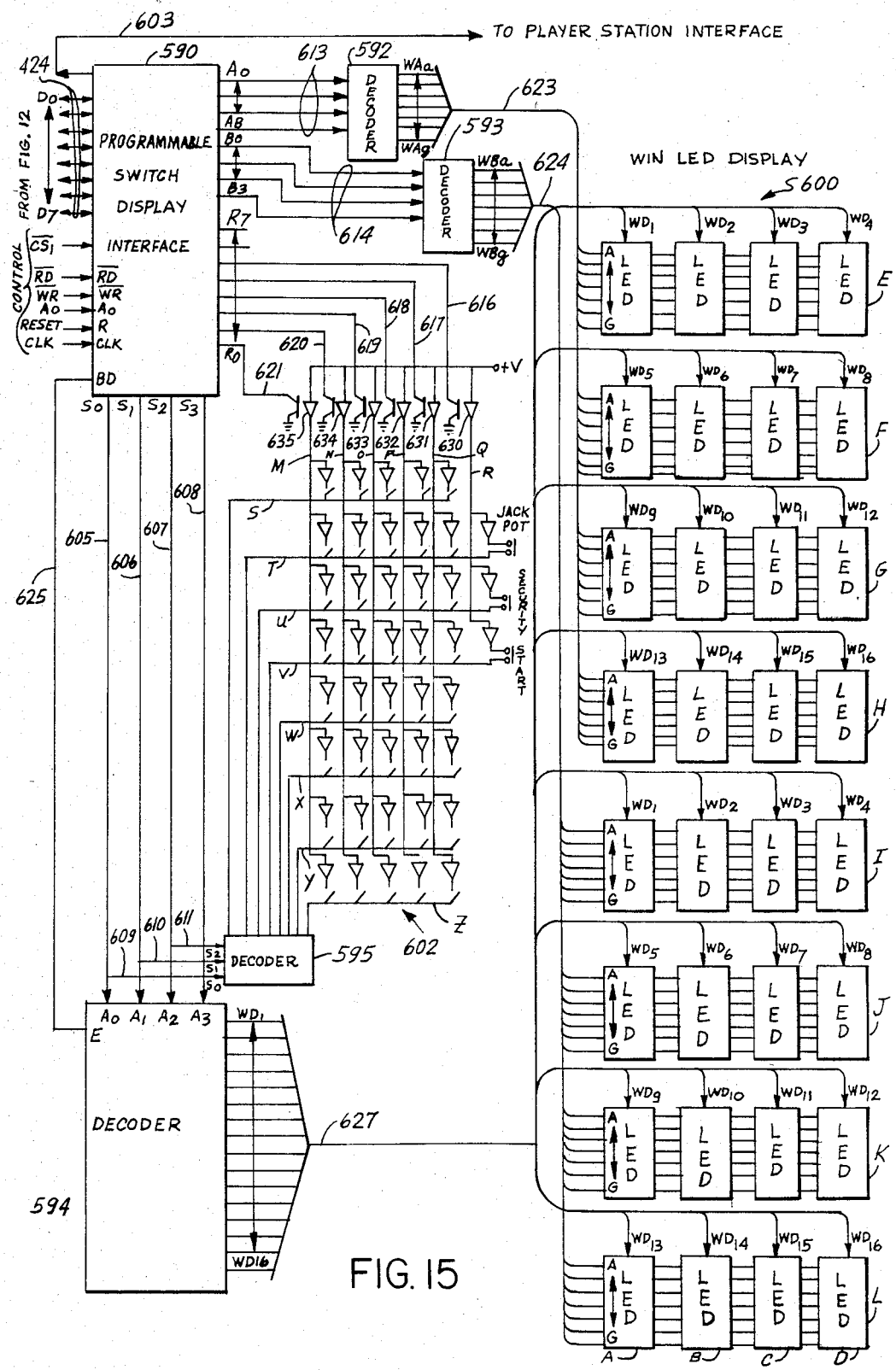
FIG. 15 is a block diagram schematically illustrating exemplary Win portions of the LED displays shown in FIG. 3.
Figure 16:
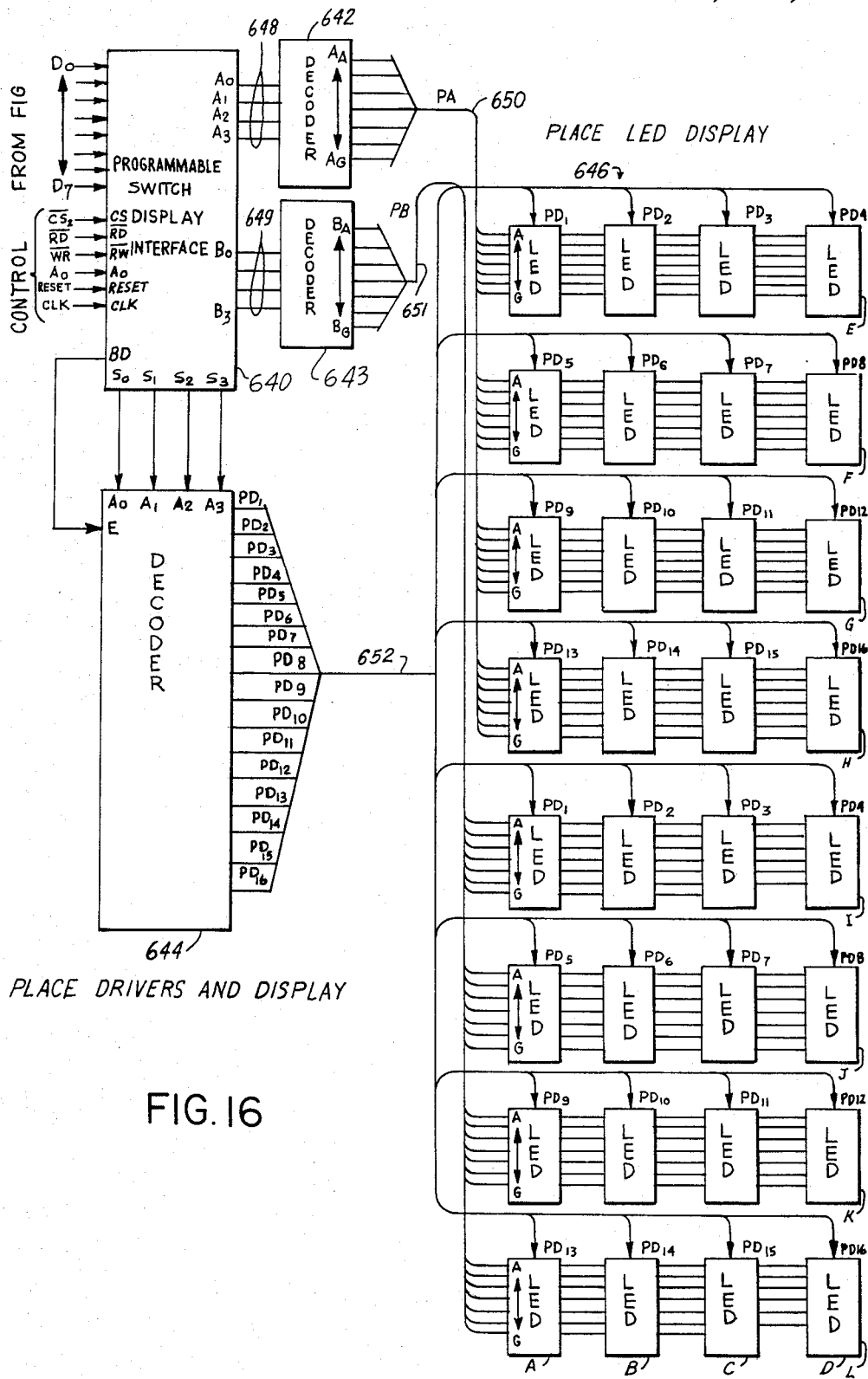
FIG. 16 is a block diagram schematically illustrating exemplary Place portions of the LED display shown in FIG. 3.
Figure 17:
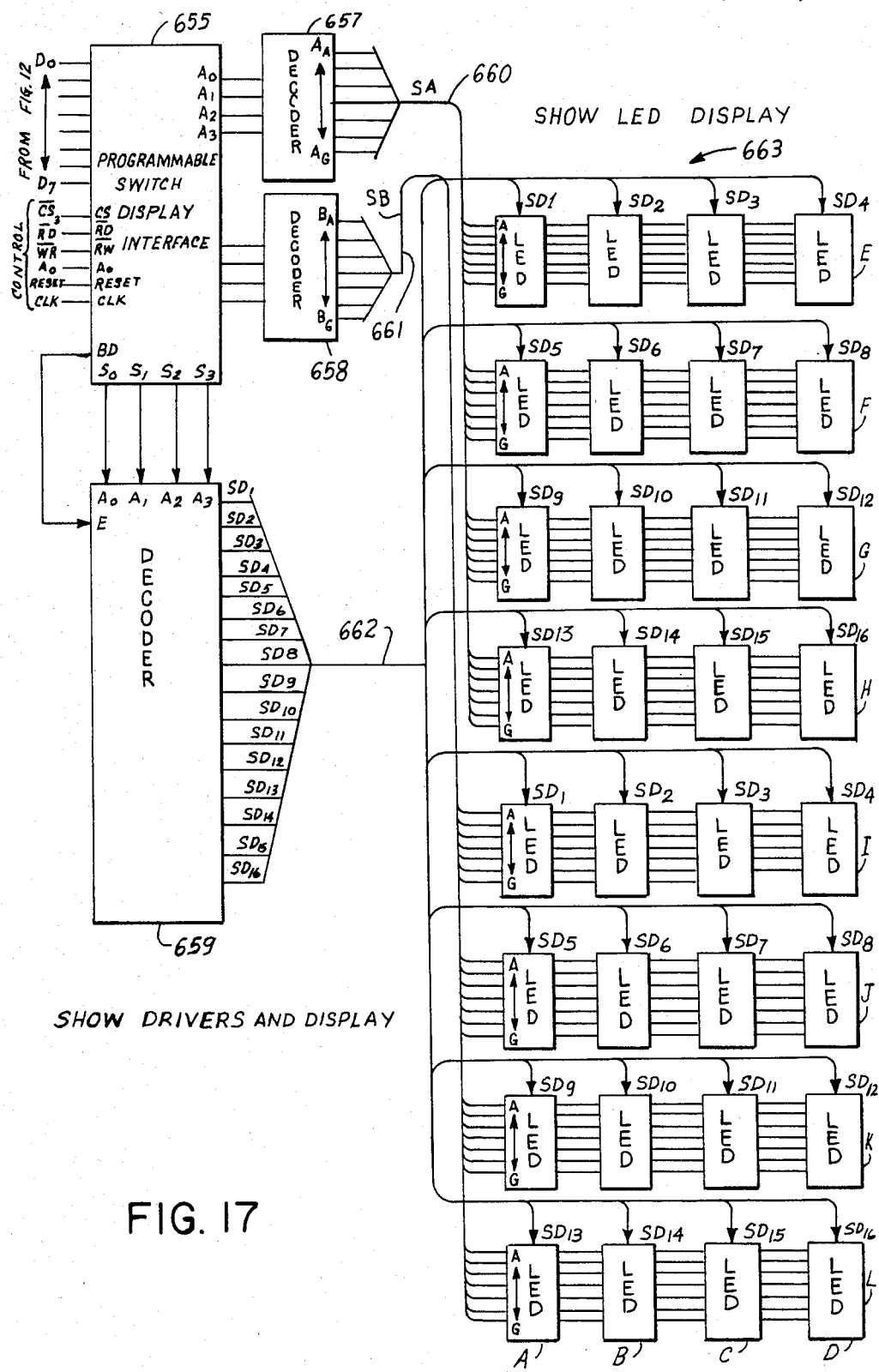
FIG. 17 is a block diagram schematically illustrating exemplary Show portions of the LED displays depicted in FIG. 3.

Therefore, prior to beginning a review of this section, the reader should be aware that FIG. 11 is devoted to the player station interface controllers illustrated as block 160 in FIG. 3, FIG. 12 is directed to the portion of the player station number 1 interface associated with decoding information for a given station, FIG. 13 illustrates exemplary switch indicia and the like as well as FIG. 14 illustrate the portion of the LED display associated with Quinella and Pick-Five wagers together with the portions of the player stations interface therefor, and FIGS. 15–17 illustrate the win, place and show LED displays respectively, FIG. 15 additionally showing the switch inputs. Thus, as this description proceeds the reader should maintain an overall view as to the manner in which the various circuit portions have been divided for purposes of disclosure.

Referring now to FIG. 11 there is shown a block diagram schematically illustrating details of an exemplary player station interface controller generally corresponding to the player station interface controllers 160 as illustrated in FIG. 3. The player station interface controller arrangement illustrated in FIG. 11 comprises first and second player station interface controllers 396 and 397. Each of the first and second player station interface controllers 396 and 397 may take any of the well known forms of parallel input/output interface controller device well known to those of ordinary skill in the art. Again, for the purposes of the instant description, the Z80-PIO programmable interface controller as available from Zilog Corporation may be viewed as being employed as was the case for the majority of peripheral descriptions set forth herein.

Thus, as will be apparent upon an inspection of FIG. 11, each of the first and second player station interface controllers is connected, at the left-hand portion thereof to the 8 data lines within the data and control bus 72 at the inputs thereto annotated $D_0$–$D_7$ and to the control lines annotated CLK, $\overline{M1}$, $\overline{IORQ}$, $\overline{RD}$, IEI, IEO and $\overline{INT}$ within the control portion of the data and control bus 72 in precisely the same manner as was explained above except that the Interrupt Enable Output (IEO) of the second player station interface controller 397 is connected as an input to the Interrupt Enable In Input of the first player station interface controller 396 through the conductor 398. Both the first and second player station interface controllers 396 and 397 receive address bits $A_0$ and $A_1$ as indicated on the address bus where the same control the AB select and control/data inputs thereto. In addition, chip enable signals $CE_1$ and $CE_0$ respectively, are provided from the interface decoder 82 as shown in FIG. 3.

The first player station interface controller 396 supplies data to each player station connected thereto through the A port outputs while address information and the like is supplied to each station connected thereto through the B port outputs wherein such address information is indicated as $B_0A_0$–$B_6A_6$. The $B_7$ output is employed for control purposes. The second player station interface controller 397 however, is operated in an input bit mode wherein, as indicated in FIG. 11, interrupts from each player station connected thereto are supplied individually to one of the $B_0$–$B_7$ inputs and the application of any interrupt to these inputs will result in the player station interface controller generating an interrupt on the control line annotated $\overline{INT}$. Upon servicing of this interrupt by the microprocessor unit 70, the vector address of the interrupting player station will be placed upon data lines at the terminals annotated $D_0$–$D_7$ so that the interrupting player station is identified and may be addressed.

Thus, the output terminals annotated $A_0$–$A_7$ for the first player station interface controller 396 are connected in parallel to the interface of each player station present and similarly, the same connection would be employed for the $B_0$–$B_6$ outputs thereof. Only one of the inputs $B_0$–$B_7$ of the second player station interface controller 397 would be connected to each player station employed, and hence in the present two station embodiment, the $B_0$ input would be connected to player station number 1 while the $B_1$ input would be connected to player station number 2. The remaining inputs $B_2$–$B_7$ would not be employed.

The manner in which the various outputs of the first player station interface controller 396 and the interrupt inputs to the second player station interface controller 397 will be appreciated in connection with succeeding figures. Here, however, it is only necessary to appreciate the nature of the information coupled and decoupled from the data and control bus 72.

The remaining outputs and inputs to the first player station interface controller 396 are devoted to the generation of control information for both the succeeding circuits to be controlled and for the device itself. Thus, the $B_7$ output of the first player station interface controller 396 is connected through conductor 405 and an inverter 407 to a first input of a NAND gate 409 and directly to the input of NAND gates 410 and 411.

The second input to the NAND gate 409 is supplied through a conductor 413 from the a ready output of the first player station interface controller 396. In addition, this input is supplied through a conductor 414 to the input of a NAND gate 415. Each of the NAND gates 409-411 and 415 may take any of the conventional forms of this well-known class of device which act, as aforesaid, to produce a low at the output thereof only when both of the inputs thereto are high. Thus, in the case of the NAND gate 409, a low or, as indicated in FIG. 11, a Write Strobe ($\overline{WRSTB}$) signal is output by the NAND gate 409 whenever $B_7$ is low and the A Ready output of the first player station interface controller 396 is high to indicate that a byte data is ready at the A outputs of the first player station interface controller 396. Similarly, in the case of NAND gate 410, which acts to generate a Read Data Strobe ($\overline{RDSTB}$)signal as indicated in FIG. 11, the first input thereto is connected through conductor 405 to the $B_7$ output of the first player station interface controller 396 while the second input thereto is connected through conductor 417 to the B Ready output of the first player station interface controller 396 to indicate that a byte of data is ready at the B outputs thereof. Thus, whenever the $B_7$ output on conductor 405 is high and a B ready signal is generated by the first player interface controller 396, a $\overline{RDSTB}$ signal is generated at the output of NAND gate 410.

The $B_7$ output of the first player station interface controller 396 is also connected, as aforesaid, to a first input of the NAND gate 411 while the second input thereof on the conductor 418 is connected through an inverter 419 to the terminal annotated $\overline{DEVSTB}$. As will be appreciated by those of ordinary skill in the art, the terminal annotated $\overline{DEVSTB}$ will go low whenever a device at the player station with which the first player station interface controller 396 is communicating has accepted and processed the data being forwarded thereto. The output of the NAND gate 411 is connected through the conductor 420 to the $\overline{BSTB}$ input to the first player station interface controller 396.

Thus, for a case where data is being supplied to the peripheral from the B port outputs, the $B_7$ output connected to conductor 405 will be high so that when a B Ready signal is applied to the NAND gate 410, a $\overline{RDSTB}$ signal will be output thereby. Subsequently when the device responds with a $\overline{DEVSTB}$ signal at the appropriately marked input terminal, this signal is inverted by the inverter 419 to cause the NAND gate 411 to supply a low level output on conductor 420 which serves as a $\overline{BSTB}$ signal to the first player station interface controller 396. This will cause, as should now be appreciated, an interrupt to be generated for the purpose of requesting additional data be forwarded to the first player station interface controller 396.

Similarly, the second input to the NAND gate 415 is connected through conductor 421 to the output of the inverter 419 and hence a high level is present thereon whenever the terminal annotated $\overline{DEVSTB}$ goes low. This input condition is NANDED, as aforesaid, with the A Ready output present on conductors 413 and 414 so that NAND gate 415 will generate an $\overline{ASTB}$ signal whenever data has been gated from the A terminals of the first player station interface controller 396 and subsequently an appropriate device strobe is received. The manner in which each of the output signals generated in FIG. 11 is employed and the $\overline{DEVSTB}$ input and the various interrupts are generated will be better understood in connection with FIGS. 12-17 which are devoted to the details of an exemplary player station.

Referring now to FIG. 12 there is shown a block diagram schematically illustrating exemplary structure for a player station interface such as represented by block 147 in FIG. 3 and, more particularly, the portions thereof associated with decoding address information specific to that particular player station as well as generating various control and timing informtion therefor. The exemplary player station interface illustrated in FIG. 12 comprises a multiconductor cable 424 for further conveying data from the player station controllers illustrated in FIG. 11, a multiconductor cable 425 for further conveying address information from the player station controllers illustrated in FIG. 11, Exclusive OR gates 427-429 and an AND gate 430 which perform the function of a station decoder, a station device decoder 432 and various additional logic for providing control information to various elements within a player station.

The multi-conductor cable 424 merely serves to further convey the 8 bits of data from the A port of the first player station interface controller 396 shown in FIG. 11 to the player station here being considered and, as indicated by the branching conductors annotated to Additional Player Stations, in parallel to remaining player stations employed within a given embodiment of the present invention. Similarly, the multi-conductor cable 425 serves to convey information from the B port of the first player station interface controller 436 or more particularly port outputs $B_0-B_6$ thereof to this particular player station interface as well as in parallel to any remaining player stations as indicated.

The three high order conductors within the multi-conductor cable 425, i.e. those connected to the terminals annotated $B_4A_4-B_6A_6$ are connected to respective ones of the OR gates 427-429 to serve, respectively, as a first input thereto. The OR gates 427-429 are exclusive OR gates which act to provide a high at the output thereof only when one of the inputs thereto is high providing a low under all other input conditions. Thus the OR gates 427-429 will provide a high at the output thereof connected to conductors 434-436 only when one of the two inputs thereto is high. The second input to each of the OR gates 427-429 is connected through conductors 438-440 to the station identification switches indicated by the dashed block 441. As will be seen upon an inspection of FIG. 12, the station identification switches indicated by the dashed block 441 comprise three switches having a first side thereof connected to ground and a second side thereof tied to a source of +5 volts through a conductor 442 and the individual resistors 443-445 connected to each of the conductors 438-440.

As well known to those of ordinary skill in the art, a closed condition of the switches within the dashed block 441 will ground the line providing a zero input to its respective exclusive OR gate 427-429 while the open condition of the switch will allow the line to retain the high condition associated with the +5 voltage source. Thus, the station decoder array established by the exclusive OR gates 427-429 is essentially a complimentary address decoder wherein either the switches or addresses are set to the compliment of the desired station address and the address is thus decoded in that manner.

Thus, for instance, if this station is defined as station number 1 or the 000 station each of the switches within the dashed block 441 could be closed to reflect the actual station address and the address of the station issued on the address lines $B_4A_4-B_6A_6$ would be the compliment thereof or 111. Alternatively, the station could be addressed as the 000 station while the switches within the dashed block 441 are retained in the open condition to reflect the complimentary address or a 111 address. At any rate, it will be seen that the switches within the dashed block 441 are set for the player station to be defined thereby under the appropriate coding technique and since three switches are present within the dashed block 441 up to eight stations may be addressed. The output of each of the exclusive OR gates 427-429 is supplied through respective ones of the conductors 434-436 to the inputs of the three input AND gate 430.

The three input AND gate 430 may take any of the conventional forms of this well-known class of device which acts in the well-known manner to produce a high at the output thereof connected to conductor 447 only when all of the inputs thereto are high providing a low at this output under all other input conditions. The output of the AND gate 430 is connected through conductor 447 to an enable input to the station device decoder 432 and to one input of the AND gates 448 and 449.

The station device decoder 432 may take any of the well-known forms of this general class of device which acts when enabled to decode the condition of the three inputs provided thereto and produce a high at one of the eight outputs thereof. Thus, for instance, an Intel 3205 decoder of the type previously described may be employed for this purpose. The three inputs to the station device decoder 432 are provided from the bit input conductors within the multi-conductor cable 425 associated with input bits $B_1A_1-B_3A_3$. The eight outputs of the station device decoder 432 are provided at the output conductors annotated $\overline{CS_1}-\overline{CS_8}$. All of the demultiplexed outputs of the station device decoder 432 are employed in connection with operating additional control devices at specific portions of a player station which has been addressed and shall be described in connection with FIGS. 13-17 with the exception of the output annotated $\overline{CS_8}$ which is connected through conductor 450 to one input of an AND gate 451. Thus, whenever a station address is decoded and the station device decoder 432 is enabled, the three address conductors within the multi-conductor cable 425 which carry address bits $B_1A_1-B_3A_3$ are decoded to provide an enable level at a selected one of the eight outputs thereof annotated $\overline{CS_1}-\overline{CS_8}$.

The $\overline{WRSTB}$ and $\overline{RDSTB}$ outputs of the player station interface controllers as shown in FIG. 11 are inverted and applied to the conductors 453 and 454 connected to the appropriately annotated terminals. The read strobe input applied to the conductor 454 is applied to a first input of an OR gate 456 and through the conductor 457 to the second input of AND gate 449 which, it will be recalled, receives a first enabling signal through the conductor 447 whenever a player station decode is obtained from the output of the AND gate 430. When the station address has been decoded and a read data strobe is present on the input conductor 454, the output of the AND gate 449 will go high, in the well-known manner, to generate a Read Data Signal at the terminal annotated RD connected to the output of the AND gate 447 on conductor 458. The RD output as generated by the output of the AND gate 449 is employed in a manner which will be discussed in detail in connection with the circuitry described in conjunction with FIGS. 14-17.

The write strobe applied to the conductor 453 is additionally applied as a second input to the OR gate 456 as well as an input to the NAND gate 460. In addition, as will be apparent through an inspection of FIG. 12, additional player station interfaces receive the inverted write and read strobes applied to the conductors 453 and 454 in a manner indicated by the conductors 459 and 460. Hence, in essence, every input which is illustrated as applied to the player station interface illustrated in FIG. 12 is applied in parallel to each player station in precisely the same manner as illustrated in FIG. 12.

The OR gate 456 functions in the conventional manner to provide a high at the output thereof any time either of the inputs thereto go high. Thus, the output of the OR gate 456 which is connected to the conductor 462 will go high any time a write strobe or read strobe is applied to either of the input conductors 453 or 454. The output of the OR gate 456 is applied as a second input to the AND gate 448. The remaining input to the AND gate 448, it will be recalled, is applied as a function of the station decode on conductor 447. Hence, whenever the station has been selected and a read or write strobe is applied to the interface, causing the output of OR gate 456 to go high, the AND gate 448 will generate a high at the output thereof connected to the conductor 464.

The output of the AND gate 448 which is applied to the conductor 464 is connected to a first input of a synchronizing circuit 465. The synchronizing circuit 465 acts in effect to synchronize the periodically occurring high levels representing either a write or read strobe to an enabled player station to a 2 MHz clock which serves as the clocking source for the player station being addressed. Thus, the synchronizing circuit 465 may take the form of a multi-stage shift register formed of D type flip-flops or the like, which receives a high level output from AND gate 448 at a D input thereto and receives synchronizing clock pulses from the 2 MHz clock at the clocking input thereto. The clock input is applied to the synchronizing circuit 465 through the conductor 466 and while the 2 MHz clock 468 may be an independent clock source in the form represented in FIG. 12, it will be appreciated by those of ordinary skill in the art that it is preferable if a division of the system clock is employed.

The output of the 2 MHz clock is directly applied to the output terminal annotated Clock through a conductor 469 and the clock input of the synchronizing circuit 465 through the conductor 466. The output of the synchronizing circuit 465 is applied directly to the conductor 471 and represents a device strobe which is inverted and applied to the circuit illustrated in FIG. 11 to indicate to the first player station interface controller 396 that the interface is ready to receive more data. Additionally, the output of the synchronizing circuit is applied through the conductor 472 to the one clock delay device 473. The delay device 473 may take the conventional form of a pair of flip-flops or the like employed to delay the output of the synchronizing circuit 465 through one clock cycle and thereafter apply this delayed output to a second input of the NAND gate 461. The NAND gate 461 may take the form of a conventional NAND gate which acts to produce a low at the output thereof any time both of the inputs thereto go high. Further since it receives, as aforesaid, a write strobe level through conductors 453 and 460, it will be seen that the output of the NAND gate 461 will go low one clock cycle after the write strobe is received and synchronized.

The output of the NAND gate 461, as applied to conductor 475, is employed to produce a $\overline{WR}$ signal level which is utilized in a manner which will be more fully appreciated in connection with FIGS. 13-17. The output of the NAND gate 461 is additionally supplied through the conductor 476 to the lower input of the AND gate 451. The upper input to the AND gate 451 receives, as aforesaid, a $\overline{CS_4}$ signal from the output of the station device decoder 432 and hence the output of the AND gate 451 will go high anytime the station device decoder 432 decodes a $\overline{CS_4}$ condition on the 3 bits of address information supplied thereto and the output of the NAND gate 475 is high. The output of the AND gate 451 is applied through conductor 478 to one input of an OR gate 479.

The OR gate 479 may take any of the well-known forms of this conventional device which acts to produce a high at the output thereof anytime either of the inputs thereto go high. A second input to the OR gate 479 is supplied on conductor 480 from a terminal annotated master reset which is a system control level present in the control portion of the control and data bus 72. Thus, the output of OR gate 479 will go high anytime a master reset level is generated on conductor 480 or the output of the AND gate 451 goes high. The output of the OR gate 479 is connected to a terminal annotated Reset and is employed in a manner which will become apparent below in connection with FIGS. 13-17.

Referring now to FIG. 13 there is shown a block diagram schematically illustrated latching and driver structure for the switch indicia and other indicia illustrated in connection with the exemplary operator control panel and informational display shown in FIG. 2A and generally indicated as block 145 in FIG. 3. The structure illustrated in FIG. 13 comprises a plurality of latch means 485-488, a plurality of driver stages 490-505 and a plurality of indicia or motor drives 510-525. In essence, 8 bits of data are applied in parallel to the circuit illustrated in FIG. 13 from the multi-conductor cable 424 shown in FIG. 12 and continued in FIG. 13. The first 4 bits of data present on the multi-conductor cable 424 are applied in parallel to the latch means 485 and 487 while the four high order bits of data present in the multi-conductor cable 424 as indicated by the terminals annotated $D_4$-$D_7$ are applied to the data inputs of the latch means 486 and 488. The latch means 485-488 may take any of the well-known forms of this conventional class of device which act when enabled to latch up data applied to the D inputs thereof and maintain this data at the four outputs thereof until such time as the latches are reset or new data is written therein. Thus typically, each of the plurality of latch means 485-488 may take the form of 74C175 4 bit latches as available from the National Semiconductor Corporation of California.

The enable input to the latch means 485 and 486 is connected through the conductors 526 and 527 to the output of an AND gate 528 whose inputs are inverted. Similarly, the enable inputs to the latch means 487 and 488 are connected through the conductors 530 and 531 to the output of the AND gate 532 whose inputs are also inverted. Each of the AND gates 528 and 532 may take any of the well-known forms of this conventional class of device which acts in the conventional manner to produce a high or enable level at the output thereof when both of the inputs thereto are low. Both of the AND gates 528 and 532 receive a $\overline{WR}$ input at a first input thereto connected to the conductors 533 and 534. This input, it will be recalled, was developed in association with the output of NAND gate 461 as shown in FIG. 12. Similarly, the other input thereto, annotated $\overline{CS_5}$, was developed as a function of the station device decoder 432 in FIG. 12. The second input to AND gate 532 is applied to the terminal annotated $\overline{CS_6}$ which is also a decode from the station device decoder 432. Thus, when a $\overline{WR}$ level and a $\overline{CS_5}$ decode is provided as outputs from the portion of the station interface illustrated in FIG. 12, latch means 485 and 486 are enabled, while when a $\overline{WR}$ level and a $\overline{CS_6}$ decode results from the circuitry illustrated in FIG. 12, latch means 487 and 488 will be enabled.

The reset output developed in FIG. 12 as a function of the output of OR gate 479 is applied through the inverter 534 and the conductors 536-538 to the reset inputs of each of the plurality of latch means 485-488 to cause the same to be reset upon the occurrence of this input in the well-known manner. Thus, as will be readily appreciated by those of ordinary skill in the art, whenever an enable level is generated as an output of the AND gate 528, bits $D_0$-$D_7$ of the data present on the multi-conductor cable 424 are latched up in latch means 485 and 486 while whenever the output of AND gate 532 goes high to enable the latch means 487 and 488, data which may be present on the multi-conductor cable 424 is latched into the latch means 487 and 488.

Each of the outputs $0_1$-$0_4$ of the latch means 485-488 are connected in series to an appropriate one of the driver stages 490-505 and subsequently to a respective one of the indicia or motor drivers 510-525. The driver stages 490-505 may each take the form of a conventional driver stage such as an amplifier or the like capable of driving the indicia or motor load connected thereto as a function of the output of its respective latch. However, as indicia and motor circuits are capable of introducing noise and other spurious inputs to the system as they are being driven, it is preferred that such driver stages 490 include optical isolation of the type generally available in MCT-6 optical isolators as available from the General Instrument Corporation.

Thus, the $0_1$ output of the latch means 485 is connected through a driver stage 490 to the win/place/show switch indicia indicated by the rectangle 510. These indicia correspond to the illumination means for each of the switches in the array 35 illustrated in FIG. 2A. As it will be appreciated that these indicia are connected in parallel therein typically, whenever coins are deposited within the coin hopper at a given station all of the switches within the switch array 35 are illuminated to call the player's attention thereto. The illumination may be continuous, periodic at a rate calculated to appear continuous or alternatively, a slower rate may be utilized so that the switch indicia appear to be flashing.

The $0_2$ output of the latch means 485 is similarly connected through a driver stage 491 to the Pick Five switch indicia indicated by the rectangle 511. These switch indicia correspond to the column of switch inputs 55 illustrated in FIG. 2A and the same may be illuminated in the same manner as was explained for the switch indicia associated with the rectangle 510 or may be selectively illuminated in any of the manners described above when one of the Pick Five switch indicia 54 has already been pressed.

The $0_3$ and $0_4$ outputs of the latch means 485 and the $0_1$ and $0_2$ outputs of the latch means 486 are each connected through appropriate driver stages 492-495 to the button indicia associated with the specific Pick-Five bets indicated by the rectangles 512-515 as marked 2/2-5/5 respectively. Each of these indicia and the pay indicia associated therewith may be selectively illuminated and upon selection only the indicia associated with a depressed button may be maintained in an illuminated condition or otherwise all of the buttons may be extinguished.

The $0_3$ output of the latch means 486 is connected through driver stage 496 to the coin diverter 516. Thus when a one condition is latched into the latch means 486 at a position corresponding to the $0_3$ output, the coin diverter is enabled so that no further coins will be accepted by the system.

The $0_4$ output of the latch means 486 is connected through driver stage 497 to the hopper motor drive indicated as 517. The hopper motor drive controls the payout of the device each time the same is selectively enabled through the action of a stepper motor or the like.

The $0_1$ output of the latch means 487 is connected through driver stage 498 to the press select indicia indicated by the block 518. This corresponds to the indicia illustrated as 37 in FIG. 2A. Similarly, the $0_2$ and $0_3$ outputs of the latch means 487 are connected through driver stages 499 and 500 to the start race indicia 519 and the dollar select indicia 520. The start race indicia corresponds to the indicia 39 in FIG. 2A while the dollar select indicia corresponds to indicator 49.

The $0_4$ output of the latch means 487 is connected through the driver stage 501 to the Quinella indicia indicated by the rectangle 521. This corresponds to the button indicia for the button 42 illustrated in FIG. 2A.

The $0_1$ output of the latch means 488 is connected through the driver stage 502 to audio indicia 522. This may comprise a bell device which is selectively actuated at the beginning of each race. The $0_2$-$0_4$ outputs of the driver stage 88 are connected through respective ones of the driver stages 503-505 to the Quinella select indicia 523, the Pick Five select indicia 524 and the Quinella pay indicia 525. These indicia correspond to the indicia 45, 57 and 50 illustrated in FIG. 2A.

Thus, it will be seen that the circuit arrangement illustrated in FIG. 13 allows all of the indicia illustrated in FIG. 2A to be selectively illuminated under program control. Additionally, the circuitry illustrated in FIG. 13 permits the system to selectively control pay out, to sound certain desired audible conditions as well as to prevent a further entry of moneys into the system and this is all performed by the microprocessor operating under program control.

Referring now to FIG. 14 there is illustrated a block diagram schematically showing exemplary Quinella-Pick-Five portions of the LED displays illustrated in FIG. 3 and, more particularly, appropriate decoder circuitry for the first and second LED displays 44-45, the jackpot display 48, the selection display 63 and the results display 64, all as shown in FIG. 2A.

The exemplary Quinella-Pick-Five decoder and LED display illustrated in FIG. 14 comprises a programmable switch display interface 545, decoder means 547–549 and LED display means 550–572. The programmable switch display interface 545 may take any of the well-known forms of this conventional class of device which acts at the keyboard portion thereof to provide a scanned interface to a key matrix while the display portion thereof provides a scanned display interface for LED, incandescent or other forms of display devices. Both a display and sensor RAM are provided together with debounce and N-key rollover functions.

Typically, the programmable switch display interface 545 acts to monitor switch entries and stores the switch entries in a 16 entry first-in, first-out register. In the display portion of the device, the characters to be displayed can be stored in RAM and the device automatically multiplexes through the characters stored and selects which device is going to be actuated with outputs $A_0$–$A_3$ and $B_0$–$B_3$ in BCD code. Conventional circuitry for performing the function of the programmable switch display interface 545 is available in the form of an 8279 programmable keyboard/display interface from Intel Corporation, while similar devices are also available from Advanced Microdevices Inc.

The programmable switch display interface 545 is connected, in the manner indicated in FIG. 14 to the multi-conductor cable 424 which communicates data as indicated by the markings on the individual conductors $D_0$–$D_7$ in a bidirectional manner to and from the player station interface controller 376 illustrated in FIG. 11. Additionally, as also plainly indicated in FIG. 14, control information as indicated at the inputs annolaled $\overline{CS_4}$, $\overline{RD}$, $\overline{WR}$, $A_0$, RESET and CLK are provided to the programmable switch display interface 545, it being recalled that each of these inputs with the single exception of the input annotated $A_0$ was developed in the manner described in association with FIG. 12. Thus, the $\overline{CS_4}$ input is developed as a function of the output of the address decoder 432 and the $\overline{RD}$ and $\overline{WR}$ inputs were developed as a function of the outputs of AND gate 449 and NAND gate 461 in FIG. 12. The RESET and CLK inputs are developed as a function of the output of OR gate 479 and the player station clock 468. The $A_0$ input to the programmable switch/display interface 545 originates in the address bus 74 and it will be recalled that this bit was provided directly to the player station interface controllers 396 and 397 illustrated in FIG. 11 and is available therefrom.

The output of the programmable switch display interface 545, annotated BD and connected through the conductor 575 to the enable input of the decoder 549, is in effect a byte display output from the programmable switch display interface 545 which is here employed to selectively enable the decoder 549. Similarly, the outputs of the programmable switch display interface 545 annotated $S_0$–$S_3$ as present on conductors 576–579 are scan lines which are normally employed to scan the key switch or sensor matrix and hence are selectively enabled at a rate determined by the system clock. The outputs annotated $A_0$–$A_3$ and $B_0$–$B_3$ as applied to the 4 bit cables 580 and 581 represent the 2 port, 4 bit outputs of the 16 by 4 display refresh registers. The data from these outputs is synchronized to the scan lines $S_0$–$S_3$ for multiplex digit displays. The two 4 bit ports may be used independently or treated as one 8 bit port.

The decoder means 547 and 548 may each take the conventional form of BCD to 7 digit decoders such as SN 7447 BCD to 7 decoders as available from the Texas Instrument Company. Each decoder thus acts in the well-known manner to decode the 4 bits of information provided thereto on the multi-conductor cables 580 and 581 in to 7 bits of information, in the conventional manner, as is appropriate for driving 7 segment LED devices.

The 7 bit output of the decoder 547 is applied, as indicated, through the multi-conductor cable 583 and connected in parallel to each of the segments A–G of the LED devices 561–572 in the coins not bet, horse select and winners array. Similarly, the 7 bit output of the decoder 548 is applied through the multiconductor cable 548 in parallel in the manner indicated in FIG. 14 to the segment drives of each of the LED devices 550–553 and 554–560 for the LED devices defining the Quinella combinations and the jackpot.

The LED devices 550–572 may take any of the conventional forms of this well-known class of devices which, in effect, comprise a 7 segment display which requires an enable input as indicated at the bottom of each device and when the same is enabled any of the 7 segments therein may be selectively energized by the application of energizing signals thereto. As aforesaid, each segment connection is indicated as A–G on the LED device per se and are connected in parallel to the 7 segment drives of an appropriate one of the multi-conductor cables 583–584.

The decoder 549 enables the selective energization of each of the LED devices 550–572 illustrated in FIG. 14. More particularly, the decoder 549 may take any of the conventional forms of a 4 line to 16 line decoder/demultiplexer such as is commonly available from Texas Instruments as an SN 74154 decoder/demultiplexer chip. In essence, the decoder 549 decodes the 4 bit scanned input supplied at the inputs thereto annotated $A_0$–$A_3$ on conductors 576–579 as aforesaid and when enabled by an appropriate level on the conductor 575 will decode the 4 bit input thereto and selectively energize one of the 16 outputs thereof. The outputs of the decoder 549 are here annotated $D_1$–$D_{12}$, it being appreciated that the LED display here being described does not require all of the 16 outputs thereof. The outputs of the decoder 549 annotated $D_1$–$D_7$ are applied to a multiconductor cable 586 so that individual outputs thereof may be applied to selectively enable LED devices 554–560 and 566–570 so that the segments of an energized one of these LED devices, as provided from the multi-conductor 583 for LED devices 566 and 570 and multi-conductor cable 584 for LED devices 554–560 may be illuminated.

Similarly, outputs $D_6$–$D_{10}$ of the decoder 549 are selectively applied through a multi-conductor cable 587 to individual ones of the LED devices 561–565 so that individual ones of these LED devices may be selectively energized and illuminated in response to segment information provided thereto through the multi-conductor cable 583. Finally, outputs $D_8$–$D_{11}$ of the decoder 549 are individually applied through the multi-conductor cable 588 to individual ones of the LED devices 550–553 so that the same may be selectively energized in response to segment information received from the multiconductor cable 584. Additionally, outputs $D_{11}$ and $D_{12}$ are connected as indicated to LED devices 571 and 572. The individual outputs of the decoder 549 employed to energize respective ones of the LED devices depicted in FIG. 14 is noted at the base of the device associated with the input.

Thus, it will be seen in the Quinella-Pick Five portion of the LED display illustrated in FIG. 14, each LED device in the array set forth receives a different combination of enabling and segment driver information so that each LED display may be individually driven. As will be appreciated by those of ordinary skill in the art, since the programmable switch display interface 545 handles functions associated with refresh, the attention of the microprocessor unit 70 to the LED display set forth is only required under such circumstances where it is desired to write new information.

Referring now to FIG. 15 there is illustrated a block diagram schematically showing exemplary win portions of the LED display shown in FIG. 3 together with an array of switch inputs corresponding to all of the switch inputs illustrated at the exemplary player control station shown in FIG. 2A. The portion of the player station illustrated in FIG. 15 comprises a programmable switch display interface 590, decoders 592–595, a win LED display 600 and an input switch array 602.

The programmable switch display interface 590 shown in FIG. 15 may take precisely the same form as that described in association with the programmable switch display interface 545 illustrated in FIG. 5 and accordingly, the same is connected to the multi-conductor cable 424 so that 8 bits of data may be communicated in parallel between the programmable switch display interface 590 and the player station interface controller 396 as illustrated in FIG. 11. Additionally, the same control inputs are supplied thereto from the circuitry in FIG. 12 as was described in association with FIG. 14 with the single exception that here the $\overline{CS}_1$ bit developed as an output of the address decoder 432 is employed for purposes of addressing the programmable switch display interface 590.

Furthermore, as the progammable switch display interface 590 receives input information from the input switch array 602, an interrupt output of the programmable switch display interface 590, annotated IRQ, is here employed and connected through a conductor 603 to an appropriate interrupt input for the player station interface controller 397 illustrated in FIG. 11 for the player station being considered. Thus, if this circuit were present in player station number 1, the conductor 603 would be connected to the input of the player station interface controller 397 annotated $INT_0$.

The scan line outputs $S_0$–$S_3$ are also connected in FIG. 15 through conductors 605–608 to inputs $A_0$–$A_3$ of the decoder 594. Additionally however, the scan line outputs $S_0$–$S_2$ are connected through conductors 609–610 to three inputs of a decoder 595. The A outputs of the programmable switch display interface 590 are connected through the multi-conductor cable 613 to 4 inputs of the decoder 592 while the B outputs of the programmable switch display interface are connected through the multi-conductor cable 614 to the inputs of the decoder 5693.

In addition to the inputs and outputs on the programmable switch display interface 690 already discussed in connection with FIG. 14, the programmable switch display interface 590 is also shown having the return line inputs thereof $R_0$–$R_5$ connected to the input conductors 616–621. The return line inputs $R_0$–$R_7$ for the programmable switch display interface 590 were not discussed in association with the programmable switch display interface 545 described therein as the same were not employed. The return line inputs $R_0$–$R_7$ are connected through the input switch array 602 as shall be seen below to the scan lines. Hence, they are normally in a high condition until a switch closure or the like pulse them low.

Thus, it will be appreciated by those of ordinary skill in the art that the programmable switch display interface 590 illustrated in FIG. 15 performs the very same functions as attributable to the programmable switch display interface 545 illustrated in FIG. 14 with respect to the selective driving and control of the LED array 600; however, in addition thereto, the scan line outputs thereof on conductors 605–608, and the return line inputs connected to conductors 616–621 serve, as shall be seen below, to scan and hence selectively monitor the condition of each of the switches in the input switch array 602.

The A outputs $A_0$–$A_3$ of the programmable switch display interface 590 are connected, as aforesaid, through the multi-conductor cable 613 to the decoder 592 while the B port outputs $B_0$–$B_4$ of the programmable switch display interface 590 are connected through the multi-conductor cable 514 to the inputs of the decoder 593. The decoders 592 and 593 may take precisely the same form of BCD to 7 decoders described in connection with decoders 547 and 548 illustrated in FIG. 14. The 7 line output of the decoder 592 is supplied through the multi-conductor cable 623 to the win LED display 600 and is applied therefrom in parallel to the 7 segment drivers for each of the LED devices present in rows E–H thereof. Similarly, the 7 outputs of the decoder 593 are supplied through the multi-conductor cable 524 and applied in parallel to each of the 7 segment drivers in each of the LED devices present in rows I–L of the 4 by 8 LED display 600. Thus, the outputs of the decoder 592 are employed to drive the LED devices present in the upper 4 rows of the win LED display 600 while the outputs of the decoder 593 are employed to drive the segment drivers of the LED devices present in the lower 4 rows of the win LED display.

Similarly, the decoder 594 may take the same form as the 4 to 16 line decoder 549 described in association with FIG. 14. This decoder is enabled from the BD output of the programmable switch display interface through the conductor 625 and is driven by the scan line outputs of the programmable switch display interface 590 in precisely the same manner as was described in connection with the decoder 549 illustrated in FIG. 14. The 16 bit output of the decoder 594 is supplied through the multi-conductor cable 627 whereupon individual ones of the bit conductors therein are employed in the manner indicated to enable the individual LED devices in the win LED display 600 in the manner indicated in FIG. 15.

It should also be noted that all outputs of the decoders 592–594 have been provided with the prefix W to indicate their association with the win LED display 600 to be distinguished from the place and show displays described in connection with succeeding figures. The D number associated with each output of the decoder 594 indicates the numbered output thereof and it will be seen upon an inspection of the LED display 600 that outputs WD 1–WD 4 are employed to enable each of the LED devices in row E of the display, outputs WD 5–WD 8 are employed to enable the LED devices in row F of the display, WD 9–WD 12 outputs are employed to enable each of the LED devices in row G of the display, WD 13–WD 16 outputs are employed to selectively enable each of the LED devices in row H of the win LED display and thereafter the sequence again repeats for the remaining four rows of the win LED display 600. Thus, in this manner, the decoded scan line outputs of the programmable switch display interface 590 are employed to selectively enable 2 LED devices at a time in the win LED display 600 while the decoded A and B port outputs of the programmable switch display interface 590 are relied upon to selectively write predetermined display segment information into each LED device in the win LED display which is enabled.

The scan line outputs $S_0$–$S_2$ are additionally connected through conductors 609–611 to the inputs of the remaining decoder 595. The decoder 595 may take the conventional form of a binary-to-decimal decoder which acts in the well-known manner to place a high level on one of the 8 outputs thereof connected to the conductors annotated S–Z in response to a decoding of the binary condition of the 3 inputs thereto supplied on conductors 609–611. Thus for instance, an Intel 3205 3 to 8 decoder may be employed for this purpose. Therefore, as the scan outputs of the programmable switch display interface 590 are selectively enabled at a scanning rate determined by the clock supplied thereto, the combination of highs and lows on conductors 609–611 will be periodically varied at a rate associated with the clock input to the programmable switch display interface as the code conditions on the conductor 609–611 are swept through a zero to 8 condition.

As each condition is defined, and this condition is decoded by the decoder 595, one of the outputs thereto connected to the conductors S–Z will be selectively enabled at a rate corresponding to the scan rate of the inputs supplied to the decoder 595. The conductors S–Z serve as the row conductors for the input switch array 602 while the conductors M–R serve as the column conductors therefor.

At the intersection of each of the row S–Z and column conductors M–R is disposed a diode and a switch in the manner indicated in FIG. 15 so that upon closure of the switch the column conductor will be grounded through the diode and closed switch to an enabled row conductor S–Z. Thus for instance, assuming that the row conductor T is enabled, a closure of the switch annotated Jackpot will result in grounding of the column conductor R to the conductor T through the closed jackpot switch.

The switches within the input switch array 602 correspond to each of the input switch buttons illustrated in FIG. 2A and in addition, the Security Switch and Start Switch which have not been illustrated therein are also set forth. Each of the column conductors M–R are connected through a light-emitting diode portion of a photocoupler arrangement 630–635 which is associated with each column conductor to a source of voltage +V. Therefore, whenever a row conductor is enabled the diode for a column associated with a switch which has been closed and is connected to the enabled row conductor will be illuminated due to the closure of the circuit through the diode and closed switch arrangement. This will cause the appropriate light-emitting diode within each photocoupler pair 630–635 to be illuminated.

The phototransistor of each photocoupler pair 630–635 is connected through a respective one of the conductors 616–621 to one of the read inputs $R_0$–$R_5$ of the programmable switch display interface. Therefore, as the program switch display interface 590 is aware of the row then being scanned and receives a column output in which a switch has been closed, each of the 43 switches illustrated in the switch input array 603 will be readily defined by the programmable switch display interface 590. Therefore, when a closure of a switch is determined, an interrupt is generated on the conductor 603. Thereafter, upon interrogation by the microprocessor unit 70, a code defining the switch within the switch input array 602 which was closed may be defined at the $D_0$–$D_7$ outputs connected to the multi-conductor cable 424. Thus, it will be appreciated that the block diagram illustrated in FIG. 15 allows selected data to be displayed at any of the 32 LED devices within the win LED display 600 while at the same time switch closures which occur within the input switch array 602 are monitored and subsequently indicated to the system.

Referring now to FIG. 16 there is shown a block diagram schematically illustrating exemplary place portions of the LED displays shown in FIG. 3. The place driver and display circuits illustrated in FIG. 16 again comprise a programmable switch display interface 640, decoders 642–644 and a 4 by 8 Place LED display 646. The programmable switch display interface 640 may take precisely the same form and is connected in precisely the same manner described in connection with FIGS. 14 and 15 for the programmable switch display interfaces 545 and 590 described therein with the single exception that the $\overline{CS_2}$ output as decoded by the address decoder 432 in FIG. 12 is here employed to enable this chip.

The 4 A port outputs of the programmable switch display interface 640 are supplied through the multi-conductor cable 648 to the decoder 642 while the 4 B port outputs thereof are supplied through the multi-conductor cable 649 to the decoder 643.

Each of the decoders 642 and 643 may take precisely the same form of BCD to 7 decoder described in connection with FIGS. 14 and 15 and again, each of the 7 outputs thereof are applied through multi-conductor cables 650 and 651 to the Place LED display 646. More particularly, the 7 outputs of the decoder 642 are applied through the conductor 650 in parallel to each of the LED devices in rows E–H of the LED display 646 while each of the outputs of the decoder 643 are applied through the multi-conductor cable 652 in parallel to each of the LED devices present in rows I–L of the Place LED display 646. Thus, in the same manner as described in association with the win LED displays, the decoded A and B outputs of the programmable switch display interface 640 are applied in parallel to each of the LED devices in the Place LED display to selectively define the segments therein which are to be illuminated.

In like manner, the decoder 644 may take the same form of 4 to 16 bit decoder described in connection with the decoders 549 and 594 illustrated in FIGS. 14 and 15. The 16 outputs of this decoder, here provided with a P prefix to indicate their place function, are supplied through the multi-conductor cable 652 to selectively enable pairs of LED devices in the Place LED display 647 as a function of the scan line outputs $S_0$–$S_3$ provided by the programmable switch display interface 640. Thus, again, it will be noted that outputs $PD_1$–$PD_4$ selectively enable the LED devices in rows E and I of the display, decoder outputs $PD_5$–$PD_7$ selectively enable LED devices in rows F and J of the Place LED display 646, decoded outputs $PD_9$–$PD_{12}$ selectively enable LED devices present in rows G and K of the Place LED display, and decoded outputs $PD_{13}$–$PD_{16}$ selectively enable LED devices present within rows H and L of the Place LED display. Thus, in this manner, each of the LED devices in the place LED display 646 may be selectively illuminated to display desired digit information so that the 4 digit LED displays for the place column as illustrated in FIG. 2A are appropriately illuminated.

Referring now to FIG. 17 there is shown a block diagram schematically illustrating exemplary show portions of the LED displays depicted in FIG. 3. The show driver and display circuits illustrated in FIG. 3 comprise a programmable switch display interface 655, decoders 657–659, multi-conductor cables 660–662 and a 4 by 8 Show LED display 663. The programmable switch display interface 665 may take identically the same form as the programmable switch display interface 640 and is connected in precisely the same manner as described therein with the single exception that the address decode therefor obtained from the address decoder 432 in FIG. 12 here corresponds to $\overline{CS_2}$.

Thus, the A outputs are connected to the decoder 657 while the B outputs thereof are connected to the decoder 658 and the scan line outputs are supplied to the decoder 659. The decoders 657 and 658 may take identically the same form of decoder described in association with the decoder 642 and 643 in FIG. 16 and their outputs are connected through the multi-conductor cables 660 and 661 so as to be applied in parallel to each of the LED devices in rows E–H and I–L of the show LED display 663, respectively.

In the same manner, the decoder 659 corresponds identically to the decoder 644 described in connection with FIG. 16 and the 16 outputs thereof, here provided with an S prefix to indicate their relation to the Show LED display 663, are supplied through a multi-conductor cable 662 to selectively enable individual LED devices in the manner illustrated in corresponding rows E–H and I–L of the LED display 663. Thus, in the same manner as was explained in connection with the Place display illustrated in FIG. 16, the Show LED devices may be selectively addressed and illuminated to thus define the 4 by 8 column LED display illustrated in FIG. 2.

While FIGS. 11–17 have illustrated in an exemplary manner various circuits for configuring the player control and indicia panels illustrated in FIG. 1 and FIG. 2A, it will be appreciated by those of ordinary skill in the art that many variations thereof will be readily available without deviating from the teachings of the instant invention. Thus, different forms of displays and inputs could be used and the techniques for illuminating and sensing the conditions indicated may vary widely.

THE FLOW CHARTS

Although system structure, operation and functions have been described above principally in relation to the overall system schematic set forth in FIG. 3, as well as the detailed schematic diagrams of the basic system components set forth in connection with FIGS. 4–17, the modes of operation and function implementation there described proceed essentially in the piecemeal fashion associated with that which takes place at a given peripheral being discussed or that which is apparent to an operator. The actual processing which takes place within the instant invention may best be appreciated upon a detailed review of the annotated program listings attached hereto as Appendix A and the various program tables set forth in Appendix B; however, in order to provide reader with an overall view of the processing which takes place under program control, the flow charts set forth in FIGS. 18–22 are provided and will be hereinafter discussed so that the manner in which processing occurs and the modes in which basic functions are implemented may be readily understood.

It should be noted, however, that the flow charts which are hereinafter described are simplified to a great degree, consistent with the usage of flow charts as relied upon by those of ordinary skill in the art, and hence reference to Appendix A and B should be made for precise details of given ones of the programs described or otherwise employed.

MAIN ROUTINE

Figure 18:
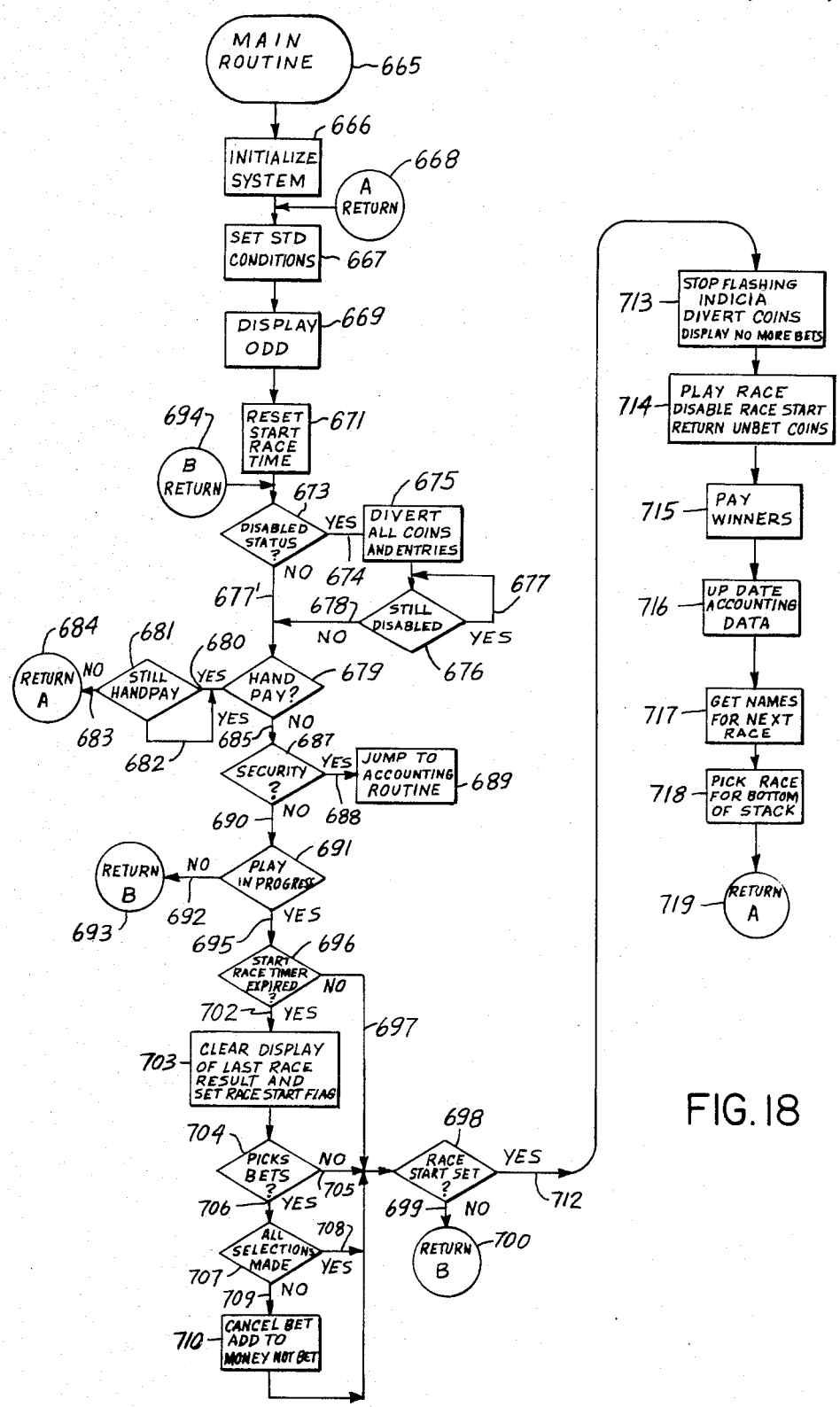
FIG. 18 is a flow chart illustrating in a simplified manner an exemplary main program routine for the gaming equipment illustrated in FIG. 3.

Referring now to FIG. 18 there is shown a flow chart illustrating in simplified form, an exemplary main program routine for the gaming equipment illustrated in FIG. 3. The main program routine, whose flow chart is illustrated in FIG. 18, performs most functions involved in starting the game and playing the race except functions which are serviced in response to the occurrence of a clock interrupt such as was described in connection with the flow charts associated with random number generation as was depicted in connection with FIGS. 5 and 6. Additionally, certain other subroutines are called for establishing odds, the win, place and show horse for each race and the names of the entries in each race and those routines are described hereinafter.

The main routine is entered at the location indicated by the oval flag 665 annotated main routine. The main routine is entered each time the gaming equipment illustrated in FIG. 3 is energized or otherwise has power applied thereto through the operation of an on-off switch or the like. Upon entry into the main routine, as indicated by the rectangle 666, the system is initialized. This involves reading the removable memory 84 as shown in FIG. 3 into RAM, setting up all of the jackpots correctly in response thereto, accumulating a table of all random numbers that will be required in advance, starting the video disk players, initializing stack pointers and similar other housekeeping functions and the like.

Thereafter, as indicated by the rectangle 667, standard conditions associated with those present prior to accepting any wagers are established and it should be noted in this regard that it is at this point, as indicated by the circular flag 668, that a return to the main routine occurs at the completion of the main routine. The standard conditions which are set in association with the step indicated by the rectangle 667 are those which are to be present at the end of every race or before the next race is played. This involves illuminating, either by way of a continuous or flashing condition, certain lights at the player control and indicia panel such as all of the switch inputs in the array 35 as well as switch inputs 54 and 55 as indicated in FIG. 2A and all of the panel lights shown thereon. Any information associated with the last wagers made which are displayed will also be cleared and everything will be set at the player stations so that the player stations are now ready to accept wagers from a new player. Additionally, the video disk players are connected in a manner so that the paddock scene is displayed.

After the initial conditions have been established in the manner indicated by the rectangle 667, the odds for the next race are displayed in the manner indicated by the rectangle 669. In this regard, it should be noted that the next 5 races to be run, as well as the appropriate odds for each race, are maintained in a table. Each race to be played is determined by a subroutine called select which is described hereinafter. In essence, when the system is initialized in association with the step indicated by the rectangle 666 or in association with the last step of this routine, this table containing the next 5 races to be displayed, as well as the appropriate odds for each entry in the race, is updated so that there are always 5 races together with appropriate odds to be displayed therefor and additional information which will be discussed in greater detail below available for use by the program.

Therefore, at this juncture, it is only necessary to appreciate that information pertaining to the next 5 races, as well as their odds, are maintained in a stack for use by the program and as part of the initialization step associated with rectangle 666 or the end portion of the main routine, the information pertaining to the next race to be displayed is called by the system and is available therefor. Accordingly, the step indicated by the rectangle 669 really requires that the odds associated with the next race to be run be called and displayed in the manner indicated in the informational displays shown in FIG. 2B, together with the names of the horses at their respective post positions.

In this regard, it should also be noted that while information pertaining to the next 5 races is maintained in a table, the names of the horses for the eight entries of a current race are only picked one race in advance as the same really have little relevance to the calculations performed by the instant invention, and hence are primarily for the purposes of cosmetics. Thus, during an initial startup of the gaming device, the eight names for the current race to be run are selected and under normal circumstances the eight names for the next race to be run are selected during the closing portions of the main routine illustrated in FIG. 18 for a current race. The manner in which names are selected under program control are described in association with FIG. 22.

After the odds and names of the entries are displayed in the manner indicated by the rectangle 669, certain system housekeeping functions are performed to insure that the system is in condition to initiate a new race cycle. Thus, as indicated by the rectangle 671, the start race timer is reset to insure that a time interval from the last race run is not still running. The race timer, as shall be seen below, is a fixed interval, software timer, which defines a period such as a minute between when the first bet is placed by a player and when the gaming equipment illustrated in FIG. 3 refuses to accept further bets and initiates the racing event.

After the start race timer is reset in the manner indicated by the rectangle 671, the system next checks in the manner indicated by the diamond 673 to ascertain whether or not the system status is set to disabled. This may occur, as was seen above, if ten duplicate random numbers are obtained in association with the random number subroutine illustrated in FIG. 5 or alternatively, this condition may be established through other conditions associated with system failure or tampering with the machine which may be monitored and placed in a 1 byte memory referred to as status. Any time the disable status check associated with diamond 673 is initiated, the condition of the 1 byte memory is read. Should a disable mode be indicated, in the manner indicated by the arrow 674 annotated Yes, the coin diverters will be set in the manner indicated by the rectangle 675 and no further wagers will be accepted.

Once the coin diverters are set and further entries are refused in the manner indicated by the rectangle 675, the system continues to check in the manner indicated by the diamond 676 to ascertain whether or not the disable status is being maintained. If an affirmative result obtains, in the manner indicated by the arrow 677 annotated Yes, the main program routine stays in this loop until the disable condition is reset. Thus, once all play on the machine is locked up, the disable condition is maintained until the same is reset by maintenance personnel or the like. If no disable status is indicated or if a previously indicated disable status condition is cleared in the manner indicated by the arrows 677 and 678, the program next tests in the manner indicated by the diamond 679 to ascertain whether or not a hand pay condition has been indicated.

As will be recalled, under certain win conditions, the moneys in the hopper are insufficient for the machine to automatically pay the successful wager. Under these conditions, a hand pay condition is indicated and will not be cleared until maintenance personnel are called, in theory the player is paid and the hand pay reset switch as present therein is closed. If a hand pay condition is present in the manner indicated by the arrow 680 annotated Yes, the program again tests to ascertain whether or not the hand pay condition persists in the manner indicated by the diamond 681. If the result is again affirmative, as indicated by the arrow 682 annotated Yes, the program sits in this loop until such time as the hand pay condition is finally cleared. When the hand pay condition is finally cleared in the manner indicated by the arrow 683 annotated No, the program returns to the beginning portion thereof as indicated by the circular flags 684 and 668 so that initial standard conditions can then be established and processing through the beginning portions of the routine may continue.

However, once a hand pay condition is determined in association with the diamonds 679 and 681, the main routine stays in the loop indicated by the arrow 682 until the condition is cleared and thereafter reentry to the initial portions of the main routine occur. If no hand pay condition is indicated by the test associated with the diamond 679 as indicated by the arrow 685 annotated No, the program next tests to ascertain whether or not a security condition is present in the manner indicated by the diamond 687. The security condition will occur whenever one of the key locks on the front door to the machine have been turned to an open condition. Anytime this condition is detected, it is assumed that maintenance personnel are opening the door to the machine for purposes of removing money from the hopper, the coin reservoir and removing the removable memory for accounting purposes or the like. Therefore, whenever a security mode is indicated in the manner indicated by the arrow 688 annotated Yes, the program immediately jumps to an accounting routine in the manner indicated by the rectangle 689.

The accounting subroutine is a routine which may be entered through the jump instruction issued in association with the rectangle 689, a power down situation or alternatively, at the end portion of the main routine to be described subsequently. At any rate, whenever the accounting routine is entered, the contents of the RAM relevant to bet history, coins entered, wins and losses since the removable memory was last updated, are accumulated and read into the removable memory together with current jackpot information and the like so that current information stored therein concerning the gaming machine's present money status, as well as past history, is stored therein and available for removal by maintenance personnel or the like.

If no security condition has been ascertained in the manner indicated by the arrow 690 annotated No, the program next tests in the manner indicated by the diamond 691 to ascertain whether or not a play in progress condition is present. When a coin is initially dropped in to the machine at any player station, a flag is set in addition to the normal counting of the coins inserted. The condition of the flag set is employed for purposes of testing whether or not play is in progress. Thus, if a coin has been placed in the machine, it may be assumed that a wager will shortly be made to in fact start the race timer.

However, if no coin has yet been placed in the machine, in the manner indicated by the arrow 692 annotated No, the program keeps looping through the various status checks in the manner indicated by the circular flags 693 and 694 until a play in progress condition is indicated by a player depositing moneys in the machine. Till this point, it will be appreciated, that the main routine is in effect sitting in a normal executive loop where it has fully initialized the system and thereafter monitors a plurality of input conditions for the purposes of ascertaining whether or not some predetermined event has occurred.

When money is deposited in the machine, the play in progress flag, as aforesaid, will be set and thereafter the test associated with the diamond 691 will be affirmative. Therefter, as indicated by the arrow 695 annotated Yes, the condition of the start race timer is tested to ascertain whether or not the same has timed out in a manner indicated by the diamond 696. The start race timer as briefly described above, is a 1 minute software timer which is started as soon as a player makes a bet. Thus, while a play in progress condition is signalled by the depositing of a coin in the machine, the start race timer is not initiated until a bet has been effectively made.

If the race start timer has not yet expired in the manner indicated by the arrow 697 annotated No, the machine next tests in the manner indicated by the diamond 698 as to whether the race start flag has been set. The race start flag is set, as shall be seen below, whenever the race start timer times out. Alternatively, in versions of this invention which have a start race button, which enables a player to start the race at a point in time when he has completed betting even though the race start timer has not yet been set, the depression of the start race button will also cause the race start flag to be set.

At any rate, if the start race timer has not expired and the race start flag has not been set, in the manner indicated by the arrow 699 annotated No, a return, as indicated by the circular flag 700 to the portion of this routine indicated by the circular flag 694 occurs wherein status conditions are again tested.

If the one minute interval after a player has placed a bet has expired in the manner indicated by the arrow 702 annotated Yes, the system next proceeds to clear a portion of the central display of the last results displayed and to set the race start flag in the manner indicated by the rectangle 703. Thereafter, the system next checks in the manner indicated by the diamond 704 to ascertain whether or not any Pick Five bets, i.e. those associated with switch inputs 54 as illustrated in FIG. 2A, have been made. If no Pick Five bets have been made in the manner indicated by the arrow 705 annotated No, the system again checks in the manner indicated by the diamond 698 to ascertain whether or not the race start flag has been set. As this flag was set in association with the rectangle 703, an affirmative result will now be obtained.

If however, Pick-Five bets have been made in the manner indicated by the arrow 706 annotated Yes, the system next tests in the manner indicated by the diamond 707 to ascertain whether or not all selections for the Pick-Five bets made have been made. If an affirmative result obtains in the manner indicated by the arrow 708 annotated Yes, the test associated with the diamond 698 will be initiated. However, if the test associated with the diamond 707 is negative in the manner indicated by the arrow 709 annotated No, the system will cancel the Pick Five bet made and add the 2 dollar amount associated therewith to the indicator in the manner indicated by the rectangle 710 and thereafter test to ascertain whether or not the start race flag has been set in the manner indicated by the diamond 698.

When it has been determined that the race start flag has been set, in the manner indicated by the arrow 712 annotated Yes, the system next proceeds in the manner indicated by the rectangle 713 to terminate the flashing of certain indicia, set the coin diverter so that no more money will be accepted, and to display a No More Bets message on the informational displays. Thus, the flashing indicia initially established for the step associated with the rectangle 667 are terminated as they serve to advise a player to place money in the machine and make various wagers, the coin diverters are set so no more money can be inserted and a display advises the operator that betting is closed. Thus, the step of the program associated with the rectangle 713 effectively conditions the gaming device illustrated in FIG. 3 to start the race.

Once this has been done, the race is started, the race start flag is disabled and subsequently unbet coins are returned to the player in the manner indicated by the rectangle 714. The race is effectively played by selecting the next race from the 5 race queue which has been previously stacked therein in advance. This is initiated by forwarding to the appropriate disk recorder a search command and five bit frame address for the start of the race to be played. When the video disk playback device comes back with a ready command, a play command accompanied by a five bit frame address indicating the last frame of the race and an autostop command is forwarded whereupon the video disk recorder will play the race which has been previously selected.

The race start flag is disabled or in effect reset so that the same will not start a race prior to a timing out of the timer the next time the main routine is entered and, of course, unbet coins are returned at this time so that there is no necessity to carry over accounting information in regard to coins which may be bet in succeeding races. When the video recorder returns a task completed indication to the microprocessor, it will be indicative that the race displayed has been played. At this time, as indicated by the rectangle 715, any winning bets are paid. Winning bets are paid by calling a routine called Pay which views the bets listed in the player station control block established for each player station as aforesaid, to ascertain whether any winning bets have been made. If winning bets are ascertained, the routine also calculates the amount to be paid for each winning bet and then initiates step commands to the hopper to cause the same to be paid if sufficient funds are present in the hopper.

If insufficient moneys are present in the hopper, a hand pay message is displayed and an alarm sounded. At the same time that the winners are paid in the manner indicated by the rectangle 715, the informational display 12 is updated with the player results so that payoff and a display of the results occur in a substantially simultaneous manner. Thereafter, as indicated by the rectangle 716, the accounting data maintained in the random access memory and subsequently the removable memory is updated. Thus, the jackpot is incremented by an amount corresponding to 1 percent of the bets made, the wagering history is updated together with totals corresponding to those either funds taken in or disbursed as a result of the last race run.

After all this information is updated in RAM, the contents of RAM associated therewith are written into the removable memory so that the same is fully updated at the completion of each race. Thereafter, as indicated by the rectangle 717, names are selected for the next race to be run. The manner in which names are selected will be described in detail in connection with FIG. 22. Here, however, it is sufficient to appreciate that while win, place and show data, as well as frame information associated with the race to be displayed, is maintained in a stack for the next five races, name information for that race is not stored therein as such name information has little if anything to do with the calculations required of the program as the same is merely for player cosmetics and the retention of this data in the stack would require excessive amounts of storage. Thus, it is here sufficient to appreciate that at this junction in the main routine, 8 names for the 8 horse positions in the next race to be displayed are selected so that the same may be displayed in conjunction with the initial portion of the main routine upon the next entry thereinto.

After the names are selected in the manner indicated by the rectangle 717, data associated with the next race to be displayed is taken from the bottom of the stack holding the data for the next five of such races and new race information is placed in the stack in the manner indicated by the rectangle 718. New information placed into this stack is achieved through a subroutine called select which is described in connection with FIG. 21. Thereafter, as indicated by the circular flag 719, a return to the initial portion of the main routine occurs.

Thus it will be seen that when the main routine illustrated in FIG. 18 is entered upon an initialization of the system or a completion of one cycle through the main routine, the standard conditions which are to be displayed to a player are initially established prior to the insertion of any coins and numerous housekeeping functions are performed. Thereafter, the program acts to monitor a plurality of status conditions until such time as a play in progress condition has been ascertained in response to the depositing of coins into the machine. However, should any of the status conditions be detected as present, further processing within the routine will not continue until the same is cleared in an appropriate manner.

Once a play in progress condition is signaled by the insertion of one or more coins in the machine, the system awaits the placing of a bet and both conditions are ascertained through a monitor of the switch inputs present at each player station. Upon receipt of the first bet, a race timer is started which allows a player one minute to complete the placement of all bets subsequent to the initial bet. Upon the expiration of this one minute interval, no more coins are accepted, the indicia No More Bets is displayed and moneys either which have not been bet or are associated with cancelled incompleted bets is returned.

The playing of the paddock scene is now terminated in favor of a playing of a recorded race wherein the winning entries correspond to the winning entries of the race selected. After the race has been played on the T.V. monitor, winners are paid, all accounting information and displays are updated, names for the 8 horses in the next race to be played are selected and thereafter the next race to be selected is picked from the bottom of the stack. The program then returns to the initial portions of the main routine.

WIN AND PLACE ODDS

Figure 19:
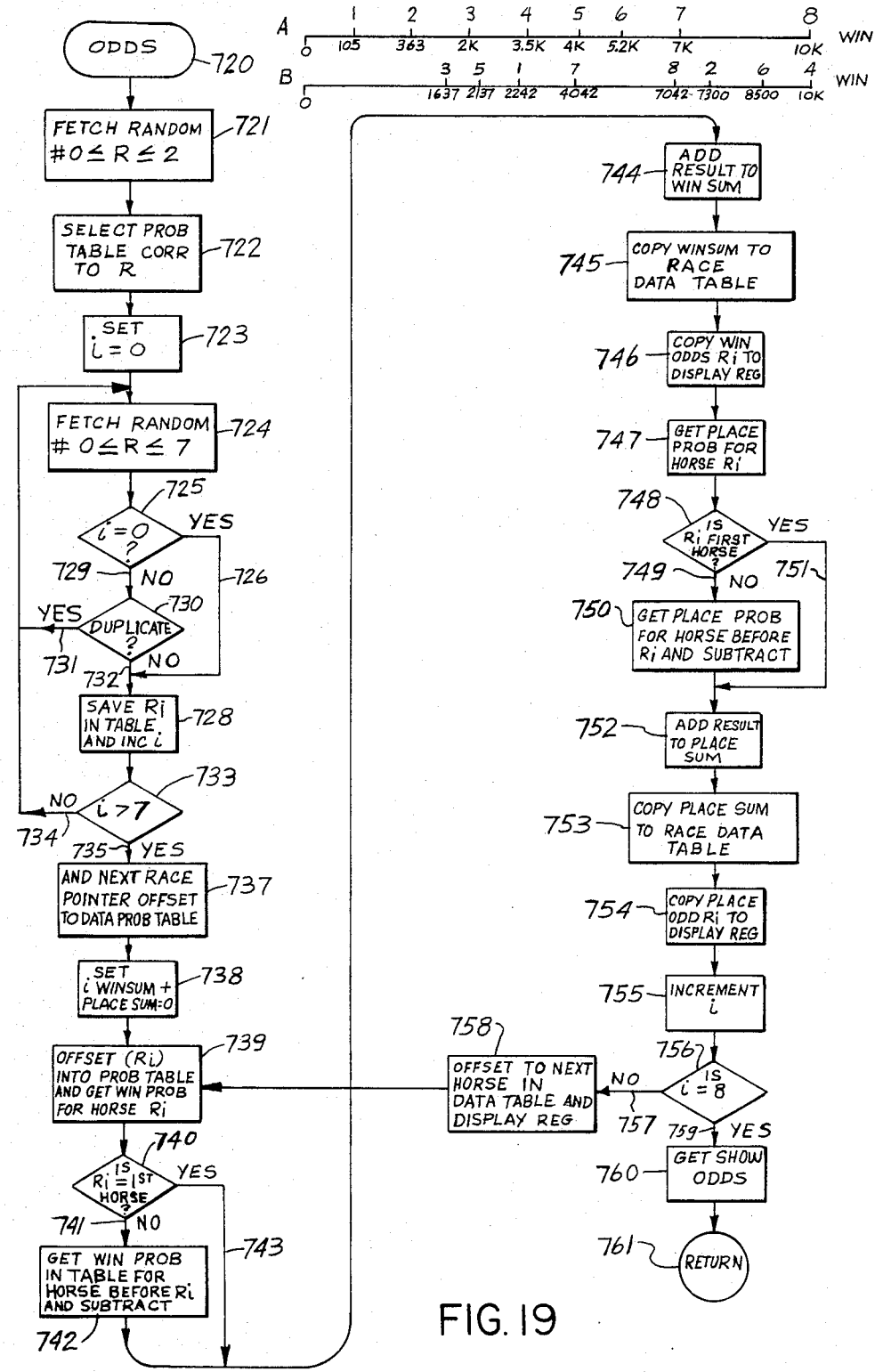
FIG. 19 is a flow chart illustrating in a simplified manner an exemplary "Odds" program for the gaming equipment illustrated in FIG. 3 wherein an appropriate table of wagering probabilities is selected, scrambled and the odds of each entry winning and placing are determined.

Referring now to FIG. 19 there is shown a flow chart illustrating in a simplified manner, an exemplary "odds" program for the gaming equipment illustrated in FIG. 3 wherein an appropriate table of wagering probabilities is selected, scrambled and the odds of each entry winning and placing are determined. The function of the odds program illustrated in FIG. 19 is to calculate the odds of each of 8 horses in a next race winning and placing. The odds for each of those 8 horses showing are then calculated as a function of the show odds program routine illustrated in FIG. 20.

Figure 21:
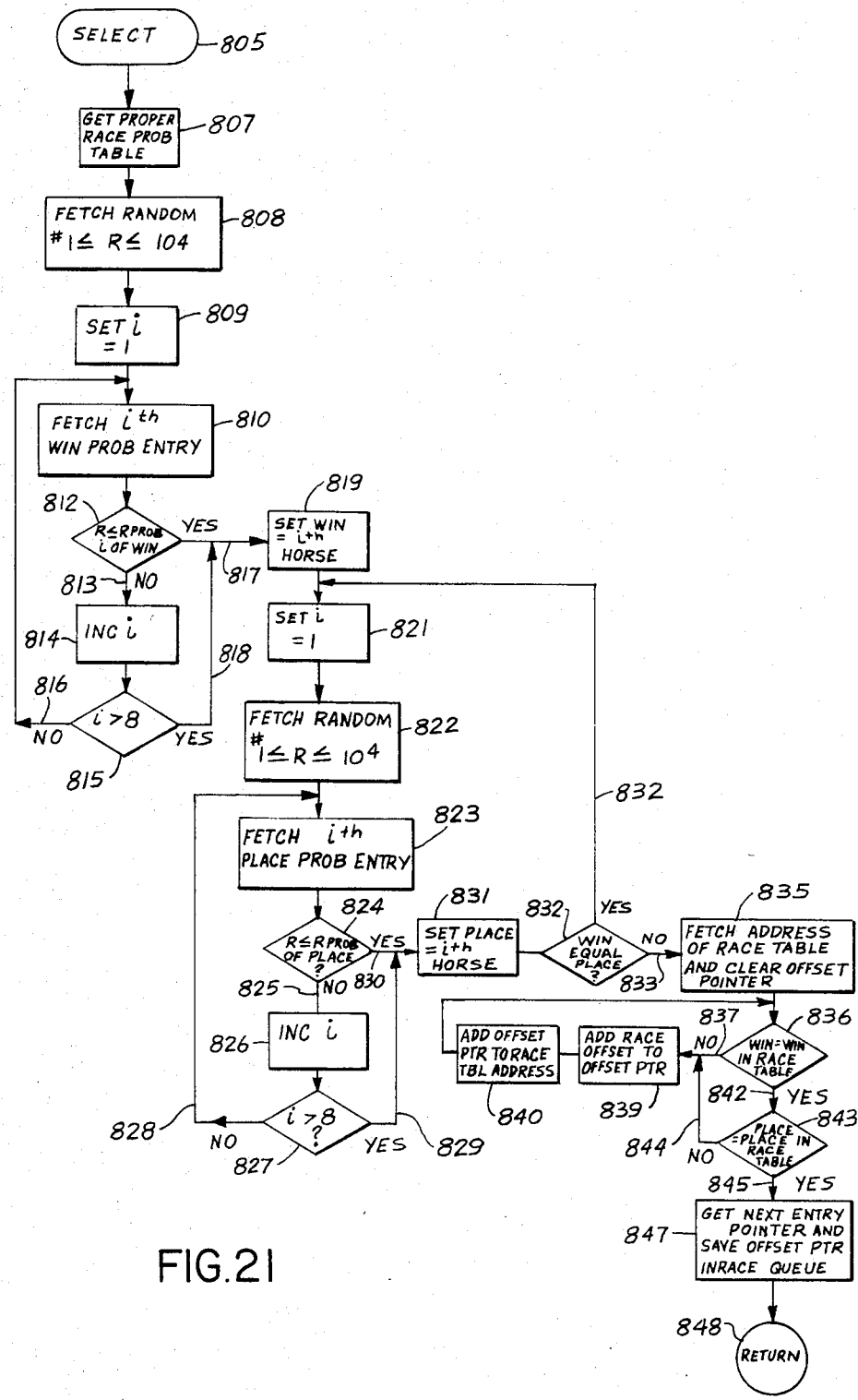
FIG. 21 is a flow chart illustrating in a simplified manner an exemplary "Select" program routine for the gaming equipment depicted in FIG. 3 wherein the results of each gaming event are determined.

Each of these calculations are performed without respect to which of the 8 horses in a given next race will actually win, place or show as this result is determined as a function of the select program routine illustrated in FIG. 21. However, for purposes of appreciating calculations set forth in the odds program flow chart illustrated in FIG. 19, it should be appreciated that, as aforesaid, the system maintains a table of the next 5 races which are to be played back and each table contains the post positions for each of 8 horses in that race, the probability and odds of each of those horses winning, placing and showing, the post positions of the horses which are selected to win, place and show in that race and the frame designations of the starting and ending frames of a race recorded on the video disk which shows the horse race having the appropriate post position horses winning, placing and showing.

The odds subroutine whose flow chart is illustrated in FIG. 19 proceeds in the following manner. Initially, there is stored in memory three complete probability tables each of which sets forth the probability of each of the 8 horses in a race winning and placing and sets forth the requisite odds associated with these probabilities wherein the calculation is based upon a 20% hold or the like. Each of the three probability tables are different and are established, in a manner well-known to those of ordinary skill in the art, through an assignment of 8 possible groupings of random numbers over a distribution of 10,000. The function of the odds program illustrated in FIG. 19 is initially to select one of the 3 probability tables for use in calculating the odds to be assigned to each of the 8 entries in a race and thereafter, once the requisite probability table is determined, to scramble the post positions employed for the entries in a race with respect to the entry order in the probability table and in this manner determine from the original probability table the probability and odds of each of the entries in the scrambled post positions winning and placing in the race for which the calculation is then being made.

Thereafter, the odds for showing are determined and subsequently, the win and place horse for the race are selected, thus determining the show horse. It should be also noted that while the selection of odds for Win and Place in connection with the flow chart illustrated in FIG. 19 occurs strictly as a function of the rules of probability as modified to accommodate a 20% hold or the like, the show calculation associated with FIG. 20 occurs as a function of which horses in the various races which may be played back from the disk recorders finish first or second. This occurs because only one race for each possible combination of win and place horse has been recorded on the disks at the playback unit so that a total of only 56 races are present. This means, that the show calculation must be based on who finishes first or second.

The odds routine is entered at the location indicated by the oval flag 720. The program initially proceeds to select one of the 3 probability tables stored in ROM for use in calculating the win and place odds by fetching a random number between zero and 2 in the manner indicated by the rectangle 721. Thereafter, the probability table corresponding to the random number selected is selected for use within the instant cycle of this program in the manner indicated by the rectangle 722. Each probability stored in the read-only memory, as aforesaid, will list the win probability for horse number 1, its corresponding win odds, the place probability for horse number 1 and its corresponding place odds and a corresponding entry will be present for each of the 8 horses in the race.

Furthermore, each probability table stored in the read-only memory will be different. Thus for instance, if the win probabilities for 8 entries in a given probability table are placed on a linear scale A as depicted above the flow chart, typical values might occur in the manner illustrated wherein entry 1 has a probability of 105 in 10,000, horse number 2 has a probability of 363 in 10,000 and so on as illustrated in FIG. 19, it being appreciated that the numbers there depicted were selected for convenience and do not represent probability values actually stored in the tables.

Now that the program has selected the appropriate probability table for the calculation to take place it next proceeds to scramble horse positions with respect to the probability of 8 entries for the purposes of presenting a more varied set of odds to a player in various series of races to be displayed. This is done, as indicated by the rectangle 723 by initially setting I equal to 0 wherein I will represent the post position of each of the 8 entries in a race. Thereafter, as indicated by the rectangle 724, a random number is fetched from the table of random numbers between 0 and 7, it being appreciated that the random numbers drawn for this purpose will correspond to the entry assigned to the post position then associated with I, the entry positions shown on scale A being offset by one from the random numbers obtained in the step associated with the rectangle 724.

The program next tests in the manner indicated by the diamond 725 as to whether or not I equals 0. If the answer is affirmative, as indicated by the arrow annotated 726, the program need not concern itself as to whether or not a duplicate random number has been drawn. Thus under these conditions, as indicated by the rectangle 728, the random number between 0 and 7 initially drawn is stored in a table and the value of I is incremented. However, if in the test associated with the diamond 725, the value of I was not equal to 0 in the manner indicated by the arrow 729 annotated No, the program next tests in the manner indicated by the diamond 730 to ascertain whether or not the random number fetched corresponds to a random number already stored in the table as no duplicates are allowed in the assignment of the 8 post positions for the entries illustrated on the linear scale A shown above.

If the test associated with the diamond 730 indicates that the random number just fetched is in fact a duplicate of one already stored in the random number table, this random number is not stored and the program returns in the manner indicated by the arrow 731 to fetch a new random number between the 0 and 7 in the manner indicated by the rectangle 724. However, if no duplicate random number has been fetched in the manner indicated by the arrow 732 annotated No, the random number fetched is stored in the random number table and the value of I is again incremented in the manner indicated by the rectangle 728.

The program then tests in the manner indicated by the diamond 733 as to whether or not the value of I is greater than 7. If the result is negative in the manner indicated by the arrow 734 annotated No, 8 values of I have not yet been obtained which vary from 0 to 7 and hence correspond to the post positions of the probability values to be assigned to the entries in this race. However, if the result of the test associated with the diamond 733 is affirmative in the manner indicated by the arrow 735 annotated Yes, all 8 post positions have been obtained.

Now that all 8 post positions have been obtained, the program, will proceed to scramble the entry win probabilities and the entry place probabilities in the order defined by the post positions developed as a function of the random numbers selected for I. To appreciate what is about to transpire in the remaining steps of this program, suppose it is assumed that the random numbers fetched in connection with steps 724-733 were obtained in the following order, 3, 5, 1, 7, 8, 2, 6 and 4. Under these circumstances, the program will map these entry positions as illustrated on scale A in to an ascending order of post positions as illustrated in scale D.

The first post position or post 1 will be occupied by the 3 horse which had a probability of 2,000 less the probability of the second entry which was 363. Hence, the probability of the 3 entry from scale A as mapped into the first post position on scale B will be 1,637 as indicated on scale B in the first post position thus will correspond to horse number 1 which will have a probability of winning of 1,637 in 10,000.

Similarly, the second random number drawn was a 5 and the probability of entry 5 on scale A was 4,000 minus the probability of the fourth entry or 500. When this 500 value is mapped on to scale B, the probability for the fifth entry or the horse in the second post position will be 2,137. The third random number drawn was a 1 and on scale A the 1 entry had a probability of 105 and when this is mapped on to scale B the 1 entry, now in the position of horse 3 will have a probability of 2,242 and this will continue, in the manner indicated on scale B for each of the entries listed on scale A and the respective positions of these entries now mapped on scale B becomes their post positions as far as odds listings are concerned.

Thus, entry 3 will be horse number 1, entry 5 will be horse number 2, etc., and while the example set forth is in connection with the win probabilities, the same procedure will be executed by the program for the place probabilities. It should also be noted that in the example set forth above, the random numbers employed in the examples were offset by 1 to correspond to the entry number as is the case for random numbers employed in the program where values from 0 to 7 are utilized rather than form 1 to 8 corresponding to actual entry and post positions.

Now that random numbers for mapping the entries into post positions have been fetched and are stored in the order in which they were fetched in the random number table in accordance with the rectangle 728, mapping of these probability values for win and place, together with their associated odds in to the data table which holds, as aforesaid, the next 5 races will occur. The initial step in this procedure, as indicated by the rectangle 737, is to add the next race pointer offset to the data table. The next race pointer will point to the first line of data for the next race to be read and hence the current position of data to be stored in the table must be offset by this value to obtain the appropriate storage location therefor.

Thereafter, as indicated by the rectangle 738, certain values are initialized for the calculation by setting the value of I, Winsum, which is a register for accumulating win probabilities and Placesum which is a corresponding register for place probabilities to 0. Thereafter, the value of RI, or the first random number obtained is offset into the probability table and the win probability for the RI entry is obtained in the manner indicated by the rectangle 739. This means, that in our example, if the offset value of the first random number pulled is 3, the probability of the 3 entry in table A or 2K would be obtained.

Thereafter, as indicated by the diamond 740, RI is tested to ascertain whether it is the first entry in the table or does it correspond to entry 1 on linear scale A. If the answer is negative as in the case of the 3 entry, in the manner indicated by the arrow 741 annotated No, the win probability in the table for the entry prior to RA is obtained and subtraction occurs in the manner indicated by the rectangle 742. Thus, in the example being considered since the 3 entry corresponds to RI, the value of the 2 entry of 363 would be obtained and the difference therebetween of 1,637 would result from the subtraction.

Of course, if RI is the first entry in the manner indicated by the arrow 743 annotated Yes, no prior entry exists in the table as in the case of entry 1 on linear scale A and hence, the step associated with the rectangle 742 may be omitted. Thereafter, the resulting value is added to the Winsum register in the manner indicated by the rectangle 744. In the case of the example being given, this value would be 1,637 and the same would be added to the Winsum register as indicated by the rectangle 744. Then the Winsum register would be copied to the race data table in the manner indicated by the rectangle 745 to serve as the first entry therein and the corresponding odds therefor, to be distinguished from the probabilities being processed herein, would be copied to a corresponding display portion of the data table, or alternatively, a separate register therefor could be employed.

The program next proceeds to perform the precise steps discussed in association with the rectangle 739 for the initial random number entry obtained except the probabilities here employed are those present in the selected probability table for Place. After the place probability for entry RI is obtained in the manner indicated by the rectangle 747, the program next tests in the manner indicated by the diamond 748 as to whether or not RI is the first entry in the table. If RI is not the first entry in the table as indicated by the arrow 749 annotated No, the program again proceeds to get the place probability for the entry preceding RI and again subtracts as was done for the win entry in association with the step indicated by the rectangle 742.

Of course, if RI is the first entry as indicated by the arrow 751 annotated Yes, this step may be omitted. Thereafter, the result obtained is added to the Placesum register in the manner indicated by the rectangle 752 and copied into the race data table to indicate the corresponding place probability for the $R_I$ entry here calculated in the manner indicated by the rectangle 753. The corresponding place odds for this entry are then copied into the display portion of the data table, or alternatively, a separate display register for the associated odds may be employed. Thus, the win and place probability and corresponding odds for one post position which here corresponds to a first post position has been calculated.

Upon completion of these calculations, the value of I is incremented in the manner indicated by the rectangle 755. Thereafter, as indicated by the diamond 756, the value of I is tested to ascertain if the same is equal to 8. If the value of I is not equal to 8 in the manner indicated by the arrow 757 annotated no, the pointer is offset to the next horse position in the data table and display register in the manner indicated by the rectangle 758 and thereafter calculation of the win and place probabilities, as well as the corresponding odds therefor for the next random number to be offset into the probability table, is implemented in the manner indicated by the program steps numbered 739–755. This will continue until such time as I equals 8 indicating that probability and odds values have been calculated for all entries.

When the test associated with the diamond 756 is affirmative in the manner indicated by the arrow 759, the program next proceeds to get the show odds in the manner indicated by the rectangle 760. This is done by branching to the subroutine illustrated in FIG. 20 and is accomplished in the manner described in association therewith. Thereafter, as indicated by the circular flag 761, a return to the calling routine is initiated.

SHOW ODDS

Figure 20:
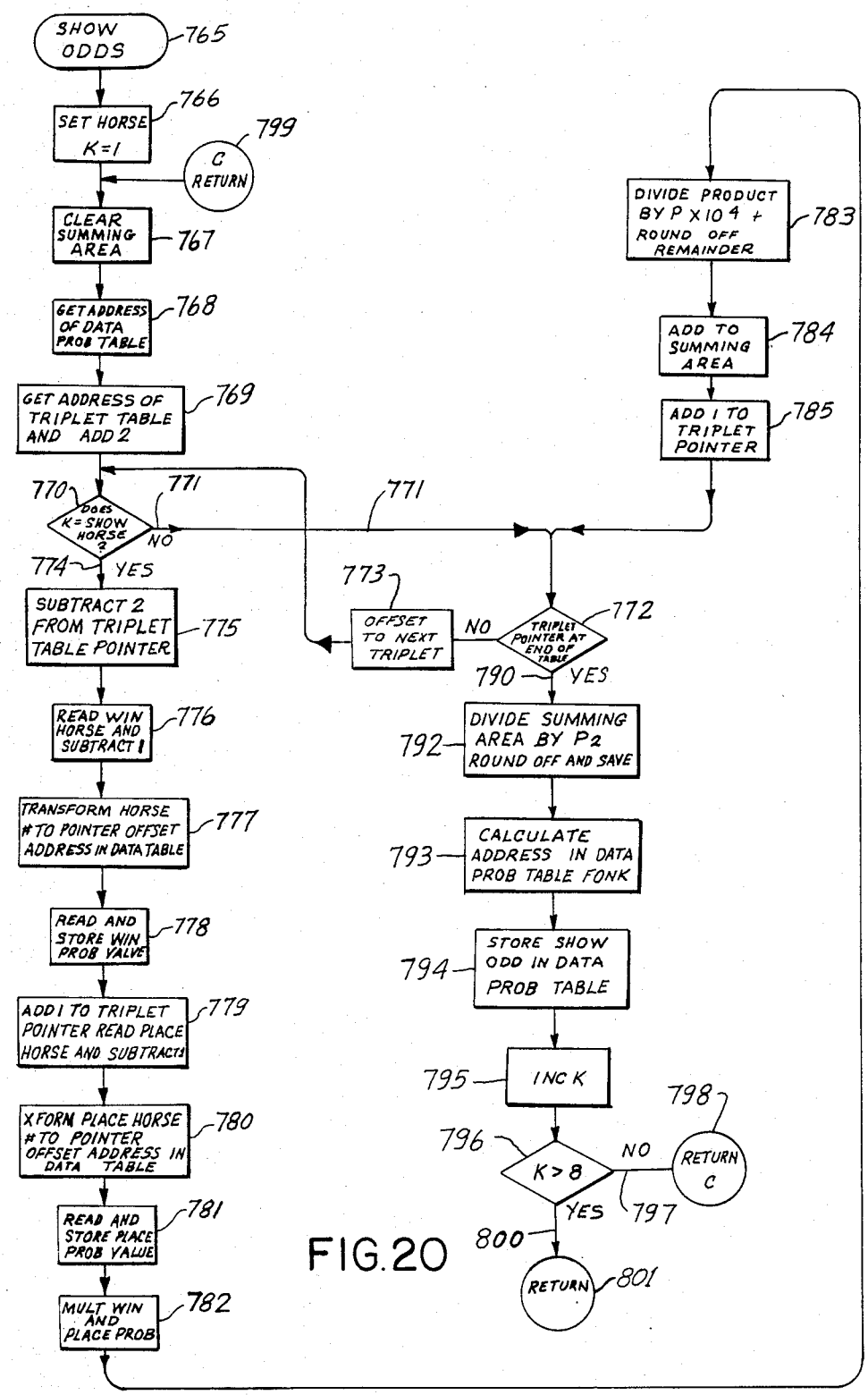
FIG. 20 is a flow chart illustrating in a simplified manner an exemplary "Show Odds" program for the gaming equipment illustrated in FIG. 3 wherein the odds of each entry showing are determined.

Referring now to FIG. 20 there is shown a flow chart illustrating in a simplified manner an exemplary "show odds" program for the gaming equipment illustrated in FIG. 3 wherein the odds of each entry showing are determined. The calculation of show odds, as aforesaid, is performed in a somewhat different manner than is employed for win and place odds as the latter may be based strictly on the rules of probability while the former is based on the practical limitation that only 56 video recordings of races, each having a different combination of a win and a place horse, are employed. Therefore, under these circumstances, it will be appreciated that certain horses in the races recorded show more often than others and hence the odds calculation for the show results must reflect these factors.

For purposes of calculating the show odds, the flow chart illustrated in FIG. 20 will periodically make reference to a table of triplets. The table of triplets is a table which lists the win, place and show horse, in terms of post positions for each of the 56 races which are recorded on the video disks.

The show odds routine is entered at the location indicated by the oval flag 765 and is called by the odds routine illustrated in FIG. 19 in association with the step indicated by the rectangle 760. When the show odds routine is initially entered, the horse K for which calculation will initially occur is set to 1 in the manner indicated by the rectangle 766 and thereafter the summing areas are cleared in the manner indicated by the rectangle 767.

Once these initial conditions are established, the program fetches the address of the data probability table in the manner indicated by the rectangle 768. This is the table which was calculated in connection with FIG. 19 and in which the win and place probability values for the horses in terms of post position were entered. Thereafter, as indicated by the rectangle 769, the address of the triplet table, as explained above, is obtained and is incremented by 2 so that the position therein is shifted from the win post position for the first race to the show post position for the first race. Thus, the step indicated by the rectangle 769 in effect addresses the show result obtained in the first race listed in the triplet table which would correspond to the horse showing in the first race recorded on the video playback media.

The program then tests in the manner indicated by the diamond 770 to ascertain whether or not the show horse illustrated in the address location in the triplet position corresponds to the K horse. If the result is negative in the manner indicated by the arrow 771, the program then tests, in the manner indicated by the diamond 772, to ascertain if the last triplet in the table has been inspected. If the last triplet reviewed in accordance with the test associated with diamond 770 was not the last triplet in the table, as indicated by the arrow annotated No, the program offsets to the next triplet in the manner indicated by the rectangle 773 and thereafter again tests in the manner indicated by the diamond 770 to ascertain whether the K horse and the show horse in this triplet correspond. This loop will continue until such time as the K horse being looked for shows up in the show position within the triplet table being tested in a race by race manner or the end of the triplet table is reached.

When the test conducted in association with the diamond 770 is affirmative, in the manner indicated by the arrow 774 annotated Yes, the program next acts in the manner indicated by the rectangle 775 to subtract 2 from the triplet table pointer so that the pointer again points to the win entry in that triplet. The win entry is then read in the manner indicated by the rectangle 776 and a 1 is subtracted therefrom to offset the value of the post position to the 0 through 7 post positions employed for calculation purposes rather than the post positions 1 through 8 otherwise relied upon.

Thereafter, the horse number of the winning horse in the triplet read in association with the rectangle 776 is transformed to a pointer offset address in the data table in the manner indicted by the rectangle 777 so that in effect it may be employed as an address therefor and thereafter, as indicated by the rectangle 778, the win probability for that entry is read from the data table and stored. The same is then done for the place horse.

Thus, as indicated by the rectangle 779, a 1 is added to the triplet pointer so that the place horse in the triplet located is pointed to, the post position of the place horse is read and thereafter a 1 is subtracted therefrom to transform the post position thereof into an offset value. Then, as indicated by the rectangle 780, the offset place horse number is transformed to a pointer offset address for the data table and the place probability is read from the data table and stored in the manner indicated by the rectangle 781.

The value of the win probability obtained in association with the step indicated by the rectangle 778 and the value of the place probability obtained in association with the step indicated by the rectangle 781 are then multiplied in the manner indicated by the rectangle 782 so that the product of these probabilities for the K horse located in the show position in the given triplet in the manner indicated by the arrow 774 is obtained. The resulting product is then divided by a proportionality constant $K \times 10^4$ and the remainder is rounded off in the manner indicated by the rectangle 783. This value is then added to the summing area in the manner indicated by the rectangle 784 and then 1 is added to the value of the triplet pointer in the manner indicated by the rectangle 785.

The value of the triplet pointer is then tested in the manner previously discussed in association with the diamond 772 to see if it is at the end of the table. If a negative result is obtained in the manner indicated by the arrow annotated No, the next triplet is inspected in the manner indicated by the rectangle 773 and then tested to ascertain whether or not the K horse is listed in the show position in the triplet being inspected. This will continue through the loop associated with the diamond 770 and rectangle 773 or diamond 772 in association with program steps 775–786 and 788 until all 56 triplet tables have been inspected for the K horse. Wherever the K horse is found, the product of the win and place probabilities thereof divided by a constant are added to the summing area. Hence, this loop will only end after all 56 races have been inspected.

When the end of the triplet table is reached, as indicated by the arrow 790 annotated Yes, the summing area is divided by a further constant $P_2$ and the remainder is rounded off and saved in the manner indicated by the rectangle 792. Thereafter, the appropriate address therefor in the data table is calculated in the manner indicated by the rectangle 793 and the show data calculated in association with the step indicated by the rectangle 792 is stored in the data table in the manner indicated by the rectangle 794.

The value of K is then incremented in the manner indicated by the rectangle 795 and thereafter, the value of K is tested in the manner indicated by the diamond 796 to ascertain whether or not the same is greater than 8. If the value of K is not greater than 8, as indicated by the arrow 797 annotated No, a return to the initial portion of the routine as indicated by the circular flags 798 and 799 occurs so that show odds values are calculated in the foregoing manner for all values of K from 1 to 8 and stored in the data table for purposes of display and calculation.

At such time as the program ascertains that the value of K is greater than 8, as indicated by the arrow 800 annotated Yes, a return to the calling routine occurs in the manner indicated by the circular flag 801.

THE "SELECT" PROGRAM

Referring now to FIG. 21 there is shown a flow chart illustrating in simplified manner an exemplary "Select" program routine for the gaming equipment depicted in FIG. 3. The select routine acts, as aforesaid, to select the win, place and as a result thereof, the show horse for each race whose probabilities have been stacked in the data table under such circumstances that the events associated with the selection of the win and place horse result from a fetching of random numbers between 1 and 10,000 and hence correspond to the ambit of events employed in the calculation of the probability values. The Select routine is called after the odds and show odds routine when the next 5 races are being stacked up in the data table for use by the main routine illustrated in FIG. 18.

The Select routine illustrated in FIG. 21 is entered at the location indicated by the oval flag 805. Upon entry into this routine, the program first acts in the manner indicated by the rectangle 807 to fetch the proper race probability table from the data table which corresponds, as will be readily appreciated to those of ordinary skill in the art, to a data table for which the odds and show odds routine has been calculated so that 8 entries are listed therein in post positions 1 through 8 and each post position has a win, place and show probability as well as corresponding odds therefor assigned thereto. However, no win, place or show horse has yet been selected. Thereafter, a random number is fetched from the random number table which has a value as indicated between 1 and 10,000. This random number will be employed as shall be seen below, to select the winning entry in the race for which the instant subroutine is being run.

The value of I is then set to 1 as indicated by the rectangle 809 so that the win probability of the first horse listed in the table may be compared with the random number fetched and thereafter, as shall be seen below, each horse thereafter until a horse is found in the data table for this race whose win probability corresponds to the random number fetched in the step associated with the rectangle 808. The win probability of the $i^{th}$ entry is then fetched from the data table in the manner indicated by the rectangle 810 so that an actual comparison may be run. Thus, for example, if we are dealing with the data table for which the example was given in FIG. 19 and it is assumed that I is still equal to 1, it will be seen that the probability for the horse in post position 1 as listed on scale B will be 1,637. At any rate, the win probability for the post position of the horse corresponding to I in the data table is obtained in the manner indicated by the program step associated with the rectangle 810.

Once the win probability of the I entry has been obtained, the program is in a position to begin comparing the win probability of that entry with the random number obtained. Therefore, as indicated by the diamond 812 the program tests to ascertain whether the random number obtained is equal to or less than the win probability listed in the data table for entry I. Thus, in the example set forth in accordance with FIG. 19 and again considering the horse in the 1 post position, the test indicated by the diamond 812 would test to ascertain whether the random number is equal to or smaller than the number 1,637 which corresponds to the win probability of the horse in position 1.

If a negative result is obtained, in the manner indicated by the arrow 813 annotated No, the value of I is incremented in the manner indicated by the rectangle 814 and thereafter, as indicated by the diamond 815, the value of I is tested to ascertain whether or not it is equal to or greater than 8. If the value of I is less than 8 and the program is still in this loop, it is apparent that a horse has not yet been found in the data table for this race whose win probability is equal to or less than the value of the random number fetched. Thus, as indicated by the arrow 816 annotated No, a return loop to fetch the probability of the next horse is initiated so that this comparison will continue.

Whenever the test indicated by the diamond 812 is affirmative, indicating that the random number fetched is equal to or less than the win probability of the horse in the race being tested or I is equal to 8, it will be apparent that the value of I corresponds to the winning horse in the race being tested in the data table. Therefore, as indicated by the arrows 817 and 818 annotated Yes, and the rectangle 819, a win condition is set for the horse in the post position corresponding to the value of I for which the win condition was ascertained.

The program will next perform the same set of tests to determine the place horse of this race. Therefore, as indicated by the rectangle 821, the value of I is again set to 1 preparatory to cycling through all the place values for each of the 8 horses listed in the data table for this race. A new random number between 1 and 10,000 is fetched in the manner indicated by the rectangle 822 and thereafter the place probability for the I entry in this race is obtained in the manner indicated by the rectangle 823.

Once the random number and the place probability for the I horse is obtained, the same are tested in the manner indicated by the diamond 824 to ascertain whether or not the random number obtained is equal to or less than the place probability for the I horse. If a negative result is obtained in the manner indicated by the arrow 825 annotated No, the value of I is again incremented in the manner indicated by the rectangle 826 and thereafter I is tested in the manner indicated by the diamond 827 to ascertain whether or not the value of I is equal to or greater than 8, the last entry in the race.

If a negative result is obtained in the manner indicated by the arrow 828 annotated No, recycling within the loop to obtain the place probability for the next entry occurs and this continues until such time as the random number obtained is found to be equal to or less than the place probability of the horse in the data table then being tested or the value of I is found to be equal to or greater than 8. In either event, as indicated by the arrows 829 and 830 a prospective candidate for the place horse has been found and accordingly, in the manner indicated by the rectangle 831, a place indication is set for the horse post position which has been located.

However, as the matter of selecting the win and place horses in the select program illustrated thus far were independent, and not mutually exclusive, the program must next test in the manner indicated by the diamond 831 to ascertain if the win and place horses are the same horse. Since this condition cannot occur, if an affirmative result obtains in the manner indicated by the arrow 832 annotated Yes, reentry to the beginning of the place horse calculation occurs and a new place horse must be found. However, if the win and place horses are not the same horse in the manner indicated by the arrow 833 annotated No, the show horse for this race may then be determined.

As was stated above, 56 races are recorded on record media loaded at the playback devices so that one race is available to display any win-place combination which may result from the select routine. However, the show horse is dependent on the horse which shows in the playback of the win-place combination which has been selected and the odds for show have been calculated in a manner to reflect this as was explained in connection with FIG. 20. Therefore, to determine the show horse to accompany the win-place combination which has been thus far determined and for that matter to find the appropriate frame information for the race to be displayed, the program must now tick through the win-place combinations of each of the 56 races located in the triplet table. When a race is defined therein with the win-place combination defined by the select routine, the show horse listed in the triplet table is defined as the show horse for the race in the data table whose results are now being determined and the frame information present therein will be reserved for use in displaying this race.

Thus as indicated by the rectangle 835, the program first acts to fetch the address of the race table or triplet table and to clear the offset pointer thereof so that this pointer points to the win horse in the first set of race results listed in the table. Once this is done, the program next tests in the manner indicated by the diamond 836 to ascertain if the win horse specified in association with the rectangle 819 corresponds to the win horse in the first location in the triplet table. If a negative result is obtained in the manner indicated by the arrow 837 annotated No, a 1 race offset is added to the offset pointer in the manner indicated by the rectangle 839 and this offset pointer is added to the race table address in the manner indicated by the rectangle 840 so that the win horse in the next race listed in the triplet table is addressed. Thereafter, the comparison described in association with the diamond 836 again takes place until such time as the winning horse in the race in the triplet table then being inspected corresponds to the winning horse defined by the select routine.

When an affirmative result is obtained in the manner indicated by the arrow 842, the program next tests in the manner indicated by the diamond 843 to ascertain whether the place horse in the race for which a successful win comparison was obtained corresponds to the place horse ascertained by previous portions of the select program. If a negative result is obtained in the manner indicated by the diamond 844, the steps associated with rectangles 839 and 840, as well as the diamonds 836 and 843, are again repeated so that the program then ticks through further entries in the triplet table to again find a race listed therein for which the win horse corresponds to the win horse defined by the select routine and thereafter tests the place horse listed therein to ascertain if the place horse set forth corresponds to that defined by the select program.

Upon locating the single entry in the triplet table having this combination, in the manner indicated by the arrow 845 annotated Yes, it will be apparent that the horse listed as the show horse therein is the horse which is to show in the race for which the instant select program has been run. Therefore, as indicated by the rectangle 847, the pointer for the next entry in the triplet table, which corresponds to the show horse is obtained, the show horse is listed in the data table for this race and the offset pointer for this race is saved in the race queue as the triplet table also lists appropriate frame information for the race to be displayed. Therefore, saving the offset pointer in the race queue enables the program to appropriately position the video disk playback device to cause the desired race to be shown in association with the results determined for this race as listed in the data table. Thereafter, the calling routine is returned to in the manner indicated by the circular flag 848.

Thus it will be appreciated that the select routine illustrated in FIG. 21 acts to select the winning and placing horses within a race for which probabilities have been established in the data table on the basis of the generation of random numbers between 1 and 10,000 and determines the winning and placing horses in strict accordance with the probabilities established therefor in the race table. Thereafter, the program ticks through the triplet table to find the one race which has been recorded which has the win and place combination determined by the select program and then ascertains the show horse which is listed therein. Once this has been done, the appropriate horse to show is listed in the data table together with information enabling the program to address appropriate frame information in the triplet table so that the appropriate horse race recorded on the video disk may be played back when this race is pulled from the stack.

NAME SELECTION

Figure 22:
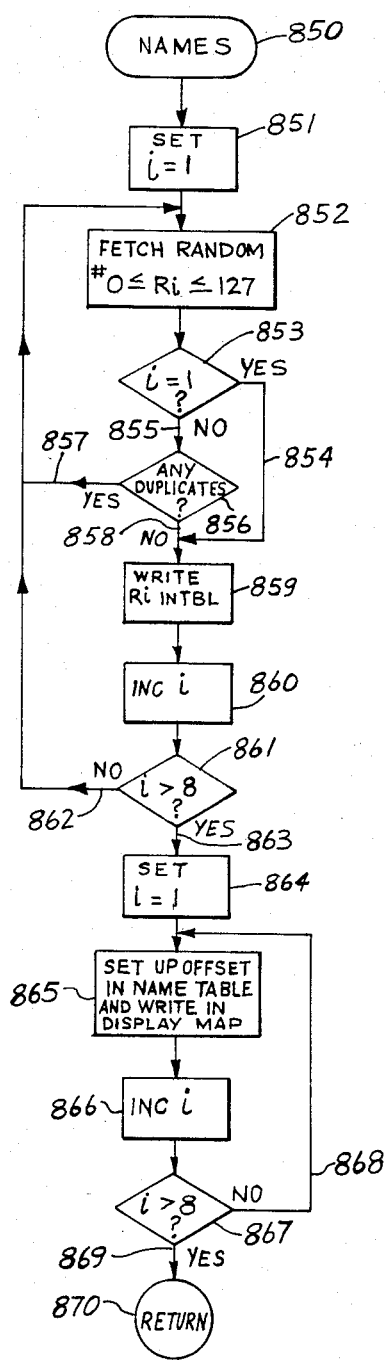
FIG. 22 is a flow chart illustrating in a simplified manner a "Names" program for the gaming equipment shown in FIG. 3 wherein names for each entry in a gaming event are selected.

Referring now to FIG. 22, there is shown a flow chart illustrating, in simplified manner, a name selection program for the gaming equipment shown in FIG. 3 wherein names for each entry in a gaming event are selected. While each entry in a horse race about to be played by the gaming equipment illustrated herein is provided with a name and the names of the various entries in succeeding horse races are varied to a substantial degree to avoid any appearance of repetition; it will be appreciated that the provision of names is merely cosmetic as all calculations which are performed herein occur as a function of the entry number and subsequently the post position of the horses.

Therefore, the actual selection of names and the retention of the same for the gaming equipment is not performed in the same manner as races wherein five races are stacked up in a data table for use by the gaming equipment but instead, name selection occurs toward the end of the main routine illustrated in FIG. 18 and it is performed only for the purpose of providing names for the next race to be displayed. The name selection routine illustrated in FIG. 21 is called by the main program routine in the manner indicated in FIG. 18.

The Names routine illustrated in FIG. 21 acts to select 8 names for the 8 entries in the next race from a list of 128 names maintained in the read-only memory and selection is again based upon random numbers generated for that purpose. When the Names routine is entered in the manner indicated by the oval flag 850 it initially acts in the manner indicated by the rectangle 851 to set I equal to 0 and thereafter a random number between 0 and 127 is fetched from the random number table in the manner indicated by the rectangle 852.

Once a random number appropriate for selecting a name out of the 128 name table has been fetched, the program acts in the manner indicated by the diamond 853 to ascertain whether or not I is equal to 1. If an affirmative result is obtained in the manner indicated by the arrow 854 annotated Yes, the program need not concern itself with whether the name pointed to by the random number fetched may be the same as a name already assigned to a previous entry for this race. However, if the value of I is not equal to 1 as indicated by the arrow 855 annotated No, the program then tests in the manner indicated by the diamond 856 as to whether or not the name pointed to by the random number fetched corresponds to a name previously assigned to an entry in this race. If an affirmative result is obtained in the manner indicated by the arrow 857 annotated Yes, a new random number is fetched so that another name may be assigned to the entry I being processed.

If no duplicate name is present in the manner indicated by the arrow 858 annotated No, or if I equal to 1 is being processed, the name pointed to by the random number obtained is written in a table in a position corresponding to the post position of the horse being named in the manner indicated by the rectangle 859. Thereafter, the value of I is incremented in the manner indicated by the rectangle 860.

Once the value of I is incremented in the manner indicated by the rectangle 860, the value of I is tested in the manner indicated by the diamond 861 to ascertain whether or not the same is greater than 8. When a negative result is obtained in the manner indicated by the arrow 862 annotated No, it is apparent that all 8 entries in the next race to be run have not yet been named and hence, the program must loop back to obtain a new random number in accordance with the step indicated by the rectangle 852 so that naming of the entries I in this race continues.

Once the test associated with the diamond 861 has ascertained that the value of I is greater than 8 in the manner indicated by the arrow 863 annotated Yes, the value of I is again set to 1 in the manner indicated by the rectangle 864. Thereafter, as indicated by the rectangle 865, the name associated with each entry I is offset to the post position minus 1 notation in which items are maintained in the race table due to a preference for using 0-7 rather than 1 to 8 and written into a name table in this manner and into a display map for purposes of being displayed on the informational displays 10 and 14 during the next race. Once this has been done for the current value of I, the value of I is again incremented in the manner indicated by the rectangle 866.

The program then tests in the manner indicated by the diamond 867 to ascertain whether or not the value of I is greater than 8. If the value of I is not greater than 8 as indicated by the arrow 868 annotated No, the program loops back to again perform the steps indicated by the rectangles 865 and 866 until each name has been offset and appropriately written in a name table and the display map. Once a value of I greater than 8 is ascertained by the test indicated by the diamond 867, in the manner indicated by the arrow 869 annotated Yes, a return to the calling routine illustrated in FIG. 18 occurs in the manner indicated by the circular flag 870. Thus, in this manner, 8 names for the next race to be run are selected during the closing portions of the main routine for a previous race. Furthermore, it will now be appreciated that name selection is performed on a random basis from a large table of names so that wide variations are presented to a player for cosmetic purposes.

THE APPENDICES

Attached hereto as Appendix A is a heavily annotated exemplary program listing for a horse race machine configured in accordance with the teachings of the instant invention.

Attached hereto as Appendix B are exemplary tables illustrating the accounting information maintained in the removable memory and the player device control blocks which are established for each player station employed in a given embodiment of the instant invention.

CONCLUSIONS

Thus it is seen that in accordance with a preferred embodiment of the present invention, a random number generator is provided which employs a white noise source to clock a counting arrangement whose maximum count exceeds the largest random number desired. A variable counter, clocked at a fixed rate is loaded with random numbers obtained from said counting arrangement and each time said variable counter is decremented to a threshhold state, a new random number is read from the counting arrangement.

Random numbers obtained in this manner are then employed within a digitally controlled and operated gaming machine to select winning conditions, the probabilities to be displayed during periods when wagers are accepted and otherwise to vary initial conditions associated with the gaming event prior to the actual occurrence of the gaming event. The gaming event is then visually displayed in accordance with the winning conditions selected and any successful wagers are paid.

While the embodiment of the gaming device described herein relates to a horse racing machine, it will be appreciated that both the random number generator per se and its use in gaming equipment as described herein have wide application to both different forms of horse race machines and gaming equipment whose theme is other than that of horse racing. Principal among the attributes of the instant invention is the reliable and efficient manner in which random numbers may be generated on a widely varying basis and in a continuous manner. This enables random numbers to be employed to predict not only the occurrence of a fortuitous event per se, but additionally employed to vary a plurality of events which are ancillary to the event yet serve to give the gaming device a great degree of player appeal, and at the same time lend added complexity thereto as the same appears to the player. This avoids spurious attempts by players at predicting the operation of the device and hence the results of events by attempting to synthesize the operation thereof on computers and the like, and in any event, lends a high degree of unpredictability to the operation. In this manner, a highly secure mode of operation is provided. Furthermore, the control of all aspects of the operation of the gaming equipment through microprocessor techniques lends not only added security to the operation thereof, but affords the opportunity to render the same highly tamper proof.

In the embodiments of the instant invention set forth, code conversion and the disclosure of ancillary peripheral devices associated with data translation has been held to a minimum in order to set forth the instant invention in its simplest form. However, it will be readily appreciated by those of ordinary skill in the art that where given peripherals, conventionally available in the marketplace, require specific codes for input and output purposes, code conversions may be readily accomplished at the interfaces provided therefor and, in addition, where necessary or otherwise appropriate line drivers in the form of transmitter receiver devices, may be added to enhance the signal communication capability thereof over lengthy lines. In addition, wherever desired, additional peripherals such as a communications port, interfacing to a host computer or the like may be added to the common bus structure of the instant invention without deviating a whit from the teachings set forth herein.

Although specific logic configurations have been illustrated and described for the embodiment of the invention set forth herein, it will be appreciated by those of ordinary skill in the art that any conventional logic arrangements which are calculated to achieve the same purpose may be substituted for the specific configurations shown while specific logic components may be varied at will to meet the choice of design. Thus, although conventionally available LSI and MSI logic is here generally preferred and frequently referred to by manufacturer chip number, due to its availability, the logic described herein may be implemented through the use of many conventional components and greater or lesser degrees of integrated circuit implementation may be employed to take advantage of components available in the marketplace and current product techniques.

In addition, it will be readily appreciated by those of ordinary skill in the art that although positive logic conventions have been frequently here employed, negative logic may be alternatively utilized wherein a One (1) level corresponds to a first level and a Zero (0) level corresponds to a certain level more positive than such first level and such negative logic is frequently preferred for certain design conditions and/or to take advantage of available integrated circuit components. Additionally, although specific logic components and associated conditions necessary for the operation thereof have been mentioned herein in order to describe an exemplary embodiment, similar complimentary logic configurations to those mentioned may be alternatively employed and the associated operating conditions therefor may be substituted or altered without any deviation from the concepts of the invention disclosed.

While the invention has been described in connection with exemplary embodiments thereof, it will be understood that many modifications will be readily apparent to those of ordinary skill in the art; and this application is intended to cover any adaptations or variations thereof. Therefore it is manifestly intended that this invention be only limited by the claims and equivalents thereof.

What is claimed is:

1. In a gaming device wherein the occurrence of a fortuitous event is accompanied by a display of odds associated with the probability of the occurrence of said fortuitous event and successful wagers as to the occurrence of said fortuitous event are paid in amounts related to said probability of said occurrence of said fortuitous event; the improvement comprising:
    means for generating random numbers;
    means for storing a plurality of differing probability tables, each of said plurality of probability tables defining differing probabilities of occurrence of several events;
    means responsive to a random number generated for selecting a stored probability table defined by said random number and displaying odds associated with the probability of occurrence of the several events set forth therein;
    means responsive to another random number generated for selecting the occurrence of said fortuitous event from said several events; and
    means responsive to a selecting of said occurrence of said fortuitous event and said stored probability tables selected for paying any successful wager made in accordance with odds associated with the probability of said fortuitous event present in said stored probability table selected.

2. In the gaming device according to claim 1 wherein each of said plurality of probability tables define the probability of occurrence of first and second fortuitous events of several events and said gaming device sets forth the occurrence of first, second and third fortuitous events, the improvement further comprising means responsive to a selecting of said stored probability table for calculating the probability of the occurrence of said third fortuitous event based upon the probability of occurrence of said first and second fortuitous events of several events for each of said several events and for displaying odds associated therewith.

3. A gaming device for accepting wagers based upon the occurrence of a fortuitous event comprising:
    video display means;
    video disk playback means for reproducing viedo information recorded as a series of frames, said video disk playback means being connected to said video display means and having recorded thereat video information corresponding to and depicting a plurality of events each of which may occur as said fortuitous event;
    a random number generator means;
    selecting means responsive to a random number generated by said random number generator means for selecting a particular one of said plurality of events as a next to occur fortuitous event; and
    means responsive to a selecting a particular one of said plurality of events as a next to occur fortuitous event for applying a frame defining signal to said video disk playback means to cause said video disk playback means to playback and display on said video display means video information corresponding to and depicting said particular one of said plurality of events as a next to occur fortuitous event selected.

* * * * *